(12) United States Patent
Murakami et al.

(10) Patent No.: US 7,676,534 B2
(45) Date of Patent: Mar. 9, 2010

(54) COORDINATE MUTUAL CONVERTING MODULE

(75) Inventors: Takumi Murakami, Nissin (JP); Tohru Nishioka, 12-26, Kose 1-chome, Kaizuka-shi, Osaka (JP) 597-0021

(73) Assignee: Tohru Nishioka, Osaka (JP)

( * ) Notice: Subject to any disclaimer, the term of this patent is extended or adjusted under 35 U.S.C. 154(b) by 1110 days.

(21) Appl. No.: 10/562,002

(22) PCT Filed: Jun. 25, 2004

(86) PCT No.: PCT/JP2004/009006

§ 371 (c)(1),
(2), (4) Date: Dec. 23, 2005

(87) PCT Pub. No.: WO2005/001794

PCT Pub. Date: Jan. 6, 2005

(65) Prior Publication Data

US 2006/0161346 A1     Jul. 20, 2006

(30) Foreign Application Priority Data

Jun. 27, 2003    (JP) .............................. 2003-185021

(51) Int. Cl.
*G06G 7/22* (2006.01)
(52) U.S. Cl. .................................................... 708/442
(58) Field of Classification Search ................. 701/213
See application file for complete search history.

(56) References Cited

U.S. PATENT DOCUMENTS 5,742,297 A * 4/1998 Logan ........................ 345/672

6,006,160 A * 12/1999 Tamaki et al. ................ 701/208
6,023,654 A * 2/2000 Mohlenkamp ............... 701/208

(Continued)

FOREIGN PATENT DOCUMENTS

| JP | 5-164557 A | 6/1993 |
| JP | 8-286257 A | 11/1996 |
| JP | 11-184374 A | 7/1999 |
| JP | 2000-181345 A | 6/2000 |
| JP | 2002-183263 A | 6/2002 |
| JP | 2002-189834 A | 7/2002 |
| WO | WO 02/082014 A3 | 10/2002 |

*Primary Examiner*—Thomas G Black
*Assistant Examiner*—Shelley Chen
(74) *Attorney, Agent, or Firm*—Sughrue Mion, PLLC

(57) ABSTRACT

A coordinate mutual conversion module is provided which is capable of readily utilizing a global mesh code. A zone number (I-VI) and an east-west number within a block are derived from the longitude of a requested position (S1). A block number and a south-north number are derived from the latitude of the requested position (S2). A unit number is derived from the east-west number and south-north number (S3). The value of the western end longitude of the derived unit is subtracted from the value the longitude of the position to derive the difference which is divided by 2160 seconds (S4), the resulting value is multiplied by 10 raised to n, and an integer part of the resulting value is defined to be an east-west number of a mesh (S5). The latitude of the position is subtracted from the northern end latitude of the derived unit to derive the difference which is divided by a value in seconds converted from difference A of the unit (S6), the resulting value is multiplied by 10 raised to n, and an integer part of the resulting value is defined to be a south-north number of the mesh (S7). The block number, unit number, east-west number, and south-north number are arranged in this order to create an N-code (S8).

17 Claims, 18 Drawing Sheets

U.S. PATENT DOCUMENTS

| | | | |
|---|---|---|---|
| 6,138,073 A * | 10/2000 | Uchigaki | 701/208 |
| 6,961,096 B1 * | 11/2005 | Tsujimoto | 348/552 |
| 7,050,903 B1 * | 5/2006 | Shutter et al. | 701/117 |
| 7,272,500 B1 * | 9/2007 | Walker | 701/213 |
| 2003/0182051 A1 * | 9/2003 | Yamamoto | 701/200 |
| 2004/0064958 A1 * | 4/2004 | Segur | 33/1 CC |
| 2004/0066316 A1 * | 4/2004 | Ogawa | 340/995.1 |
| 2005/0023524 A1 * | 2/2005 | Beatty | 257/59 |

* cited by examiner

COORDINATE MUTUAL CONVERTING MODULE

TECHNICAL FIELD

The present invention relates to a coordinate mutual conversion module which can convert between positional information conventionally represented in a coordinate system which is hard to use, such as the latitude/longitude, X, Y coordinates and the like of new and old positioning system coordinates, and an N-code, disclosed in JP-A-2000-181345, which can represent all the world in one system using the decimal number system or integer representation which is readily understood by persons, thereby efficiently providing positional information in the field of mobile unit, geographical information, crisis management, distribution, service, leisure and sightseeing, disaster prevention, education, environment survey, welfare, resource investigation, military, and other fields which involve positional information.

In this specification, the global mesh code in JP-A-2000-181345 is referred to as an "N-code," and a "mesh" used in the global mesh code is changed in name to a "unit"; and a "fine mesh" to a "mesh". Also, the Japan positioning system coordinates are referred to as an "old positioning system," and a coordinate system of new positioning system coordinates is referred to as a "new positioning system." For reference sake, the new positioning system coordinates are the result of modifying deviations of the Japan positioning system from the global positioning system, and are actually the same as the global positioning system, so that they may be referred to as "global positioning system coordinates" in some cases.

BACKGROUND ART

In conventional positional information delivery technologies, there are the latitude/longitude are a globally representing method. However, latitude/longitude are suited to represent a position on a sphere, but are not suited as a coordinate system for measuring a distance and an area because of its lack of user-friendliness due to a sexagesimal number system. Thus, planar orthogonal coordinates (X, Y coordinates) are required for measurements and the like, in which a spherical surface is regarded to be a pseudo-flat surface. Internationally, a UTM (Universal traversal Mercator) coordinate system has been used, where the globe is divided into 60 zones along the longitudes, and the origin is placed at the intersection of a central longitude of each zone with the equator.

Since Japan extends over five zones, there are five coordinate origins. However, since Japan is located far from the origins on the equator, large distortions and a large number of digits create disadvantages. For this reason, Japan has employed a 19-coordinate system as a public coordinate system for measurements in a form in which one origin is shared by groups of prefectures. This coordinate system, as will be understood from the name, has 19 coordinate origins for all of Japan (hereinafter, the 19-coordinate system and UTM coordinate system are collectively called as the "X, Y coordinates").

The planar orthogonal coordinate system has disadvantages of requiring a large number of origins and reference points for making corrections and of being usable only for local applications within the respective origins. In other words, overall Japan cannot be represented as one system. For this reason, the planar orthogonal coordinate system can be utilized only in limited applications such as public measurements, but cannot be utilized in many applications which are deeply related to daily life such as traffic and distribution.

The latitude/longitude, and coordinate values of the X, Y coordinates are used when a position itself is represented and when a distance or an area is measured, but any of these coordinate systems presents point information only indicative of that point. However, for use in statistic processing, for example, demographic distribution, a coordinate system must have an area rather than a point. In other words, a mesh structure is required.

As global mesh codes, there are a Marsden square code, a GEBCO (General Bathymetric Chart of the Oceans) mesh code, and the like. Any of these code systems divides the latitude/longitude every ten degrees, and numbers the resulting segments, but the numbering lacks regularity. In addition, they also involve a quadrisection in a sub-division process and therefore lack continuity, thus making themselves difficult to use. Also, Oracle Co. employs a unique mesh code which supports the world, but involves repetitions of quadrisections. Though regarded as efficient from a mathematical point of view, it is difficult for a person who views it to understand this mesh code system.

In Japan, there is also a mesh code system which is defined by JIS (Japanese Industrial Standards), called "regional mesh code."

Though created on the basis of the latitude/longitude, this code also has the disadvantage that there is a lack of continuity in the numbers because a primary mesh is vertically and horizontally divided equally into eight to create a secondary mesh. Also, the meshes are uniformly sectioned by one degree of longitude in the east-west direction, and by 40 minutes of latitude in the south-north direction to define squares, but this can be applied only to a north-east region, and the shape of meshes becomes oblong in Kagoshima which is located in the southern region of Japan, thus presenting the disadvantage that the vertical and horizontal unit lengths are different.

Further, since there are deviations between Japan's Japan positioning system and the global positioning system in the latitude/longitude which are used to represent positions, it has been pointed out previously that the deviations cause problems in applications such as aircraft. Also, while GPS's have been available on the market for use in leisure ocean activities and the like, they display longitude and latitude according to WGS84 which are the basis of the system used in the United States, and have the problem that there is a deviation of 400-500 meters from the longitude and latitude on commercially available maps in the Japan positioning system. This impedes proliferation of the GPS's.

With gradual revelation of the problem caused by the deviations between the global positioning system coordinates and the old positioning system coordinates as described above, the Ministry of Land, Infrastructure and Transport has made a detailed survey throughout the country in order to correct the deviations, and announced a new coordinate system as survey result 2000 (Geodetic Coordinates 2000). Subsequently, utilization of this new positioning system coordinates has been legislated, and the Ministry of Land, Infrastructure and Transport is making efforts to popularize of the new positioning system coordinate. However, there are few manufactures which manufacture paper maps and GIS (Geographic Information System) which support the new positioning system, and a transition to it will make very slow progress. This is because deviations between the new and old coordinate systems are not uniformly translated throughout the country, and because introduction of the latitude/longitude of the new coordinates into conventional maps for representation on the map results in distortions due to different amounts of corrections depending on regions, it is very hard to remake maps, and a failure in conversion would not cause difficult situations for ordinary private use. On the contrary, if the new positioning system and old positioning system co-exist in the market, the same values of the longitude and latitude indicate different positions separated by approximately 500 meters, so that confusion will be introduced unless a clear indication is made as to which coordinate system is employed. This can cause a more serious problem. Also, since the deviations are not simply translated between the new and old positioning systems, deviations are produced between the immense amount of existing statistic data arranged by the regional mesh codes based on the old positioning system and data based on the new positioning system, resulting in the absence of continuity in statistics, thus giving rise to a serious problem as well. Therefore, this is a situation in which difficulties will be encountered in forcedly advancing the transition. The administration has stipulated in a public survey operation rules that maps which are to be surveyed after April 2002 should be surveyed in the new coordinate system. Since privately published maps are illustrated on the basis of maps created by the Administration, it should be necessarily accepted that the old positioning system can no longer be continued as before.

Also, when viewed from the standpoint of international cultural exchange, continuing to use the old positioning system which deviates from the international standard will be a problem in aircraft and the like, so that it is thought that the transition will gradually advance in the future.

However, as the transition gradually advances, the new and old coordinates will co-exist for a longer time, possibly giving rise to a new problem. If the difference between the new and old coordinate systems was visually apparent, no mistake would be made, but since they are in the same latitude/longitude representation, a deviation between the new and old coordinates is said to be 400-500 meters even when they have the same values, so that it is anticipated that confusion can occur in a navigation system and the like if the distinction between the new and old coordinate systems is forgotten as a result of both systems using the same representation. Actually, even at the current time at which the utilization of the new positioning system has been legislated, latitude/longitude databases based on the old positioning system are still extensively sold without recognition of the need to distinguish between them.

Except for coordinates that are used in professional applications, on paper maps such as road maps, sightseeing maps and the like, familiar to general persons, coordinates are represented by letters such as A, B, C, . . . , and 1, 2, 3, . . . which are vertically and horizontally written in the margin. However, these coordinates are applied only to particular maps, leading to the inconvenience of requirements for indexes on a map-by-map basis. Moreover, general position representing methods use addresses and landmark objects, rather than the coordinates. However, these position representing methods, which are not in coordinate structure, are redundant, lack regularity, and local information, so that they have disadvantages that they are recognized only with local persons. Therefore, for convenience, on GIS, an indirect search approach has been employed using a telephone number, a postal code or the like. However, these supplementary methods also lack regularity, and basically support only places where people live, or registered positions, and present the problem that they are not available in mountain regions, on the sea, and the like.

In such a situation, the GIS is rapidly becoming increasingly popular because its importance has been recognized after the Great Hanshin Awaji Earthquake in Japan. However, the GIS, which has been devolved as a result of the need to prevent disasters, cannot support disasters in real time and fails to exert sufficient functions even though it can be used for previous predictions and post verifications. This is because the current GIS cannot directly receive positional information from inhabitants and does not have a method for efficiently communicating acquired information to inhabitants.

While communications of disaster information are mainly made through speeches, by telephones and the like, communicating disaster information by generally recognized addresses and landmark objects cannot be done rapidly except by a person in charge who is familiar with a region. Thus, the information by generally used addresses and landmark objects implies a problem in that, though no problem would arise in the same district, mutual positional relationships between positions are difficult to understand for those not familiar with the region in a district having a different name, even in an adjacent district, and can be only supported by those familiar with the region. Also, since the information by generally used addresses and landmark objects is not suited for entry into a computer, a long time is taken for the entry, and entry tends to be inaccurate. Then, when a support should be made by a prefecture or by the country, i.e., an area beyond an autonomous community as is the case with the Great Hanshin Earthquake, most of those who are in charge are not familiar with the region and as a result they are too busy trying to identify the location instead of attending to essential rescue activities, which gives rise to a serious problem in the crisis management.

One problem of current car navigation systems is that one cannot easily and correctly enter a destination. As a current method of searching for a destination, the destination may be looked for on a map on the screen, or searched for by a method which relies on an address, a postal code, a telephone number, the name of facilities, or the like. However, while the method of looking for the destination on the screen works well in an urban area which includes a readily identifiable landmarks, the entry is difficult it there is no landmark in an suburban area or in a mountain region, or along a coast line, or the like. On the other hand, the address and postal code search method permits only a rough identification on a district basis, and the telephone number search and facility name search method, though capable of a pinpoint search, cannot be utilized unless they have been registered, and has the disadvantage of a low hit rate. Also, with the telephone number search method, a telephone number is likely to be changed. In addition, these methods can basically support only regions where people live, but in many cases they cannot search for a suburban sightseeing spot and the like. For example, garbage is illegally dumped in a mountain region, on a river-terrace, along a coast line, or the like. Further, current car navigation systems have the disadvantage that they cannot successfully inform their own positions. For example, in the event of a rendezvous or trouble, the car navigation system can pinpoint its own position on the screen, but cannot clearly describe its own position to the partner through a portable telephone or the like.

Recently, portable telephones having a built-in GPS (Global Positioning System) have been available on the market, which permit an entry into an era in which walker ITS (Intelligent Transport Systems) is available. However, the current systems have problems. This is because, though it is impossible to expect functions such as those provided by a car navigation system to portable telephones in the screen size and storage capacity, an attempt is made to employ approaches similar to those used to the car navigation system. Specifically, the walker ITS cannot store map information therein and therefore must capture the map information by downloading, but a map screen has the disadvantage that it requires a large amount of information and provides a poor map in spite of the long download time and a high fee required, so that the user cannot recognize the region represented by the map even if the user views it on the map screen unless there is a prominent landmark therein.

Recently, according to announcements from the Police Agency, there are 8,800,000 urgent reports to the police, and the number will be higher if urgent reports to the fire department are added. It is said that 50% or more of these reports are thought to originate from portable telephones, and the percentage will be further increased in the future. With a portable telephone, its position cannot be identified through a number search, as can be done with a fixed telephone, so that the person making the report is relied on to explain the position, but this person experiences difficulties in correctly explaining the position in a short time. For this reason, many calls are disconnected before the position can be identified, resulting in a problem that emergency services cannot ready the position on time. As an action taken therefor, it is said that the Police Agency is investigating the introduction of a system which forcedly monitors the telephone number of a telephone in order to call back thereto when the police determines that there is urgency, even if the telephone is not configured to advise its telephone number, in which case the police cannot call back to that number. However, the problem cannot be sufficiently solved by the system which identifies the position, where urgent action needed by a call back method.

As described above, the current navigation system is based on a map screen, and the walker ITS which displays rough information on the small screen of a portable telephone is not a system which can be utilized by the aged, visually impaired, or those who have difficulty reading maps. Also, in Japan, if portable navigation systems can be utilized by foreign tourists, this will attract foreign tourists, but currently, there are no maps which are displayed using the Roman alphabet. Supposing that the Roman alphabet is used, Roman alphabet to be displayed would require a number of letters three or four times larger than Chinese letters, so that it is thought to be difficult to create practical maps for portable screens. As such, the development of navigation systems for foreigners is difficult with the current approach based on the map.

When one sees an old travel photograph, he knows when the photograph was taken by a date inscribed at a corner of the photograph, but he often cannot remember where the photograph was taken. There are many travel-related programs and gourmet-related programs in recent television programs, but even if a viewer wants to go to the spot, only the rough place name and a simplified diagram are displayed which are difficult even for local persons to recognize, so that eventually, the spot is not found in many cases. Also, while positional information is an important element in news programs as well, place names such as Mt. Osutaka into which a Nihon Air Line airplane crashed into, and Kamikuissiki village were repeatedly broadcast for consecutive days, but nationwide viewers could only gotten a rough impression that the location was around Mt. Fuji. In this way, although positional information is very important in many television programs, it has been so far handled in a rough manner, so that information wanted by viewers cannot be successfully communicated to them.

Conventionally, for representing a position, different methods have been employed, depending on particular objects and applications, based on address, place name, landmark object, latitude/longitude, 19-coordinate system, map and the like, without unification, and this prevents the development of GIS. Stating by way of example, positional information spoken in different languages is spoken through an interpreter which is a computer, and is alienated not only due to the inconvenience through the interpreter, but also due to the ill fitness of the interpreter for an interpretation of more highly frequently used words of positions such as addresses and landmark objects, though this interpreter is good at interpretation between the latitude/longitude and 19 coordinates. For solving this, there is a need for a common language in which conversations can be made without the interpreter.

This common language for identifying positions are coordinates which are readily understood by human beings, and can continuously represent the entire country. To make use of the accumulated immense resources of the GIS, it is essential to rely on latitude/longitude. In the GIS, there are many areas which are arranged in the 19-coordinate system, but this coordinate system represents local coordinates, and lacks the flexibility for representing the entire country as one system, but the relationship with the longitude/latitude can be processed by a computer. Basically, therefore, this resource can be utilized by converting latitude/longitude into a coordinate system which is readily understood by people.

However, it is necessary to meet many conditions such as the decimal number system, integer notation, and the like in order to create readily understandable coordinates. A code system which satisfies such conditions is disclosed (see JP-A-2000-181345).

DISCLOSURE OF THE INVENTION

However, JP-A-2000-181345 does not sufficiently disclose about a method of utilizing a global mesh code (N-code), and a system is required for its proliferation.

It is therefore an object of the present invention to provide a coordinate mutual conversion module which is capable of readily utilizing an N-code by converting between the N-code and a coordinate system that is selected from a group comprising the latitude/longitude of the new and old positioning system the coordinates and corresponding X, Y coordinates, respectively.

Further, it is an object of the present invention to provide a geographical information system, a global positioning system, a portable terminal, an image pick-up apparatus, a navigation system, a navigation control system, an on-site shooting television camera, and a vehicle management system.

The coordinate mutual conversion module of the present invention is a coordinate mutual conversion module for mutually converting a mesh code for displaying a position by using a combination of a block number for a block, a unit number for a unit, and a mesh number for a mesh, wherein the globe is divided into six in the east-west direction along longitudes at intervals of 60 degrees, and divided into at least three in the south-north direction along latitudes to define a plurality of numbered blocks, each of the blocks is divided into 100 in the east-west direction and in the south-north direction, respectively, to define a plurality of numbered units in a square shape, and each of the units is divided into 10″ in the east-west direction and in the north-south direction, respectively, to define a plurality of numbered meshes in a square shape, and respective latitudes and longitudes of new positioning system coordinates and old positioning system coordinates, and coordinate values of X, Y coordinates corresponding to the new positioning system coordinates, and the old positioning system coordinates, respectively, and has input means for entering each of the latitude/longitude and the coordinate values, block number selecting means for finding in which of the blocks each of the latitude/longitude and the coordinate values are located, unit number selecting means for finding in which of the units in the block found by the block number selecting means each of the latitude/longitude and the coordinate values are located, mesh number selecting means for finding in which of the meshes in the unit found by the unit number selecting means each of the latitude/longitude and the coordinate values are located, output means for calculating and delivering the latitude/longitude, and the coordinate values corresponding to the position in the mesh code representation, home position setting means for identifying a position by omitting the unit number and entering only the mesh number when data is entered, mesh code input means for entering the mesh code having a selected number of digits in accordance with an application from among the block number, the unit number, and the mesh number, and mesh code output means for selecting and delivering a number of digits required in accordance with an application from among the mesh code composed of the block number, the unit number, and the mesh number.

The coordinate mutual conversion module of the present invention configured as described above can readily convert mutually the mesh code and the coordinate values of the X, Y coordinates based on the longitude/latitude of the new and old positioning system coordinates or the 19-coordinate system.

When the new positioning system coordinates were announced, the Geographical Survey Institute provided TKY2JDG as a program for showing the relationship among the latitude/longitude of the old Japan positioning system, the latitude/longitude of the new positioning system coordinates, and the X, Y coordinates based on the 19-coordinate system corresponding to both. The coordinate mutual conversion module of the present invention provides a module for mutually converting one coordinate system selected from them and a mesh code (for example, the N-code disclosed in JP-A-2000-181345).

In this regard, since errors between the Japan new positioning system coordinates and a WGS84 coordinate system used by the global positioning system are very small, they can be practically regarded to be the same without any problem, so that the coordinate mutual conversion module can be utilized as a conversion module between the mesh code and WGS84.

Also, the coordinate conversion module of the present invention, when utilized internationally, can convert the UTM coordinates, rather than the 19-coordinate system, to a mesh code. The mesh code, due to its structure, does not need block number 6A, for example, when it is used in Japan. Also, since the unit size has approximately 50 km on all sides, it can cover an area significantly wider than an area in which calls can be placed with one area code. Therefore, the mesh code can omit the block number and unit number within approximately 50 km on all sides, i.e., within a field of activity in daily life, thus requiring only a smaller number of digits. On the other hand, the mesh code can omit the mesh number if an accuracy of approximately 50 km is sufficient, such as when typhoon information or a position in a foreign country is represented. In this regard, when the mesh code is referred to in the following description, this means in principle a mesh code having a number of digits which is selected as required, as described above.

A geographic information system according to the present invention is a geographic information system which has the coordinate mutual conversion module of the present invention, and a database including the latitude/longitude and the coordinate values for managing digitized maps on a computer to display a position, wherein the coordinate mutual conversion module converts the latitude/longitude and the coordinate values of the database to the mesh code to utilize the database, and converts the latitude/longitude and the coordinate values to a mesh code to create a database based on the mesh code. Specifically, the geographic information system of the present invention can convert a database, which has been arranged in accordance with the latitude/longitude and X, Y coordinates of the old positioning coordinates, and the latitude/longitude and X, Y coordinates of the new positioning system coordinates, to mesh codes, and orders the mesh codes such that conventional database resources can be utilized by entering a mesh code.

Also, as described above, since a required number of digits of the mesh code that is entered into the coordinate conversion module of the present invention can be selected in accordance with an application, the entry operation can be largely reduced as compared with before. Stated another way, since the geographic information system-having the coordinate conversion module of the present invention can select a number of digits for a mesh code required in accordance with an application, the system facilitates searches at arbitrary scales, such as world cultural circles, countries, cities, regions, buildings, street lamps, and the like.

Also, the geographic information system of the present invention may have display means for displaying a map with the mesh code superimposed thereon, direct input means for entering an arbitrary position as the mesh code having a selected number of digits, and means for searching for a position based on the mesh code for the arbitrary position or for searching for a position based on the mesh code entered through the direct input means.

As described above, since there are very small errors between the Japan new positioning system coordinates and the WGS84 coordinate system used in the global positioning system, they can be practically regarded as the same without any problem. Thus, a global positioning system of the present invention is a global positioning system which has the coordinate conversion module of the present invention for acquiring information on a current position from a coordinate system for the global positioning system, wherein the global positioning system regards acquired information on latitude/longitude as the same as the latitude/longitude of the new positioning system coordinates, converts the acquired information to the mesh code by the coordinate mutual conversion module, and delivers the mesh code.

The global positioning system currently in use generates the latitude/longitude coordinates of WGS84. The latitude/longitude are generally hard to use, almost all maps available on the market in Japan are based on the latitude/longitude of the old positioning system, and WGS84 presents a deviation of 400-500 meters from this coordinate system, so that there is a variety of obstacles. The global positioning system of the present invention provides a means for solving these problems, and employs the coordinate conversion module of the present invention as its approach. The global positioning system using the coordinate conversion module of the present invention enables information generated in the latitude/longitude of WGS84 to be delivered in a selected coordinate system or in a mesh code having a selected number of digits, thus making it possible to improve the convenience.

In this regard, the global positioning system currently used in Japan utilizes temporal information sent from a plurality of artificial satellites and converted to the latitude/longitude of WGS84, whereas the global positioning system of the present invention can directly calculate a mesh code from temporal information and deliver the mesh code without conversion to latitude/longitude information of WGS84. Also, there is a Galileo plan in Europe to beat the GPS of the United States, and there is also a plan to position satellites in Japan. The global positioning system of the present invention can also convert positional information of these plans to mesh codes and deliver the mesh codes.

A portable terminal of the present invention is a portable terminal that includes the global positioning system of the present invention, which has direct input means for entering an arbitrary position as the mesh code having a selected number of digits, and a function for displaying a current position, a map around a destination, as required, together with the mesh code having the selected number of digits, and displaying a distance and a direction to the destination.

Specifically, the portable terminal of the present invention facilitates an entry operation because the position of a destination can be manually entered thereinto directly using a mesh code having a selected number of digits. Also, since the portable terminal of the present invention displays and delivers positional information acquired by the global positioning system as represented by the mesh code having the selected number of digits, the display provides an easy-to-understand direction to the destination and distance to the destination, and is easy to view.

The portable terminal of the present invention may also have means for entering and delivering the mesh code having a number of digits selected in accordance with an application by voice, in which case, it is possible to provide a convenient function for those who have difficulty reading maps, visually impaired persons, senior citizens and the like.

The portable terminal of the present invention may also have image pick-up means for picking up an image, image recording means for recording the mesh codes for a picked-up position acquired by the global positioning system or for recording the mesh code entered through the direct input means, the mesh code superimposed on the picked-up image, and transmitting means for transmitting the image recorded by the image recording means.

An image pick-up apparatus of the present invention is an image pick-up apparatus that has the global positioning system of the present invention, for recording a picked-up image, which has direct input means for entering a current position as the mesh code having a selected number of digits, and means for superimposing the mesh codes for positional information on a picked-up position acquired by the global positioning system or for superimposing the mesh code entered through the direct input means on the picked-up image. This image pick-up apparatus includes a television camera as well.

The image pick-up apparatus of the present invention may also has calculating means for calculating the mesh code for the position of a subject based on the distance from the image pick-up apparatus to the subject, and a direction of the subject to the image pick-up apparatus, and means for displaying the mesh code calculated by the calculating means with a selected number of digits on a picked-up image. Specifically, the image pick-up apparatus of the present invention may calculate a mesh code for the position of a subject by combining the acquired position, the distance to the subject measured by an automatic focusing device or the like, and may have an orientation measuring device, and display the mesh code in part of the picked-up image. Also, the image pick-up apparatus of the present invention may make a calculation including a depression angle as well, when photographed from an aircraft, to calculate the mesh code for a position, and superimpose the mesh code on an image of a disaster area photographed from the sky at the time of a disaster or the like.

The conventional navigation system employs the address, registered telephone number, target, postal code and the like for a search, but there is only very limited space for entering a destination. Also, disadvantageously, while the current position is pinpointed and displayed on a map screen, even if one attempts to ask for help when encountering an accident in a mountain region, there is no means for easily informing the position to others through a portable telephone or the like unless there is a conspicuous landmark on the screen.

A navigation system of the present invention provides a means for solving above disadvantages. The navigation system of the present invention is a navigation system comprising the global positioning system of the present invention, for detecting the current position of a mobile unit, and for searching for an itinerary from the detected current position to a destination, the navigation system has direct input means for entering a destination as the mesh code having a selected number of digits, means for displaying the current position by the mesh code having the selected number of digits, and means for searching a position with the mesh code having the selected number of digits. The navigation system of the present invention not only simply displays information on a current position as a point on a map screen, but displays it together with the mesh code, and can therefore readily transmit positional information to others. Also, since the navigation system of the present invention comprises the direct input means for manually entering a destination through the mesh code, the entry can be made through the mesh code with a small number of digits in a readily understandable manner even for a place where there is no address, telephone number or landmark object, such as a mountain region or the like, not limited to urban areas.

When high accuracy is required in surveys or the like, the new positioning system coordinates must correspond to the mesh codes, but the coordinates generated by the global positioning system (GPS) are those of WGS84, and there is an error of several centimeters between these coordinates and the new positioning system coordinates. Therefore, the navigation system of the present invention which employs the global positioning system of the present invention, that utilizes the WGS84 coordinates generated from the GPS, regarded as the new positioning system coordinates, has no problem in practice for general utilization such as a navigation system for mobile units such as vehicles, in which errors of several meters are allowed.

The navigation system of the present invention may also have means for transmitting a mesh code for positional information acquired by the global positioning system, or for transmitting the mesh code entered by direct input means. In this event, the navigation system can efficiently provide support in the event of an accident and the like by transmitting acquired positional information or mesh code.

Also, the navigation system of the present invention may have means for recording and printing the mesh code for an acquired arbitrary position. The navigation system of the present invention, when the navigation is installed in a taxi, can provide services of describing a place at which a passenger takes the taxi, and a place at which the passenger gets off the taxi on a receipt, or can readily communicate a destination the next time the passenger takes the taxi.

A mobile unit of the present invention is a mobile unit comprising the global positioning system of the present invention, which is a mobile unit selected from a group comprising a ship and an aircraft.

A television camera of the present invention is an on-site shooting television camera comprising the global positioning system of the present invention, which has direct input means for entering the current position of the television camera or a position of subject as a mesh code having a selected number of digits, and has display means for displaying a mesh code for information on the position of the television camera acquired by the global positioning system, or for displaying a mesh code entered through the direct input means on a picked-up image.

A vehicle management system of the present invention is a vehicle management system having a vehicle and a management center for managing an operation of the vehicle, wherein the vehicle has the global positioning system of the present invention, the global positioning system has display means for displaying a current position and a destination as represented by the mesh code having a selected number of digits, an itinerary from the current position to the destination, and a map, search means for searching for the itinerary of the vehicle, and for the current position and the destination position using the mesh code having the selected number of digits, input means for entering the destination as represented by the mesh code having the selected number of digits, means for receiving the mesh code transmitted from the management center, transmitting means for transmitting a signal indicative of the current position, and recording means for recording a variety of information including information on the position of the vehicle at each hour, and the management center includes managing means which has means for entering a destination as represented by the mesh code having the selected number of digits, means for displaying the current position of the vehicle, means for searching for the current position and the destination of the vehicle using the mesh code having the selected number of digits, means for transmitting the mesh code having the selected number of digits to the vehicle, and information recording means for recording a variety of information including the information on the position of the vehicle at each hour.

A server for managing the operation of a vehicle having a global positioning system of the present invention has means for entering a destination as represented by the mesh code having a selected number of digits, means for displaying the current position of the vehicle, means for searching for the current position and a destination of the vehicle using the mesh code having the selected number of digits, and means for transmitting the mesh code having the selected number of digits to the vehicle.

A program for causing a computer to execute processing for managing an operation of a vehicle having the global positioning system of the present invention, is a program which causes the computer to execute processing for entering a destination as represented by the mesh code having a selected number of digits, processing for displaying the current position of the vehicle, processing for searching for the current position and a destination of the vehicle using the mesh code having the selected number of digits, and processing for transmitting the mesh code having the selected number of digits to the vehicle.

For reference sake, in the present invention, when the invention has the direct input means, the user can manually enter a mesh code for a position, if known, through the direct input means even if information on the mesh code cannot be acquired, such as when the global positioning system cannot receive information from artificial satellites in a room or the like.

A program of the present invention is a program for causing a computer to execute processing for mutually converting a mesh code for displaying a position in the combination of the block number of a block, the unit number of a unit, and the mesh number of a mesh, wherein a world map is divided into six in the east-west direction along longitudes at intervals of 60 degrees, and divided into at least three in the south-north direction along latitudes to define a plurality of numbered blocks, each of the which is divided into 100 in the east-west direction and in the south-north direction, respectively, to define a plurality of numbered units in a square shape, and each of the units is divided into $10''$ in the east-west direction and in the north-south direction, respectively, to define a plurality of numbered meshes in a square shape, and for mutually converting respective latitudes and longitudes of new positioning system coordinates and old positioning system coordinates, and coordinate values of X, Y coordinates corresponding to the new positioning system coordinates, and the old positioning system coordinates, respectively. The program causes the computer to execute block number selection processing to find in which of the blocks each of the entered latitude/longitude and the coordinate values are located, unit number selection processing to find in which of the units in the block, found by the block number selection processing, each of the latitude/longitude and the coordinate values are located, mesh number selection processing to find in which of the meshes, in the unit selected by unit number selection processing each of the latitude/longitude and the coordinate values are located, home position setting processing to identify a position by omitting the unit number and entering only the mesh number when data is entered, mesh code output processing to select and deliver the number of digits required in accordance with an application from among the mesh code composed of the block number, the unit number, and the mesh number, mesh code input processing to enter the mesh code having the number of digits selected in accordance with an application from among the block number, the unit number, and the mesh number, and output processing to calculate and deliver the latitude/longitude, and the coordinate values corresponding to the position represented by the mesh code.

As described above, according to the present invention, it is possible to readily convert mutually the mesh code including the N-code, which provides coordinates easy to understand, and convert mutually the coordinates of the old Japan positioning system coordinates and the new positioning system coordinates. Also, since the coordinate conversion module of the present invention can apply the N-code to a geographic information system, a global positioning system, a portable telephone, an image pick-up apparatus, a navigation system, an on-site shooting television camera, and a vehicle management system, they can be improved in convenience.

BEST MODE FOR CARRYING OUT THE INVENTION

Next, one embodiment of the present invention will be described with reference to the drawings.

First, the outline of the present invention will be described.

The present invention is a module for mutually converting a mesh code and for mutually converting the global positioning system coordinates (WGS84), the Japan Positioning System Coordinates (old positioning system), and positioning results 2000 (new positioning system). The mesh code which divides a world map in a mesh form into six blocks in the east-west direction along longitudes of every 60 degrees and at least three blocks in the south-north direction along the latitudes, each of which is divided into 100 units having a substantially square shape in the east-west direction and south-north direction, respectively, each of which is divided into $10''$ meshes having a substantially square shape in the east-west direction and south-north direction, for example, a global mesh code (N-code) disclosed in JP-A-2000-181345.

In the following, a description will be given of the summary of the N-code and the affinity of a map with the N-code.

Figure 1:
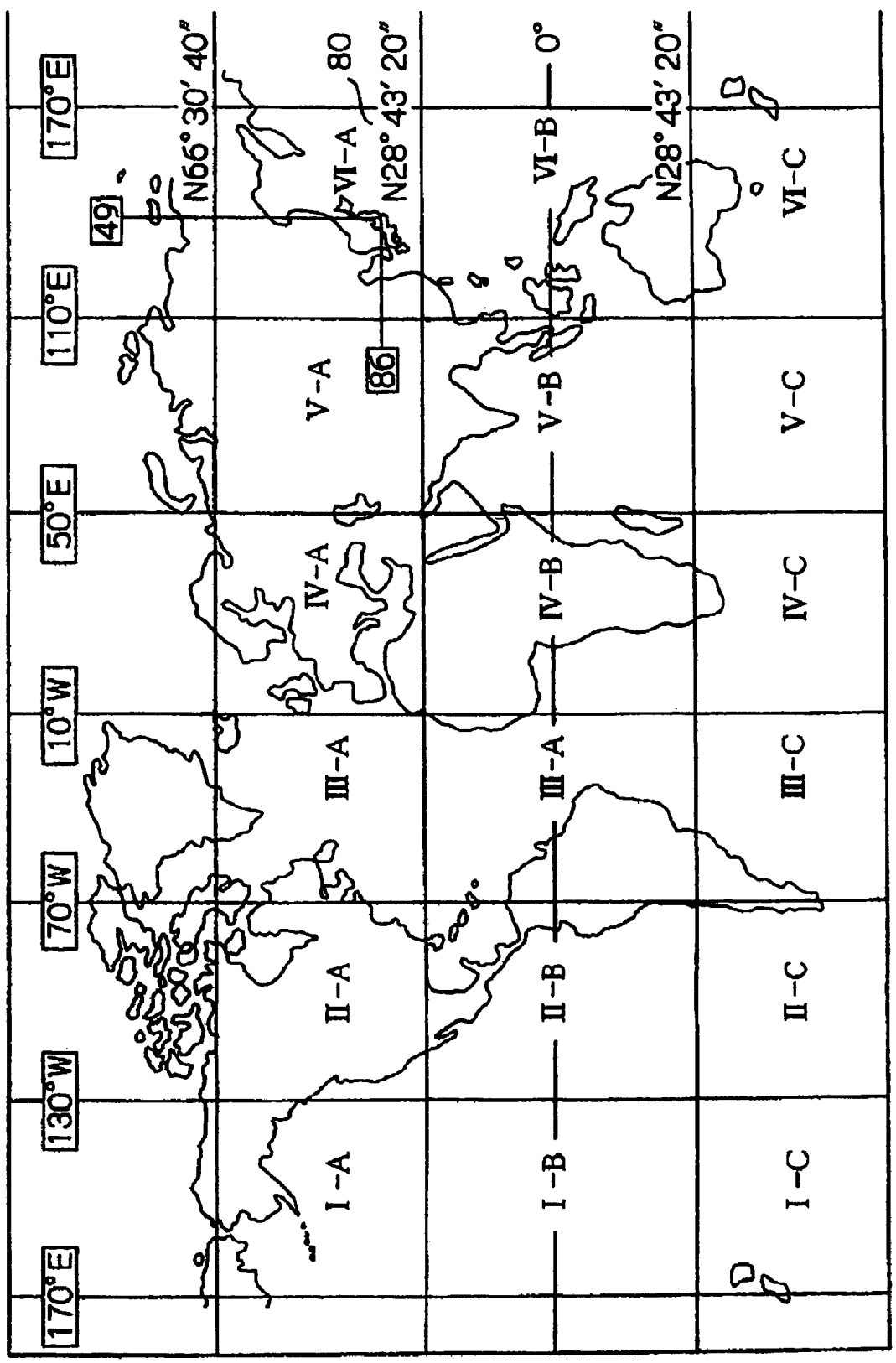
[FIG. 1]
An N-code based world block diagram which can be applied to a conversion module according to one embodiment of the present invention.

FIG. 1 is a world block diagram according to the N-code.

The N-code divides the world map into blocks 80 that are labeled block numbers 1A-6C, which basically have the shape of a square, in east-west and south-north directions, divided into six in the east-west direction along the longitudes at intervals of 60 degrees, and divided into three in the south-north direction along the latitudes, and the N-code divides each block 80 into 100 units (00-99) in the east-west direction and into 100 units (00-99) in the south-north direction in a substantially square shape.

The N-code can be described as having a lattice shape on an electronic map and a paper map, and blocks 80 of the N-code quite fairly divide the world substantially into cultural areas. As illustrated in FIG. 1, the Far East is located in 6A; Europe in 4A; North America in 2A; South America in 3B; Africa in 4B; India in 5B; and Indonesia and Australia in 6B.

Figure 2:
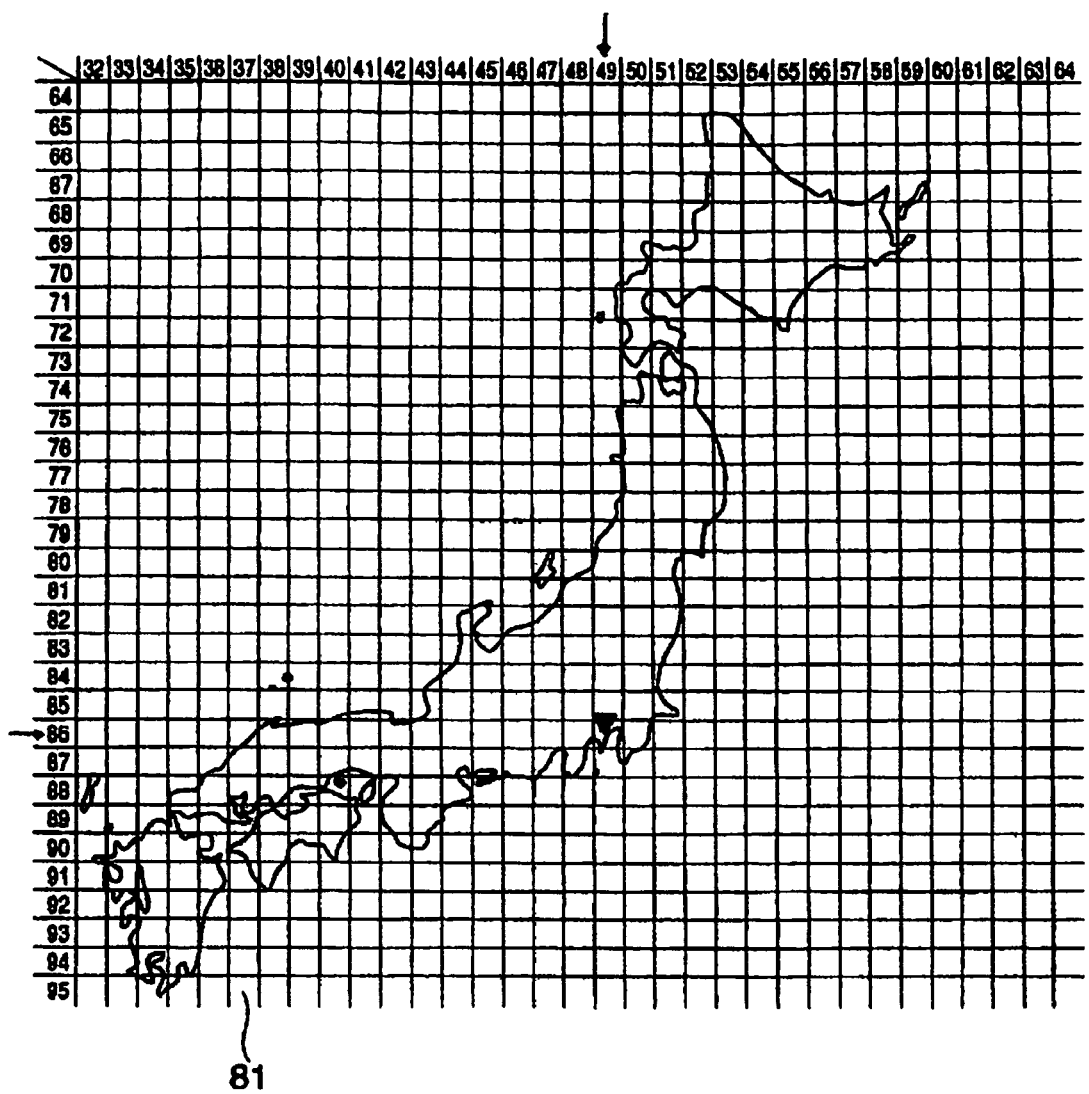
[FIG. 2]
A map which illustrates areas in the east-west direction 32-64 and south-north direction 64-95 within block 6A shown in FIG. 1.

FIG. 2 is a map which illustrates the areas of 32-64 in the east-west direction and 64-95 in the south-north direction among units 80 within block 6A illustrated in FIG. 1. In FIG. 2, the entire area of Japan is displayed, and when principal cities are designated by unit numbers of the N-code, Tokyo, for example, is represented by a four-digit unit number 4986 which is a combination of number 49 in the east-west direction and number 86 in the south-north direction. Also, Sapporo is represented by 5270; and Osaka by 4288. Since the N-code can continuously represent any position in all areas of Japan by a single system with sequential numbers of the N-code, it is considered to be effective in broader-based local government and the like, as compared with the planar orthogonal coordinates which divide Japan by 19 origins.

Figure 3:
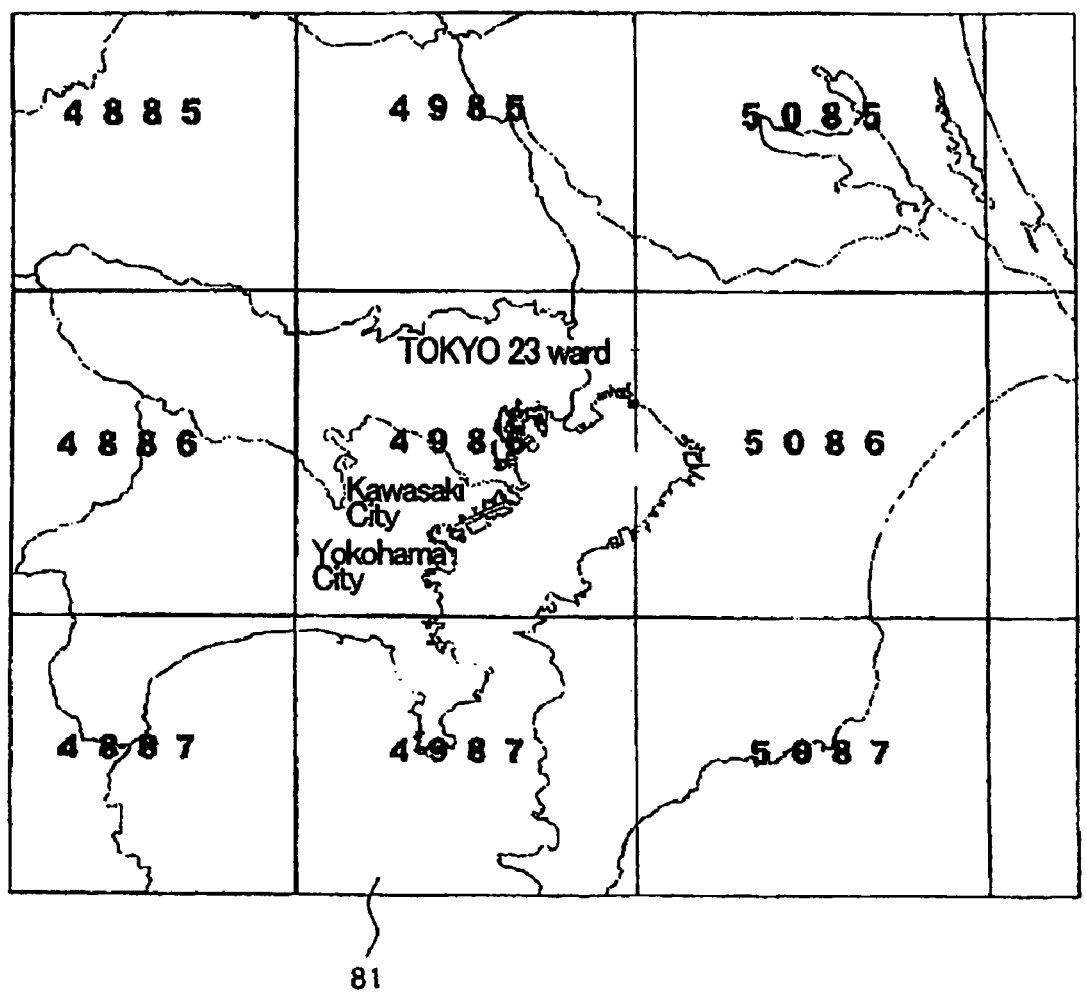
[FIG. 3]
A map which displays near unit number 4986 that includes 23 wards of Tokyo City, Kawasaki City, and Yokohama City.

FIG. 3 is a map which displays unit 81 near unit number 4986 that includes 23 wards of Tokyo, Kawasaki City, and Yokohama City. One unit 81 has an area that is much wider than an area in which a call can be made with one area code. In other words, unit 81 of the N-code have a sufficiently effective area for representing a field of activity when it is used at city, town, and village levels or in daily life.

Also, since the N-code represents the units and meshes with sequential decimal numbers, even in a prefecture which extends over units, an adjacent code number can be readily estimated, so that the position can be readily understood.

Figure 4:
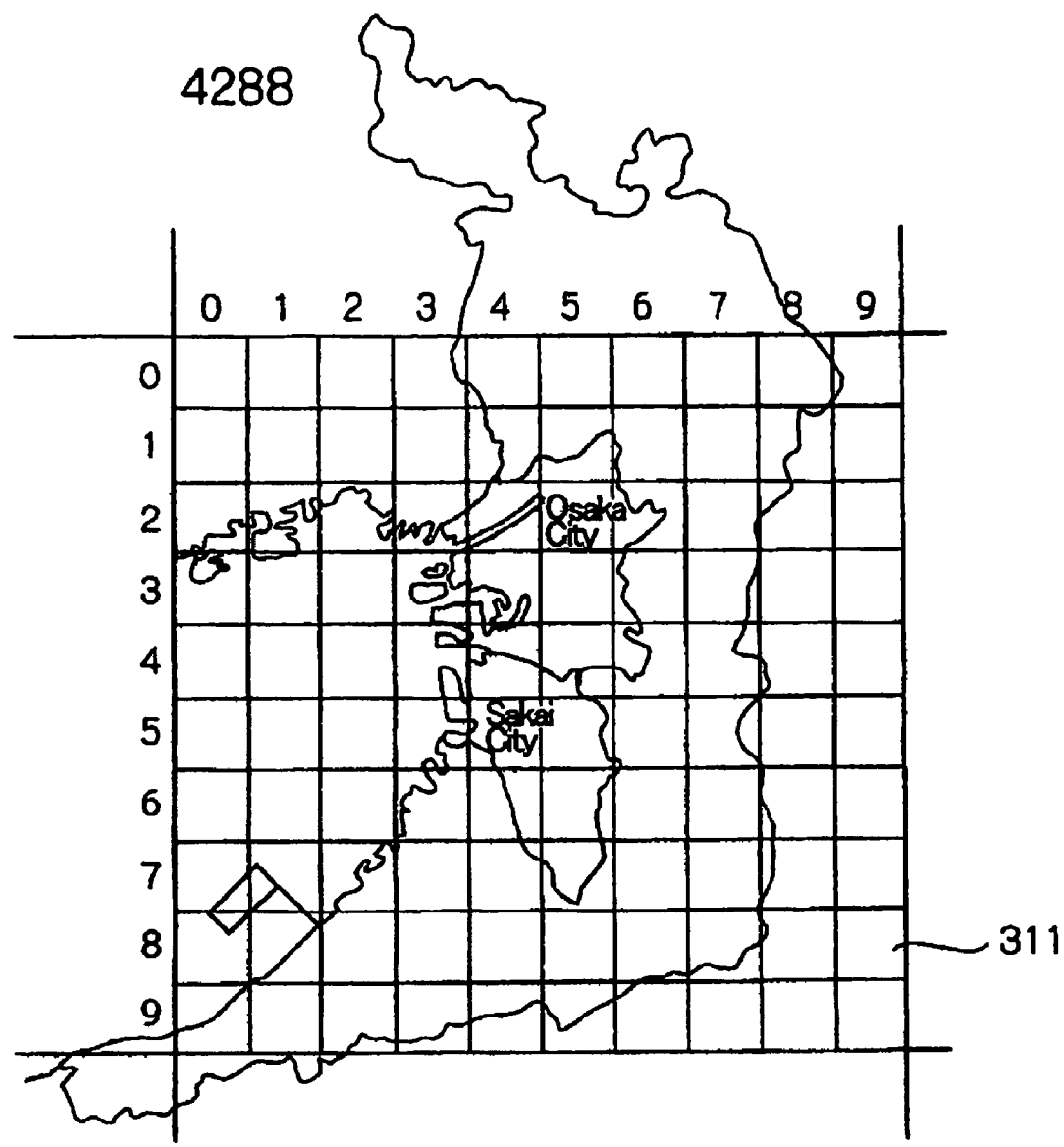
[FIG. 4]
A map which divides unit number 4288 into ten section in the east-west direction and in the south-north direction, respectively, into 5-km meshes.

FIG. 4 is a map of unit number 4288 which is 50 km long on all sides that is divided into ten in the east-west direction and in the south-north direction, respectively, into 5-km meshes which have 5 km on a side. As illustrated in FIG. 4, since unit number 4288 includes the main region of Osaka prefecture such as Osaka City and Sakai City, positional information can be represented in unit number 4288, while omitting unit number 4288, in a manner similar to the omission of the area code of a telephone within one administrative division. Also, the N-code can exhaustively represent positions regardless of whether they are on land or ocean, and can estimate a relative direction and a distance between two positions by the difference in magnitude between numbers.

Figure 5:
[FIG. 5]
A map which shows a 50-meter mesh near Sakai municipal office.

FIG. 5 is a map illustrating 50-meter meshes (meshes 3111 each having 50 m on a side) near Sakai municipal office. The direction and distance of relative positions between the municipal office and a surrounding building or the like can be intuitively estimated from the difference between N-codes.

While the foregoing description has been given of the utilization of the N-code in Japan, the way of arranging numbers of the N-code is the same as in a spread sheet program, and is a code system which covers entire the world. Therefore, a description will be given showing the convenience of using the N-code for foreign countries. The N-code divisions are very well suited for the western hemisphere such as Europe, North America Cultural zone, and the like. The conventional system was intuitively difficult to use because the longitude value increased from right to left in the western hemisphere in a reverse order to the ordinary sequence of numbers. On the other hand, in the sequences of numbers in the N-code, numbers increase from left to right in the east-west direction, and increase from north to south in the south-north direction, i.e., ordinary sequences of numbers, which are unified over the world.

The conversion module of this embodiment is a module for mutually converting the N-code which has the foregoing features, and the latitude/longitude and X, Y coordinates of the old Japan positioning system coordinates and the new positioning system coordinates.

Figure 6:
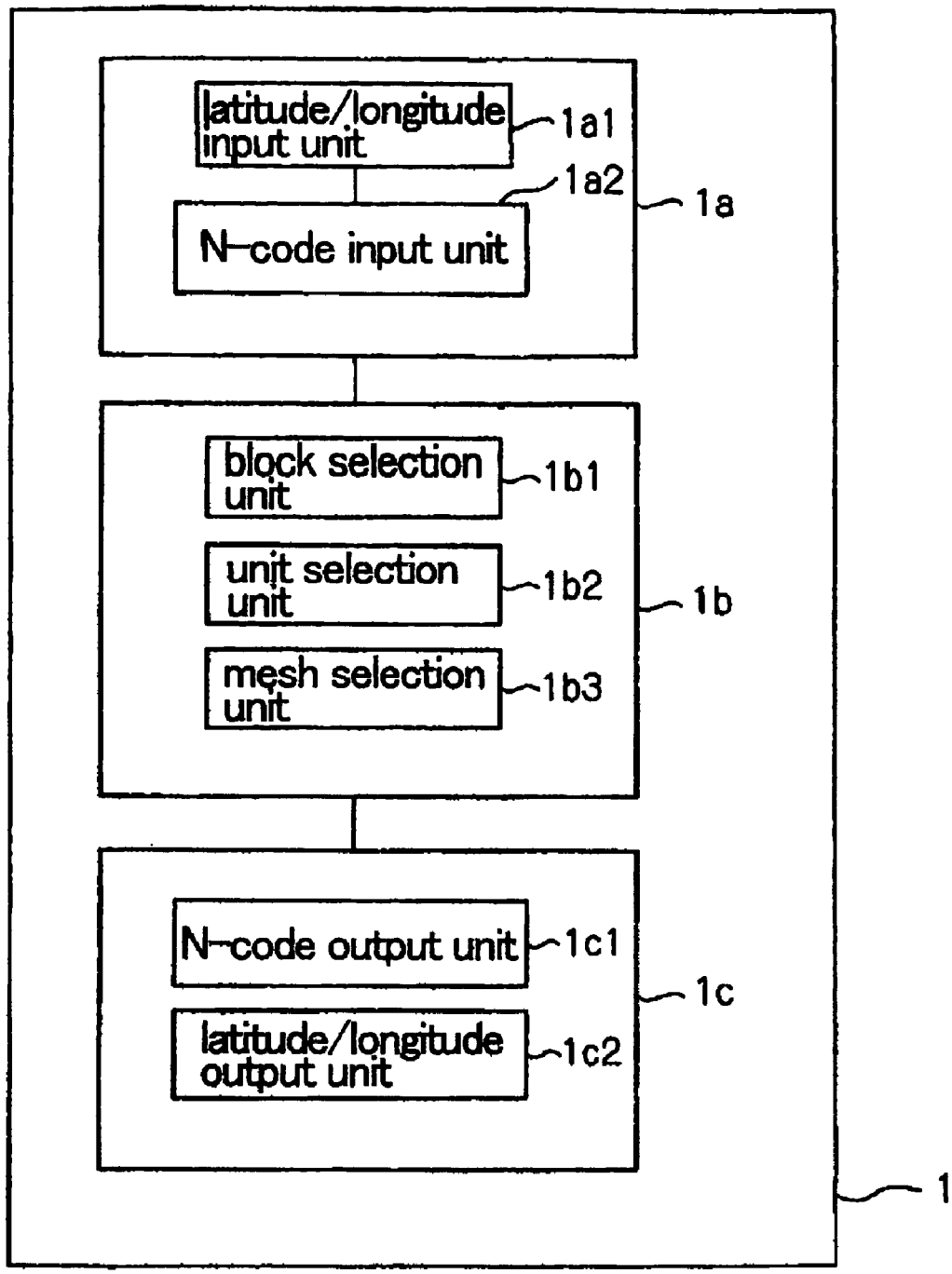
[FIG. 6]
A block configuration of a conversion module which is one embodiment of the present invention.
Figure 7:
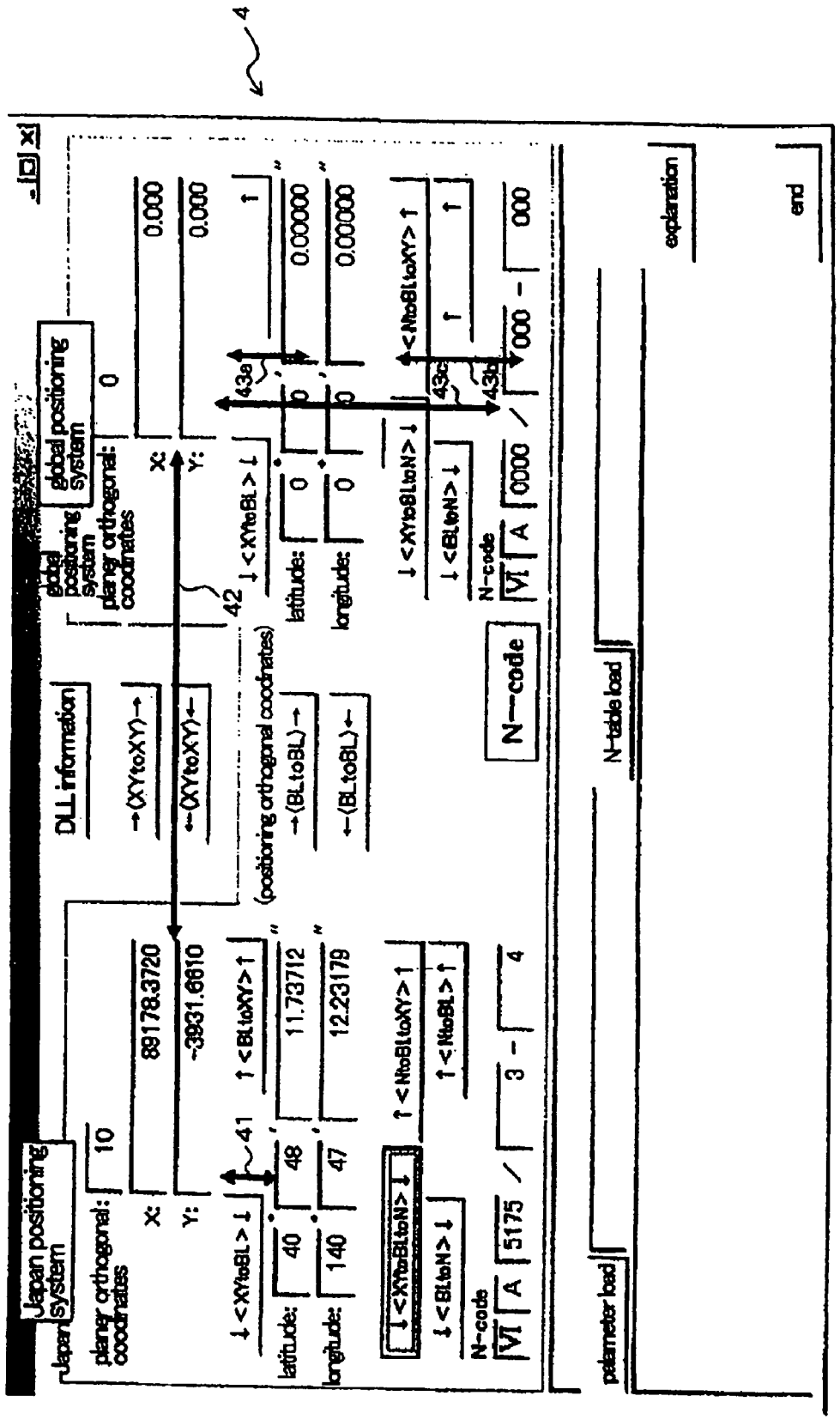
[FIG. 7]
An exemplary monitor screen when the conversion module, which is one embodiment of the present invention, is incorporated in a map information system.

FIGS. 6(a) and (b) are a block relation diagram and a functional diagram of the conversion module of this embodiment. FIG. 7 is a diagram illustrating a monitor screen when the conversion module for mutually converting the N-code and the latitude/longitude or X, Y coordinates, which is one embodiment of the present invention, is incorporated in a geographical information system. Also, Table 1-a and Table 1-b are tables for showing arguments associated with the conversion module for mutually converting the N-code and the latitude/longitude, which is one embodiment of the present invention.

TABLE 1-a

PANcdNToB
(table, Jb, Jl, Jx, Jy, Wb, Wl, Wx, Wy, Int, Nb, Nu, New, Nnw)

| Arguments | table | Latitude/Longitude N-code Conversion Table |
|---|---|---|
| | Jb | Latitude (Japan Positioning System) |
| | Jl | Longitude (Japan Positioning System) |
| | Jx | Planar Orthogonal Coordinate x (Japan Positioning System) |
| | Jy | Planar Orthogonal Coordinate y (Japan Positioning System) |
| | Wb | Latitude (Global Positioning System) |
| | Wl | Longitude (Global Positioning System) |
| | Wx | Planar Orthogonal Coordinate x (Global Positioning System) |
| | Wy | Planar Orthogonal Coordinate y (Global Positioning System) |
| | Int | Mesh Scale of N-code |
| | Nb | Block Number of N-code |
| | Nu | Unit Number of N-code |
| | New | East-West Mesh Number of N-code |
| | Nnw | South-North Mesh Number of N-code |
| Return Value | TRUE/FALSE | Normal Processing/Abnormal Processing |

TABLE 1-b

PANcdBToN
(table, Nb, Nu, New, Nnw, Jb, Jl, Jx, Jy, Wb, Wl, Wx, Wy)

| Arguments | table | Latitude/Longitude N-code Conversion Table |
|---|---|---|
| | Nb | Block Number of N-code |
| | Nu | Unit Number of N-code |
| | New | East-West Mesh Number of N-code |
| | Nnw | South-North Mesh Number of N-code |

TABLE 1-b-continued

PANcdBToN
(table, Nb, Nu, New, Nnw, Jb, Jl, Jx, Jy, Wb, Wl, Wx, Wy)

| | Jb | Latitude (Japan Positioning System) |
|---|---|---|
| | Jl | Longitude (Japan Positioning System) |
| | Jx | Planar Orthogonal Coordinate x (Japan Positioning System) |
| | Jy | Planar Orthogonal Coordinate y (Japan Positioning System) |
| | Wb | Latitude (Global Positioning System) |
| | Wl | Longitude (Global Positioning System) |
| | Wx | Planar Orthogonal Coordinate x (Global Positioning System) |
| | Wy | Planar Orthogonal Coordinate y (Global Positioning System) |
| Return Value | TRUE/FALSE | Normal Processing/Abnormal Processing |

Conversion module 1 comprises input unit 1a which has input unit 1a1 for receiving latitudes and longitudes of the old Japan positioning system coordinates and the new positioning system coordinates or X, Y coordinates corresponding to the respective ones, and comprises N-code input unit 1a2 for receiving a block number and the like in accordance with the N-code (including an N-code having a number of digits selected in accordance with an application); a selection unit 1b which has a block selection unit 1b1 for selecting a block corresponding to applied latitude/longitude, a unit selection unit 1b2 for selecting a unit, a mesh selection unit 1b3 for selecting a mesh, and a latitude/longitude—Node conversion table; and output unit 1c which has code output unit 1c1 for delivering an N-code generated from a block number, a unit number, and a mesh number selected by selection unit 1b; and longitude/latitude output unit 1c2 for deriving longitude/latitude corresponding to the N-code composed of a block number, a unit number, and a mesh number received by N-code input unit 1a2 to deliver the longitude/latitude.

In Table 1-a, the conversion module of this invention, designated by PANodNToB (table, Jb, Jl, Jx, Jy, Wb, Wl, Wx, Wy, Int, Nb, Nu, New, Nnw), delivers an N-code by applying the latitude/longitude or X, Y coordinates of the old Japan positioning system coordinates or new positioning system coordinates to the conversion module of the present invention as input data. For arguments, the conversion module of this embodiment employs, other than the longitude/latitude—N-code conversion table, longitude Jb, latitude Jl of the old Japan positioning system, x-coordinate Jx, y-coordinate Jy of the plan orthogonal coordinates of the old Japan positioning system, latitude Wb, longitude Wl of the new positioning system coordinates, and x-coordinate Wx, y-coordinate Wy of the planar orthogonal coordinates of the new positioning system coordinates as input arguments, and mesh scale Int, block number Nb, unit number Nu, east-west mesh number New, and south-north mesh number Nns of the N-code as output arguments.

Also, the conversion module of this embodiment designated by PANcdBToN (table, Nb, Nu, New, Nnw, Jb, Jl, Jx, Jy, Wb, Wl, Wx, Wy) in Table 1-b, contrary to the conversion module shown in Table 1-a, delivers the latitude/longitude or X, Y coordinates of the old Japan positioning system coordinates or new positioning system coordinates by applying an N-code to the conversion module of the present invention as input data. Specifically, for arguments, the conversion module shown in Table 1-b employs, other than the latitude/longitude N-code conversion table, block number Nb, unit number Nu, east-west mesh number New, and south-north mesh number Nns of the N-ode as input arguments, and latitude Jb, longitude Jl of the old Japan positioning system, x-coordinate Jx, y-coordinate Jy of the planar orthogonal coordinates of the old Japan positioning system, latitude Wb, longitude Wl of the new positioning system coordinates, and x-coordinate Wx, y-coordinate Wy of the planar orthogonal coordinates of the new positioning system coordinates as output arguments.

Each of the input arguments shown in Table 1-a, Table 1-b is entered on screen 4 shown in FIG. 7, and converted output arguments are displayed thereon. In FIG. 7, arrow 41 represents a conversion between planar orthogonal coordinates Jx, Jy of the old Japan positioning system and latitude Jb, longitude Jl of the old Japan Positioning system. Arrow 42 represents a conversion between latitude Jb, longitude Jl of the old Japan positioning system and latitude Wb, longitude Wl of the new positioning system coordinates. Arrow 43a represents a conversion between latitude Wb, longitude Wl of the new positioning system coordinates and planar orthogonal coordinates Wx, Wy of the new positioning system coordinates. Arrow 43b represents a conversion between latitude Wb, longitude Wl of the new positioning system coordinates and block number Nb, unit number Nu, east-west mesh number New, and south-north mesh number Nns of the N-code. Arrow 43c represents a conversion between planar orthogonal coordinates Wx, Wy of the new positioning coordinates and block number Nb, unit number Nu, east-west mesh number New, and south-north number Nns of the N-code.

For example, the acquisition of the N-code by applying positional information in the planar orthogonal coordinate system of the old Japan positioning system from a geographical information system, is performed by entering planar orthogonal coordinates Jx, Jy, and specifying mesh scale Int of the N-code. For example, for a 5-km mesh, the user specifies 10 as ⅒ of 50-km on all sides of the unit. Similarly, the user specifies 100 for a 500-meter mesh, 1000 for a 50-meter mesh, and 10000 for a 5-meter mesh. The conversion module of this embodiment returns TRUE when the entered result is correct information, and FALSE if the entered value is not correct as a return value. The conversion module of this embodiment calculates an N-code including a position specified in input information as a result if correct information is entered, and delivers block number Nb, unit number Nu, and east-west number New, south-north mesh number Nns of specified mesh scale Int.

Also, when the user wishes to convert an N-code, for example, 6A, 4288/526-567, to the latitude/longitude or X, Y coordinates, the user enters east-west mesh number New as 2565 added "5" to the end of numbers 256 which is east-west mesh number New, south-north mesh number Nns as 5675 added "5" to the end of 567 which is south-north mesh number, Nns of block number Nb equal to 6A and unit number Nu equal to 4288. The conversion module of this embodiment returns TRUE as a return value if the entry result is correct information, and returns FALSE if the processing is abnormal, and calculates the position of the center of a mesh which the user wishes to convert. Also, the conversion module of this embodiment calculates a north-west end of the mesh if "5" is not added.

Figure 8:
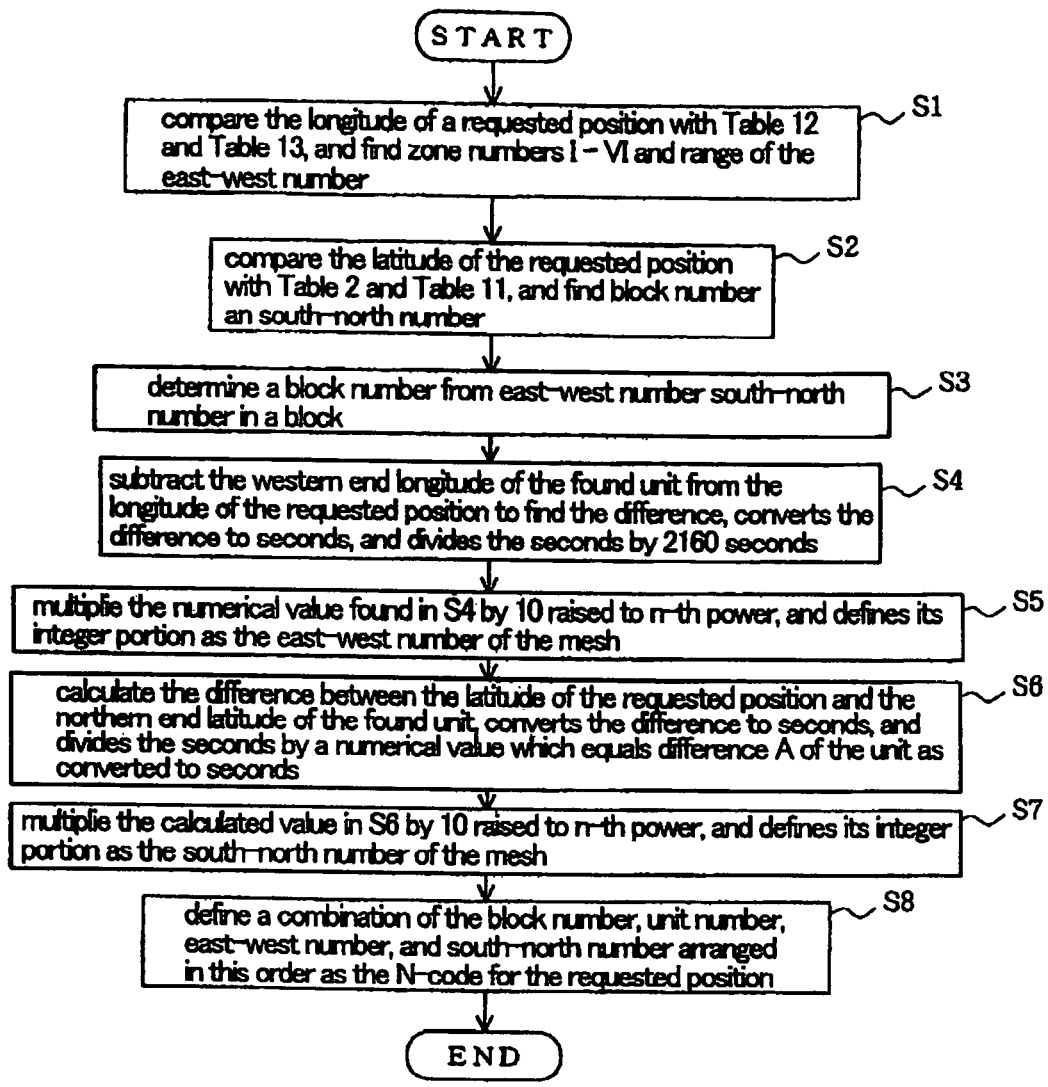
[FIG. 8]
A flow chart which illustrates a conversion process of the conversion module which is one embodiment of the present invention.

Next, a process of converting latitude/longitude data to an N-code using latitude/longitude-N-code conversion tables in Table 2-Table 13, stored in this conversion module, will be described using a flow chart illustrated in FIG. 8.

Table 2-Table 11, used in the following description, are calculation tables for a southern end latitude of a unit in the northern hemisphere, and for a northern end latitude and a unit shape in the southern hemisphere, and Table 12 and Table 13 are calculation tables for an eastern end longitude of each block of the N-code. Table 4 and Table 5 correspond to an A-block in FIG. 1; Table 6 and Table 7 correspond to a B-block in FIG. 1; and Table 8 and Table 9 correspond to a C-block in FIG. 1.

Table 2 and Table 3 are calculation tables corresponding to an X-block which divides the arctic circle, and Table 10 and Table 11 are calculation tables corresponding to a Y-block which divides the antarctic circle. These X-block and Y-blocks are added to the A-C-blocks in accordance with N-code creation rules, 100 lines are drawn to define square meshes along the latitudes in both circles, and the arctic circle is designated by the X-block, while the antarctic circle is designated by the Y-block. In other words, the blocks used in this embodiment are such that the arctic circle and antarctic circle, which are not divided into blocks in the global mesh code disclosed in JP-A-2000-181345, are also divided into blocks according to the same rules.

For reference sake, Table 4, Table 5, and Table 6 are reproduced from Table 1-Table 3 disclosed in JP-A-2000-181345.

TABLE 2

| X - BLOCK (NO. 1) START POINT: 81° 39'30" NORTH LATITUDE | | | | | | | | |
|---|---|---|---|---|---|---|---|---|
| SOUTH-NORTH NUMBER | SOUTHERN END LATITUDE | | | CENTRAL LATITUDE | | | DIFFERENCE A | |
| | DE-GREES | MIN-UTES | SEC-ONDS | DE-GREES | MIN-UTES | SEC-ONDS | MIN-UTES | SEC-ONDS |
| 00 | 81 | 34 | 10 | 81 | 36 | 50 | 5 | 20 |
| 01 | 81 | 28 | 50 | 81 | 31 | 30 | 5 | 20 |
| 02 | 81 | 23 | 30 | 81 | 26 | 10 | 5 | 20 |
| 03 | 81 | 18 | 10 | 81 | 20 | 50 | 5 | 20 |
| 04 | 81 | 12 | 40 | 81 | 15 | 25 | 5 | 30 |
| 05 | 81 | 7 | 10 | 81 | 9 | 55 | 5 | 30 |
| 06 | 81 | 1 | 30 | 81 | 4 | 20 | 5 | 40 |
| 07 | 80 | 55 | 50 | 80 | 58 | 40 | 5 | 40 |
| 08 | 80 | 50 | 10 | 80 | 53 | 0 | 5 | 40 |
| 09 | 80 | 44 | 20 | 80 | 47 | 15 | 5 | 50 |
| 10 | 80 | 38 | 30 | 80 | 41 | 25 | 5 | 50 |
| 11 | 80 | 32 | 40 | 80 | 35 | 35 | 5 | 50 |
| 12 | 80 | 26 | 40 | 80 | 29 | 40 | 6 | 0 |
| 13 | 80 | 20 | 40 | 80 | 23 | 40 | 6 | 0 |
| 14 | 80 | 14 | 40 | 80 | 17 | 40 | 6 | 0 |

TABLE 2-continued

X - BLOCK (NO. 1) START POINT: 81° 39'30" NORTH LATITUDE

| | | | | | | | | |
|---|---|---|---|---|---|---|---|---|
| 15 | 80 | 8 | 30 | 80 | 11 | 35 | 6 | 10 |
| 16 | 80 | 2 | 20 | 80 | 5 | 25 | 6 | 10 |
| 17 | 79 | 56 | 0 | 79 | 59 | 10 | 6 | 20 |
| 18 | 79 | 49 | 40 | 79 | 52 | 50 | 6 | 20 |
| 19 | 79 | 43 | 20 | 79 | 46 | 30 | 6 | 20 |
| 20 | 79 | 36 | 50 | 79 | 40 | 5 | 6 | 30 |
| 21 | 79 | 30 | 20 | 79 | 33 | 35 | 6 | 30 |
| 22 | 79 | 23 | 40 | 79 | 27 | 0 | 6 | 40 |
| 23 | 79 | 17 | 0 | 79 | 20 | 20 | 6 | 40 |
| 24 | 79 | 10 | 20 | 79 | 13 | 40 | 6 | 40 |
| 25 | 79 | 3 | 30 | 79 | 6 | 55 | 6 | 50 |
| 26 | 78 | 56 | 40 | 79 | 0 | 5 | 6 | 50 |
| 27 | 78 | 49 | 40 | 78 | 53 | 10 | 7 | 0 |
| 28 | 78 | 42 | 40 | 78 | 46 | 10 | 7 | 0 |
| 29 | 78 | 35 | 40 | 78 | 39 | 10 | 7 | 0 |
| 30 | 78 | 28 | 30 | 78 | 32 | 5 | 7 | 10 |
| 31 | 78 | 21 | 20 | 78 | 24 | 55 | 7 | 10 |
| 32 | 78 | 14 | 0 | 78 | 17 | 40 | 7 | 20 |
| 33 | 78 | 6 | 40 | 78 | 10 | 20 | 7 | 20 |
| 34 | 77 | 59 | 10 | 78 | 2 | 55 | 7 | 30 |
| 35 | 77 | 51 | 40 | 77 | 55 | 25 | 7 | 30 |
| 36 | 77 | 44 | 0 | 77 | 47 | 50 | 7 | 40 |
| 37 | 77 | 36 | 20 | 77 | 40 | 10 | 7 | 40 |
| 38 | 77 | 28 | 30 | 77 | 32 | 25 | 7 | 50 |
| 39 | 77 | 20 | 40 | 77 | 24 | 35 | 7 | 50 |
| 40 | 77 | 12 | 40 | 77 | 16 | 40 | 8 | 0 |
| 41 | 77 | 4 | 40 | 77 | 8 | 40 | 8 | 0 |
| 42 | 76 | 56 | 30 | 77 | 0 | 35 | 8 | 10 |
| 43 | 76 | 48 | 20 | 76 | 52 | 25 | 8 | 10 |
| 44 | 76 | 40 | 0 | 76 | 44 | 10 | 8 | 20 |
| 45 | 76 | 31 | 40 | 76 | 35 | 50 | 8 | 20 |
| 46 | 76 | 23 | 10 | 76 | 27 | 25 | 8 | 30 |
| 47 | 76 | 14 | 40 | 76 | 18 | 55 | 8 | 30 |
| 48 | 76 | 6 | 0 | 76 | 10 | 20 | 8 | 40 |
| 49 | 75 | 57 | 20 | 76 | 1 | 40 | 8 | 40 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 00 | 0.1481 | 0.1466 | 0.1458 | −1.58 | 1.05 | 9.72 |
| 01 | 0.1481 | 0.1481 | 0.1474 | −0.52 | 1.04 | 9.83 |
| 02 | 0.1481 | 0.1497 | 0.1489 | 0.51 | 1.02 | 9.93 |
| 03 | 0.1481 | 0.1512 | 0.1504 | 1.53 | 1.01 | 10.03 |
| 04 | 0.1528 | 0.1528 | 0.1520 | −0.51 | 1.03 | 10.13 |
| 05 | 0.1528 | 0.1544 | 0.1536 | 0.53 | 1.02 | 10.24 |
| 06 | 0.1574 | 0.1560 | 0.1552 | −1.43 | 1.04 | 10.35 |
| 07 | 0.1574 | 0.1576 | 0.1568 | −0.38 | 1.03 | 10.45 |
| 08 | 0.1574 | 0.1593 | 0.1584 | 0.66 | 1.02 | 10.56 |
| 09 | 0.1620 | 0.1609 | 0.1601 | −1.21 | 1.04 | 10.67 |
| 10 | 0.1620 | 0.1626 | 0.1618 | −0.16 | 1.03 | 10.78 |
| 11 | 0.1620 | 0.1643 | 0.1634 | 0.86 | 1.02 | 10.90 |
| 12 | 0.1667 | 0.1660 | 0.1651 | −0.92 | 1.04 | 11.01 |
| 13 | 0.1667 | 0.1677 | 0.1669 | 0.12 | 1.03 | 11.12 |
| 14 | 0.1667 | 0.1694 | 0.1686 | 1.14 | 1.02 | 11.24 |
| 15 | 0.1713 | 0.1712 | 0.1703 | −0.57 | 1.03 | 11.36 |
| 16 | 0.1713 | 0.1730 | 0.1721 | 0.46 | 1.02 | 11.47 |
| 17 | 0.1759 | 0.1748 | 0.1739 | −1.17 | 1.04 | 11.59 |
| 18 | 0.1759 | 0.1766 | 0.1757 | −0.13 | 1.03 | 11.71 |
| 19 | 0.1759 | 0.1784 | 0.1775 | 0.89 | 1.02 | 11.83 |
| 20 | 0.1806 | 0.1803 | 0.1794 | −0.67 | 1.03 | 11.96 |
| 21 | 0.1806 | 0.1821 | 0.1812 | 0.36 | 1.02 | 12.08 |
| 22 | 0.1852 | 0.1840 | 0.1831 | −1.14 | 1.04 | 12.21 |
| 23 | 0.1852 | 0.1860 | 0.1850 | −0.10 | 1.02 | 12.33 |
| 24 | 0.1852 | 0.1879 | 0.1869 | 0.92 | 1.01 | 12.46 |
| 25 | 0.1898 | 0.1898 | 0.1888 | −0.52 | 1.03 | 12.59 |
| 26 | 0.1898 | 0.1918 | 0.1908 | 0.51 | 1.02 | 12.72 |
| 27 | 0.1944 | 0.1938 | 0.1928 | −0.87 | 1.03 | 12.85 |
| 28 | 0.1944 | 0.1958 | 0.1948 | 0.16 | 1.02 | 12.98 |
| 29 | 0.1944 | 0.1978 | 0.1968 | 1.17 | 1.01 | 13.12 |
| 30 | 0.1991 | 0.1998 | 0.1988 | −0.15 | 1.02 | 13.25 |
| 31 | 0.1991 | 0.2018 | 0.2008 | 0.87 | 1.01 | 13.99 |
| 32 | 0.2037 | 0.2039 | 0.2029 | −0.40 | 1.02 | 13.53 |
| 33 | 0.2037 | 0.2060 | 0.2050 | 0.62 | 1.01 | 13.66 |
| 34 | 0.2083 | 0.2081 | 0.2071 | −0.60 | 1.03 | 13.81 |
| 35 | 0.2083 | 0.2103 | 0.2092 | 0.42 | 1.01 | 13.95 |

TABLE 2-continued

X - BLOCK (NO. 1) START POINT: 81° 39'30" NORTH LATITUDE

| | | | | | | |
|---|---|---|---|---|---|---|
| 36 | 0.2130 | 0.2125 | 0.2114 | −0.75 | 1.03 | 14.09 |
| 37 | 0.2130 | 0.2146 | 0.2136 | 0.28 | 1.02 | 14.24 |
| 38 | 0.2176 | 0.2169 | 0.2158 | −0.85 | 1.03 | 14.38 |
| 39 | 0.2176 | 0.2191 | 0.2180 | 0.18 | 1.02 | 14.53 |
| 40 | 0.2222 | 0.2214 | 0.2202 | −0.91 | 1.03 | 14.68 |
| 41 | 0.2222 | 0.2236 | 0.2225 | 0.12 | 1.01 | 14.83 |
| 42 | 0.2269 | 0.2259 | 0.2248 | −0.92 | 1.02 | 14.99 |
| 43 | 0.2269 | 0.2283 | 0.2271 | 0.11 | 1.01 | 15.14 |
| 44 | 0.2315 | 0.2306 | 0.2294 | −0.89 | 1.02 | 15.30 |
| 45 | 0.2315 | 0.2330 | 0.2318 | 0.14 | 1.01 | 15.45 |
| 46 | 0.2361 | 0.2354 | 0.2342 | −0.83 | 1.02 | 15.61 |
| 47 | 0.2361 | 0.2378 | 0.2366 | 0.20 | 1.01 | 15.77 |
| 48 | 0.2407 | 0.2402 | 0.2390 | −0.73 | 1.02 | 15.93 |
| 49 | 0.2407 | 0.2427 | 0.2415 | 0.29 | 1.01 | 16.10 |

TABLE 3

X - BLOCK (NO. 2)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SE-CONDS |
| 50 | 75 | 48 | 30 | 75 | 52 | 55 | 8 | 50 |
| 51 | 75 | 39 | 40 | 75 | 44 | 5 | 8 | 50 |
| 52 | 75 | 30 | 40 | 75 | 35 | 10 | 9 | 0 |
| 53 | 75 | 21 | 40 | 75 | 26 | 10 | 9 | 0 |
| 54 | 75 | 12 | 30 | 75 | 17 | 5 | 9 | 10 |
| 55 | 75 | 3 | 20 | 75 | 7 | 55 | 9 | 10 |
| 56 | 74 | 54 | 0 | 74 | 58 | 40 | 9 | 20 |
| 57 | 74 | 44 | 30 | 74 | 49 | 15 | 9 | 30 |
| 58 | 74 | 35 | 0 | 74 | 39 | 45 | 9 | 30 |
| 59 | 74 | 25 | 20 | 74 | 30 | 10 | 9 | 40 |
| 60 | 74 | 15 | 40 | 74 | 20 | 30 | 9 | 40 |
| 61 | 74 | 5 | 50 | 74 | 10 | 45 | 9 | 50 |
| 62 | 73 | 56 | 0 | 74 | 0 | 55 | 9 | 50 |
| 63 | 73 | 46 | 0 | 73 | 51 | 0 | 10 | 0 |
| 64 | 73 | 35 | 50 | 73 | 40 | 55 | 10 | 10 |
| 65 | 73 | 25 | 40 | 73 | 30 | 45 | 10 | 10 |
| 66 | 73 | 15 | 20 | 73 | 20 | 30 | 10 | 20 |
| 67 | 73 | 4 | 50 | 73 | 10 | 5 | 10 | 30 |
| 68 | 72 | 54 | 20 | 72 | 59 | 35 | 10 | 30 |
| 69 | 72 | 43 | 40 | 72 | 49 | 0 | 10 | 40 |
| 70 | 72 | 33 | 0 | 72 | 38 | 20 | 10 | 40 |
| 71 | 72 | 22 | 10 | 72 | 27 | 35 | 10 | 50 |
| 72 | 72 | 11 | 10 | 72 | 16 | 40 | 11 | 0 |
| 73 | 72 | 0 | 10 | 72 | 5 | 40 | 11 | 0 |
| 74 | 71 | 49 | 0 | 71 | 54 | 35 | 11 | 10 |
| 75 | 71 | 37 | 40 | 71 | 43 | 20 | 11 | 20 |
| 76 | 71 | 26 | 20 | 71 | 32 | 0 | 11 | 20 |
| 77 | 71 | 14 | 50 | 71 | 20 | 35 | 11 | 30 |
| 78 | 71 | 3 | 10 | 71 | 9 | 0 | 11 | 40 |
| 79 | 70 | 51 | 30 | 70 | 57 | 20 | 11 | 40 |
| 80 | 70 | 39 | 40 | 70 | 45 | 35 | 11 | 50 |
| 81 | 70 | 27 | 40 | 70 | 33 | 40 | 12 | 0 |
| 82 | 70 | 15 | 30 | 70 | 21 | 35 | 12 | 10 |
| 83 | 70 | 3 | 20 | 70 | 9 | 25 | 12 | 10 |
| 84 | 69 | 51 | 0 | 69 | 57 | 10 | 12 | 20 |
| 85 | 69 | 38 | 30 | 69 | 44 | 45 | 12 | 30 |
| 86 | 69 | 25 | 50 | 69 | 32 | 10 | 12 | 40 |
| 87 | 69 | 13 | 10 | 69 | 19 | 30 | 12 | 40 |
| 88 | 69 | 0 | 20 | 69 | 6 | 45 | 12 | 50 |
| 89 | 68 | 47 | 20 | 68 | 53 | 50 | 13 | 0 |
| 90 | 68 | 34 | 10 | 68 | 40 | 45 | 13 | 10 |
| 91 | 68 | 21 | 0 | 68 | 27 | 35 | 13 | 10 |
| 92 | 68 | 7 | 40 | 68 | 14 | 20 | 13 | 20 |
| 93 | 67 | 54 | 10 | 68 | 0 | 55 | 13 | 30 |
| 94 | 67 | 40 | 30 | 67 | 47 | 20 | 13 | 40 |
| 95 | 67 | 26 | 50 | 67 | 33 | 40 | 13 | 40 |
| 96 | 67 | 13 | 0 | 67 | 19 | 55 | 13 | 50 |
| 97 | 66 | 59 | 0 | 67 | 6 | 0 | 14 | 0 |
| 98 | 66 | 44 | 50 | 66 | 51 | 55 | 14 | 10 |

TABLE 3-continued

X - BLOCK (NO. 2)

| 99 | 66 | 30 | 30 | 66 | 37 | 40 | 14 | 20 |
|---|---|---|---|---|---|---|---|---|

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 50 | 0.2454 | 0.2452 | 0.2439 | −0.59 | 1.02 | 16.26 |
| 51 | 0.2454 | 0.2477 | 0.2464 | 0.42 | 1.01 | 16.43 |
| 52 | 0.2500 | 0.2502 | 0.2489 | −0.43 | 1.01 | 16.59 |
| 53 | 0.2500 | 0.2527 | 0.2515 | 0.58 | 1.00 | 16.76 |
| 54 | 0.2546 | 0.2553 | 0.2540 | −0.24 | 1.01 | 16.93 |
| 55 | 0.2546 | 0.2579 | 0.2566 | 0.77 | 1.00 | 17.11 |
| 56 | 0.2593 | 0.2605 | 0.2592 | −0.03 | 1.01 | 17.28 |
| 57 | 0.2639 | 0.2632 | 0.2618 | −0.78 | 1.01 | 17.46 |
| 58 | 0.2639 | 0.2658 | 0.2645 | 0.23 | 1.00 | 17.63 |
| 59 | 0.2685 | 0.2685 | 0.2672 | −0.50 | 1.01 | 17.81 |
| 60 | 0.2685 | 0.2713 | 0.2699 | 0.51 | 1.00 | 17.99 |
| 61 | 0.2731 | 0.2740 | 0.2726 | −0.19 | 1.00 | 18.18 |
| 62 | 0.2731 | 0.2768 | 0.2754 | 0.81 | 0.99 | 18.36 |
| 63 | 0.2778 | 0.2795 | 0.2782 | 0.13 | 1.00 | 18.54 |
| 64 | 0.2824 | 0.2824 | 0.2810 | −0.51 | 1.01 | 18.73 |
| 65 | 0.2824 | 0.2852 | 0.2838 | 0.49 | 0.99 | 18.92 |
| 66 | 0.2870 | 0.2881 | 0.2867 | −0.13 | 1.00 | 19.11 |
| 67 | 0.2917 | 0.2910 | 0.2896 | −0.73 | 1.00 | 19.30 |
| 68 | 0.2917 | 0.2939 | 0.2925 | 0.28 | 0.99 | 19.50 |
| 69 | 0.2963 | 0.2969 | 0.2954 | −0.29 | 1.00 | 19.70 |
| 70 | 0.2963 | 0.2999 | 0.2984 | 0.70 | 0.99 | 19.89 |
| 71 | 0.3009 | 0.3029 | 0.3014 | 0.15 | 0.99 | 20.09 |
| 72 | 0.3056 | 0.3059 | 0.3044 | −0.38 | 1.00 | 20.29 |
| 73 | 0.3056 | 0.3090 | 0.3074 | 0.62 | 0.99 | 20.50 |
| 74 | 0.3102 | 0.3121 | 0.3105 | 0.11 | 0.99 | 20.70 |
| 75 | 0.3148 | 0.3152 | 0.3136 | −0.38 | 0.98 | 20.91 |
| 76 | 0.3148 | 0.3183 | 0.3168 | 0.61 | 0.98 | 21.12 |
| 77 | 0.3194 | 0.3215 | 0.3199 | 0.14 | 0.99 | 21.33 |
| 78 | 0.3241 | 0.3247 | 0.3231 | −0.30 | 0.99 | 21.54 |
| 79 | 0.3241 | 0.3279 | 0.3263 | 0.68 | 0.98 | 21.75 |
| 80 | 0.3287 | 0.3312 | 0.3295 | 0.25 | 0.98 | 21.97 |
| 81 | 0.3333 | 0.3344 | 0.3328 | −0.16 | 0.98 | 22.19 |
| 82 | 0.3380 | 0.3378 | 0.3361 | −0.55 | 0.99 | 22.41 |
| 83 | 0.3380 | 0.3411 | 0.3394 | 0.44 | 0.98 | 22.63 |
| 84 | 0.3426 | 0.3445 | 0.3428 | 0.06 | 0.98 | 22.85 |
| 85 | 0.3472 | 0.3479 | 0.3462 | −0.30 | 0.98 | 23.08 |
| 86 | 0.3519 | 0.3513 | 0.3496 | −0.64 | 0.98 | 23.31 |
| 87 | 0.3519 | 0.3548 | 0.3531 | 0.34 | 0.97 | 23.54 |
| 88 | 0.3565 | 0.3583 | 0.3565 | 0.01 | 0.97 | 23.77 |
| 89 | 0.3611 | 0.3618 | 0.3600 | −0.30 | 0.98 | 24.00 |
| 90 | 0.3657 | 0.3654 | 0.3636 | −0.59 | 0.98 | 24.24 |
| 91 | 0.3657 | 0.3689 | 0.3672 | 0.39 | 0.97 | 24.48 |
| 92 | 0.3704 | 0.3725 | 0.3707 | 0.10 | 0.97 | 24.72 |
| 93 | 0.3750 | 0.3762 | 0.3744 | −0.17 | 0.97 | 24.96 |
| 94 | 0.3796 | 0.3799 | 0.3780 | −0.43 | 0.97 | 25.20 |
| 95 | 0.3796 | 0.3835 | 0.3817 | 0.54 | 0.96 | 25.45 |
| 96 | 0.3843 | 0.3872 | 0.3854 | 0.29 | 0.96 | 25.69 |
| 97 | 0.3889 | 0.3910 | 0.3891 | 0.06 | 0.96 | 25.94 |
| 98 | 0.3835 | 0.3948 | 0.3929 | −0.16 | 0.96 | 26.19 |
| 99 | 0.3981 | 0.3986 | 0.3967 | −0.36 | 0.96 | 26.45 |

TABLE 4

A - BLOCK (NO. 1) START POINT: 866° 30'30" NORTH LATITUDE

| SOUTH-NORTH NUMBER | SOUTHERN END LATITUDE | | | CENTRAL LATITUDE | | | DIFFERENCE A | |
|---|---|---|---|---|---|---|---|---|
| | DEGREES | MINUTES | SECONDS | DEGREES | MINUTES | SECONDS | MINUTES | SECONDS |
| 00 | 66 | 16 | 0 | 66 | 23 | 15 | 14 | 30 |
| 01 | 66 | 1 | 30 | 66 | 8 | 45 | 14 | 30 |
| 02 | 65 | 46 | 50 | 65 | 54 | 10 | 14 | 40 |
| 03 | 65 | 32 | 0 | 65 | 39 | 25 | 14 | 50 |
| 04 | 65 | 17 | 0 | 65 | 24 | 30 | 15 | 0 |

TABLE 4-continued

A - BLOCK (NO. 1) START POINT: 866° 30'30" NORTH LATITUDE

| 05 | 65 | 1 | 50 | 65 | 9 | 25 | 15 | 10 |
|----|----|----|----|----|----|----|----|----|
| 06 | 64 | 46 | 30 | 64 | 54 | 10 | 15 | 20 |
| 07 | 64 | 31 | 10 | 64 | 38 | 50 | 15 | 20 |
| 08 | 64 | 15 | 40 | 64 | 23 | 25 | 15 | 30 |
| 09 | 64 | 0 | 0 | 64 | 7 | 50 | 15 | 40 |
| 10 | 63 | 44 | 10 | 63 | 52 | 5 | 15 | 50 |
| 11 | 63 | 28 | 10 | 63 | 36 | 10 | 15 | 60 |
| 12 | 63 | 12 | 0 | 63 | 20 | 5 | 16 | 10 |
| 13 | 62 | 55 | 40 | 63 | 3 | 50 | 16 | 20 |
| 14 | 62 | 39 | 10 | 62 | 47 | 25 | 16 | 30 |
| 15 | 62 | 22 | 30 | 62 | 30 | 50 | 16 | 40 |
| 16 | 62 | 5 | 40 | 62 | 14 | 5 | 16 | 50 |
| 17 | 61 | 48 | 40 | 61 | 57 | 10 | 17 | 0 |
| 18 | 61 | 31 | 30 | 61 | 40 | 5 | 17 | 10 |
| 19 | 61 | 14 | 20 | 61 | 22 | 55 | 17 | 10 |
| 20 | 60 | 57 | 0 | 61 | 5 | 40 | 17 | 20 |
| 21 | 60 | 39 | 30 | 60 | 48 | 15 | 17 | 30 |
| 22 | 60 | 21 | 50 | 60 | 30 | 40 | 17 | 40 |
| 23 | 60 | 4 | 0 | 60 | 12 | 55 | 17 | 50 |
| 24 | 59 | 46 | 0 | 59 | 55 | 0 | 18 | 0 |
| 25 | 59 | 27 | 50 | 59 | 36 | 55 | 18 | 10 |
| 26 | 59 | 9 | 30 | 59 | 18 | 40 | 18 | 20 |
| 27 | 58 | 51 | 0 | 59 | 0 | 15 | 18 | 30 |
| 28 | 58 | 32 | 20 | 58 | 41 | 40 | 18 | 40 |
| 29 | 58 | 13 | 30 | 58 | 22 | 55 | 18 | 50 |
| 30 | 57 | 54 | 30 | 58 | 4 | 0 | 18 | 60 |
| 31 | 57 | 35 | 20 | 57 | 44 | 55 | 19 | 10 |
| 32 | 57 | 16 | 0 | 57 | 25 | 40 | 19 | 20 |
| 33 | 56 | 56 | 30 | 57 | 6 | 15 | 19 | 30 |
| 34 | 56 | 36 | 50 | 56 | 46 | 40 | 19 | 40 |
| 35 | 56 | 17 | 0 | 56 | 26 | 55 | 19 | 50 |
| 36 | 55 | 57 | 0 | 56 | 7 | 0 | 20 | 0 |
| 37 | 55 | 36 | 50 | 55 | 46 | 55 | 20 | 10 |
| 38 | 55 | 16 | 20 | 55 | 26 | 35 | 20 | 30 |
| 39 | 54 | 55 | 40 | 55 | 6 | 0 | 20 | 40 |
| 40 | 54 | 34 | 50 | 54 | 45 | 15 | 20 | 50 |
| 41 | 54 | 13 | 50 | 54 | 24 | 20 | 21 | 0 |
| 42 | 53 | 52 | 40 | 54 | 3 | 15 | 21 | 10 |
| 43 | 53 | 31 | 20 | 53 | 42 | 0 | 21 | 20 |
| 44 | 53 | 9 | 50 | 53 | 20 | 35 | 21 | 30 |
| 45 | 52 | 48 | 10 | 52 | 59 | 0 | 21 | 40 |
| 46 | 52 | 26 | 20 | 52 | 37 | 15 | 21 | 50 |
| 47 | 52 | 4 | 20 | 52 | 15 | 20 | 22 | 0 |
| 48 | 51 | 42 | 10 | 51 | 53 | 15 | 22 | 10 |
| 49 | 51 | 19 | 50 | 51 | 31 | 0 | 22 | 20 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 00 | 0.4028 | 0.4025 | 0.4005 | −0.56 | 0.96 | 26.70 |
| 01 | 0.4028 | 0.4063 | 0.4044 | 0.40 | 0.95 | 26.96 |
| 02 | 0.4074 | 0.4102 | 0.4083 | 0.22 | 0.95 | 27.22 |
| 03 | 0.4120 | 0.4142 | 0.4122 | 0.04 | 0.95 | 27.48 |
| 04 | 0.4167 | 0.4181 | 0.4161 | −0.12 | 0.95 | 27.74 |
| 05 | 0.4213 | 0.4221 | 0.4201 | −0.28 | 0.95 | 28.01 |
| 06 | 0.4259 | 0.4262 | 0.4242 | −0.42 | 0.95 | 28.28 |
| 07 | 0.4259 | 0.4302 | 0.4282 | 0.53 | 0.94 | 28.55 |
| 08 | 0.4306 | 0.4343 | 0.4322 | 0.39 | 0.94 | 28.82 |
| 09 | 0.4352 | 0.4384 | 0.4363 | 0.26 | 0.94 | 29.09 |
| 10 | 0.4398 | 0.4425 | 0.4404 | 0.14 | 0.93 | 29.36 |
| 11 | 0.4444 | 0.4467 | 0.4446 | 0.03 | 0.93 | 29.64 |
| 12 | 0.4491 | 0.4509 | 0.4488 | −0.07 | 0.93 | 29.92 |
| 13 | 0.4537 | 0.4551 | 0.4530 | −0.16 | 0.93 | 30.20 |
| 14 | 0.4583 | 0.4594 | 0.4572 | −0.24 | 0.93 | 30.48 |
| 15 | 0.4630 | 0.4637 | 0.4615 | −0.31 | 0.93 | 30.77 |
| 16 | 0.4676 | 0.4680 | 0.4659 | −0.37 | 0.93 | 31.06 |
| 17 | 0.4722 | 0.4724 | 0.4702 | −0.43 | 0.92 | 31.35 |
| 18 | 0.4769 | 0.4768 | 0.4746 | −0.48 | 0.92 | 31.84 |
| 19 | 0.4769 | 0.4812 | 0.4790 | 0.44 | 0.91 | 31.93 |
| 20 | 0.4815 | 0.4856 | 0.4834 | 0.39 | 0.91 | 32.22 |
| 21 | 0.4861 | 0.4900 | 0.4878 | 0.35 | 0.91 | 32.52 |
| 22 | 0.4907 | 0.4945 | 0.4923 | 0.31 | 0.90 | 32.82 |
| 23 | 0.4954 | 0.4990 | 0.4967 | 0.28 | 0.90 | 33.12 |

TABLE 4-continued

A - BLOCK (NO. 1) START POINT: 866° 30'30" NORTH LATITUDE

| 24 | 0.5000 | 0.5035 | 0.5013 | 0.25 | 0.90 | 33.42 |
| 25 | 0.5046 | 0.5081 | 0.5058 | 0.23 | 0.90 | 33.72 |
| 26 | 0.5093 | 0.5127 | 0.5104 | 0.22 | 0.89 | 34.03 |
| 27 | 0.5139 | 0.5173 | 0.5150 | 0.21 | 0.89 | 34.33 |
| 28 | 0.5185 | 0.5219 | 0.5196 | 0.21 | 0.89 | 34.64 |
| 29 | 0.5231 | 0.5266 | 0.5243 | 0.21 | 0.89 | 34.95 |
| 30 | 0.5278 | 0.5313 | 0.5289 | 0.22 | 0.88 | 35.26 |
| 31 | 0.5324 | 0.5360 | 0.5336 | 0.23 | 0.88 | 35.58 |
| 32 | 0.5370 | 0.5407 | 0.5384 | 0.25 | 0.88 | 35.89 |
| 33 | 0.5417 | 0.5455 | 0.5431 | 0.27 | 0.87 | 36.21 |
| 34 | 0.5463 | 0.5503 | 0.5479 | 0.29 | 0.87 | 36.53 |
| 35 | 0.5509 | 0.5551 | 0.5527 | 0.32 | 0.87 | 36.85 |
| 36 | 0.5556 | 0.5599 | 0.5575 | 0.35 | 0.86 | 37.17 |
| 37 | 0.5602 | 0.5648 | 0.5628 | 0.38 | 0.86 | 37.49 |
| 38 | 0.5694 | 0.5697 | 0.5672 | −0.39 | 0.86 | 37.82 |
| 39 | 0.5741 | 0.5746 | 0.5721 | −0.34 | 0.86 | 38.14 |
| 40 | 0.5787 | 0.5796 | 0.5771 | −0.28 | 0.85 | 38.47 |
| 41 | 0.5833 | 0.5845 | 0.5820 | −0.22 | 0.85 | 38.80 |
| 42 | 0.5880 | 0.5895 | 0.5870 | −0.16 | 0.85 | 39.13 |
| 43 | 0.5926 | 0.5945 | 0.5920 | −0.10 | 0.84 | 39.47 |
| 44 | 0.5972 | 0.5995 | 0.5970 | −0.03 | 0.84 | 39.80 |
| 45 | 0.6019 | 0.6046 | 0.6020 | 0.03 | 0.83 | 40.14 |
| 46 | 0.6085 | 0.6096 | 0.6071 | 0.10 | 0.83 | 40.47 |
| 47 | 0.6111 | 0.6147 | 0.6121 | 0.17 | 0.82 | 40.81 |
| 48 | 0.6157 | 0.6197 | 0.6172 | 0.24 | 0.82 | 41.15 |
| 49 | 0.6204 | 0.6248 | 0.6223 | 0.31 | 0.81 | 41.49 |

TABLE 5

A - BLOCK (NO. 2)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SEC-ONDS |
| 50 | 50 | 57 | 10 | 51 | 8 | 30 | 22 | 40 |
| 51 | 50 | 34 | 20 | 50 | 45 | 45 | 22 | 50 |
| 52 | 50 | 11 | 20 | 50 | 22 | 50 | 23 | 0 |
| 53 | 49 | 48 | 10 | 49 | 59 | 45 | 23 | 10 |
| 54 | 49 | 24 | 50 | 49 | 36 | 30 | 23 | 20 |
| 55 | 49 | 1 | 20 | 49 | 13 | 5 | 23 | 30 |
| 56 | 48 | 37 | 40 | 48 | 49 | 30 | 23 | 40 |
| 57 | 48 | 13 | 50 | 48 | 25 | 45 | 23 | 50 |
| 58 | 47 | 49 | 50 | 48 | 1 | 50 | 23 | 60 |
| 59 | 47 | 25 | 30 | 47 | 37 | 40 | 24 | 20 |
| 60 | 47 | 1 | 0 | 47 | 13 | 15 | 24 | 30 |
| 61 | 46 | 36 | 20 | 46 | 48 | 40 | 24 | 40 |
| 62 | 46 | 11 | 30 | 46 | 23 | 55 | 24 | 50 |
| 63 | 45 | 46 | 30 | 45 | 59 | 0 | 25 | 0 |
| 64 | 45 | 21 | 20 | 45 | 33 | 55 | 25 | 10 |
| 65 | 44 | 56 | 0 | 45 | 8 | 40 | 25 | 20 |
| 66 | 44 | 30 | 30 | 44 | 43 | 15 | 25 | 30 |
| 67 | 44 | 4 | 40 | 44 | 17 | 35 | 25 | 50 |
| 68 | 43 | 38 | 40 | 43 | 51 | 40 | 26 | 0 |
| 69 | 43 | 12 | 30 | 43 | 25 | 35 | 26 | 10 |
| 70 | 42 | 46 | 10 | 42 | 59 | 20 | 26 | 20 |
| 71 | 42 | 19 | 40 | 42 | 32 | 55 | 26 | 30 |
| 72 | 41 | 53 | 0 | 42 | 6 | 20 | 26 | 40 |
| 73 | 41 | 26 | 10 | 41 | 39 | 35 | 26 | 50 |
| 74 | 40 | 59 | 10 | 41 | 12 | 40 | 27 | 0 |
| 75 | 40 | 31 | 50 | 40 | 45 | 30 | 27 | 20 |
| 76 | 40 | 4 | 20 | 40 | 18 | 5 | 27 | 30 |
| 77 | 39 | 36 | 40 | 39 | 50 | 30 | 27 | 40 |
| 78 | 39 | 8 | 50 | 39 | 22 | 45 | 27 | 50 |
| 79 | 38 | 40 | 50 | 38 | 54 | 50 | 28 | 0 |
| 80 | 38 | 12 | 40 | 38 | 26 | 45 | 28 | 10 |
| 81 | 37 | 44 | 20 | 37 | 58 | 30 | 28 | 20 |
| 82 | 37 | 15 | 50 | 37 | 30 | 5 | 28 | 30 |
| 83 | 36 | 47 | 10 | 37 | 1 | 30 | 28 | 40 |
| 84 | 36 | 18 | 10 | 36 | 32 | 40 | 29 | 0 |
| 85 | 35 | 49 | 0 | 36 | 3 | 35 | 29 | 10 |
| 86 | 35 | 19 | 40 | 35 | 34 | 20 | 29 | 20 |

TABLE 5-continued

A - BLOCK (NO. 2)

| | | | | | | | |
|---|---|---|---|---|---|---|---|
| 87 | 34 | 50 | 10 | 35 | 4 | 55 | 29 | 30 |
| 88 | 34 | 20 | 30 | 34 | 35 | 20 | 29 | 40 |
| 89 | 33 | 50 | 40 | 34 | 5 | 35 | 29 | 50 |
| 90 | 33 | 20 | 40 | 33 | 35 | 40 | 30 | 0 |
| 91 | 32 | 50 | 30 | 33 | 5 | 35 | 30 | 10 |
| 92 | 32 | 20 | 10 | 32 | 35 | 20 | 30 | 20 |
| 93 | 31 | 49 | 40 | 32 | 4 | 55 | 30 | 30 |
| 94 | 31 | 19 | 0 | 31 | 34 | 20 | 30 | 40 |
| 95 | 30 | 48 | 10 | 31 | 3 | 35 | 30 | 50 |
| 96 | 30 | 17 | 10 | 30 | 32 | 49 | 31 | 0 |
| 97 | 29 | 45 | 60 | 30 | 1 | 35 | 31 | 10 |
| 98 | 29 | 14 | 40 | 29 | 30 | 20 | 31 | 20 |
| 99 | 28 | 43 | 10 | 28 | 58 | 55 | 31 | 30 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km | |
|---|---|---|---|---|---|---|---|
| 50 | 0.6296 | 0.6300 | 0.6274 | −0.36 | 0.82 | 41.83 | |
| 51 | 0.6343 | 0.6351 | 0.6325 | −0.27 | 0.81 | 42.17 | |
| 52 | 0.6389 | 0.6403 | 0.6377 | −0.19 | 0.81 | 42.51 | |
| 53 | 0.6435 | 0.6454 | 0.6428 | −0.11 | 0.80 | 42.86 | |
| 54 | 0.6481 | 0.6506 | 0.6480 | −0.02 | 0.80 | 43.20 | |
| 55 | 0.6528 | 0.6558 | 0.6532 | 0.06 | 0.79 | 43.55 | |
| 56 | 0.6574 | 0.6609 | 0.6584 | 0.14 | 0.79 | 43.89 | |
| 57 | 0.6620 | 0.6661 | 0.6635 | 0.23 | 0.78 | 44.24 | |
| 58 | 0.6667 | 0.6713 | 0.6687 | 0.31 | 0.78 | 44.58 | |
| 59 | 0.6759 | 0.6766 | 0.6739 | −0.29 | 0.77 | 44.93 | |
| 60 | 0.6806 | 0.6818 | 0.6792 | −0.20 | 0.77 | 45.28 | |
| 61 | 0.6852 | 0.6870 | 0.6844 | −0.11 | 0.76 | 45.63 | |
| 62 | 0.6898 | 0.6922 | 0.6896 | −0.03 | 0.76 | 45.98 | |
| 63 | 0.6944 | 0.6975 | 0.6949 | 0.06 | 0.75 | 46.32 | |
| 64 | 0.6991 | 0.7027 | 0.7001 | 0.15 | 0.75 | 46.67 | |
| 65 | 0.7037 | 0.7079 | 0.7053 | 0.23 | 0.74 | 47.02 | |
| 66 | 0.7083 | 0.7131 | 0.7105 | 0.31 | 0.73 | 47.37 | |
| 67 | 0.7176 | 0.7184 | 0.7158 | −0.25 | 0.73 | 47.72 | |
| 68 | 0.7222 | 0.7236 | 0.7210 | −0.17 | 0.73 | 48.07 | |
| 69 | 0.7269 | 0.7289 | 0.7263 | −0.08 | 0.72 | 48.42 | |
| 70 | 0.7315 | 0.7341 | 0.7315 | 0.00 | 0.71 | 48.77 | |
| 71 | 0.7361 | 0.7393 | 0.7367 | 0.08 | 0.71 | 49.11 | |
| 72 | 0.7407 | 0.7445 | 0.7419 | 0.16 | 0.70 | 49.46 | |
| 73 | 0.7454 | 0.7497 | 0.7471 | 0.23 | 0.70 | 49.81 | |
| 74 | 0.7500 | 0.7549 | 0.7523 | 0.30 | 0.69 | 50.15 | |
| 75 | 0.7593 | 0.7601 | 0.7575 | −0.24 | 0.68 | 50.50 | |
| 76 | 0.7639 | 0.7652 | 0.7627 | −0.16 | 0.68 | 50.84 | |
| 77 | 0.7685 | 0.7704 | 0.7678 | −0.09 | 0.67 | 51.19 | |
| 78 | 0.7731 | 0.7755 | 0.7730 | −0.02 | 0.67 | 51.53 | |
| 79 | 0.7778 | 0.7806 | 0.7781 | 0.04 | 0.66 | 51.87 | |
| 80 | 0.7824 | 0.7857 | 0.7832 | 0.10 | 0.65 | 52.21 | |
| 81 | 0.7870 | 0.7908 | 0.7883 | 0.16 | 0.64 | 52.55 | |
| 82 | 0.7917 | 0.7959 | 0.7933 | 0.21 | 0.64 | 52.89 | |
| 83 | 0.7963 | 0.8009 | 0.7984 | 0.26 | 0.63 | 53.22 | |
| 84 | 0.8056 | 0.8059 | 0.8034 | −0.27 | 0.63 | 53.56 | |
| 85 | 0.8102 | 0.8109 | 0.8084 | −0.22 | 0.62 | 53.89 | |
| 86 | 0.8148 | 0.8159 | 0.8134 | −0.18 | 0.61 | 54.23 | TOKYO |
| 87 | 0.8194 | 0.8208 | 0.8183 | −0.14 | 0.60 | 54.56 | |
| 88 | 0.8241 | 0.8257 | 0.8232 | −0.10 | 0.60 | 54.88 | OSAKA |
| 89 | 0.8287 | 0.8306 | 0.8281 | −0.07 | 0.59 | 55.21 | |
| 90 | 0.8333 | 0.8354 | 0.8330 | −0.04 | 0.58 | 55.53 | |
| 91 | 0.8380 | 0.8402 | 0.8378 | −0.02 | 0.57 | 55.85 | |
| 92 | 0.8426 | 0.8449 | 0.8426 | 0.00 | 0.57 | 56.17 | |
| 93 | 0.8472 | 0.8496 | 0.8473 | 0.01 | 0.56 | 56.49 | |
| 94 | 0.8519 | 0.8543 | 0.8520 | 0.02 | 0.55 | 56.80 | |
| 95 | 0.8565 | 0.8589 | 0.8566 | 0.02 | 0.54 | 57.11 | |
| 96 | 0.8611 | 0.8635 | 0.8612 | 0.01 | 0.53 | 57.42 | |
| 97 | 0.8657 | 0.8681 | 0.8658 | 0.01 | 0.53 | 57.72 | |
| 98 | 0.8704 | 0.8725 | 0.8703 | −0.01 | 0.52 | 58.02 | |
| 99 | 0.8750 | 0.8770 | 0.8748 | −0.03 | 0.51 | 58.32 | |

TABLE 6

| | B - BLOCK (NO. 1) START POINT: 28° 43'10" NORTH LATITUDE | | | | | | |
|---|---|---|---|---|---|---|---|
| SOUTH-NORTH NUMBER | SOUTHERN END LATITUDE | | | CENTRAL LATITUDE | | | DIFFERENCE A | |
| | DE-GREES | MIN-UTES | SEC-ONDS | DE-GREES | MIN-UTES | SEC-ONDS | MIN-UTES | SEC-ONDS |
| 00 | 28 | 11 | 30 | 28 | 27 | 20 | 31 | 40 |
| 01 | 27 | 39 | 40 | 27 | 55 | 35 | 31 | 50 |
| 02 | 27 | 7 | 40 | 27 | 23 | 40 | 32 | 0 |
| 03 | 26 | 35 | 30 | 26 | 51 | 35 | 32 | 10 |
| 04 | 26 | 3 | 10 | 26 | 19 | 20 | 32 | 20 |
| 05 | 25 | 30 | 50 | 25 | 47 | 0 | 32 | 20 |
| 06 | 24 | 58 | 20 | 25 | 14 | 35 | 32 | 30 |
| 07 | 24 | 25 | 40 | 24 | 42 | 0 | 32 | 40 |
| 08 | 23 | 52 | 50 | 24 | 9 | 15 | 32 | 50 |
| 09 | 23 | 19 | 50 | 23 | 36 | 20 | 33 | 0 |
| 10 | 22 | 46 | 40 | 23 | 3 | 15 | 33 | 10 |
| 11 | 22 | 13 | 20 | 22 | 30 | 0 | 33 | 20 |
| 12 | 21 | 39 | 60 | 21 | 56 | 40 | 33 | 20 |
| 13 | 21 | 6 | 30 | 21 | 23 | 15 | 33 | 30 |
| 14 | 20 | 32 | 50 | 20 | 49 | 40 | 33 | 40 |
| 15 | 19 | 58 | 60 | 20 | 15 | 55 | 33 | 50 |
| 16 | 19 | 25 | 10 | 19 | 42 | 5 | 33 | 50 |
| 17 | 18 | 51 | 10 | 19 | 8 | 10 | 34 | 0 |
| 18 | 18 | 16 | 60 | 18 | 34 | 5 | 34 | 10 |
| 19 | 17 | 42 | 50 | 17 | 59 | 55 | 34 | 10 |
| 20 | 17 | 8 | 30 | 17 | 25 | 40 | 34 | 20 |
| 21 | 16 | 34 | 0 | 16 | 51 | 15 | 34 | 30 |
| 22 | 15 | 59 | 30 | 16 | 16 | 45 | 34 | 30 |
| 23 | 15 | 24 | 50 | 15 | 42 | 10 | 34 | 40 |
| 24 | 14 | 49 | 60 | 15 | 7 | 25 | 34 | 50 |
| 25 | 14 | 15 | 10 | 14 | 32 | 35 | 34 | 50 |
| 26 | 13 | 40 | 10 | 13 | 57 | 40 | 35 | 0 |
| 27 | 13 | 5 | 10 | 13 | 22 | 40 | 35 | 0 |
| 28 | 12 | 30 | 0 | 12 | 47 | 35 | 35 | 10 |
| 29 | 11 | 54 | 50 | 12 | 12 | 25 | 35 | 10 |
| 30 | 11 | 19 | 30 | 11 | 37 | 10 | 35 | 20 |
| 31 | 10 | 44 | 10 | 11 | 1 | 50 | 35 | 20 |
| 32 | 10 | 8 | 50 | 10 | 26 | 30 | 35 | 20 |
| 33 | 9 | 33 | 20 | 9 | 51 | 5 | 35 | 30 |
| 34 | 8 | 57 | 50 | 9 | 15 | 35 | 35 | 30 |
| 35 | 8 | 22 | 10 | 8 | 40 | 0 | 35 | 40 |
| 36 | 7 | 46 | 30 | 8 | 4 | 20 | 35 | 40 |
| 37 | 7 | 10 | 50 | 7 | 28 | 40 | 35 | 40 |
| 38 | 6 | 35 | 10 | 6 | 53 | 0 | 35 | 40 |
| 39 | 5 | 59 | 20 | 6 | 17 | 15 | 35 | 50 |
| 40 | 5 | 23 | 30 | 5 | 41 | 25 | 35 | 50 |
| 41 | 4 | 47 | 40 | 5 | 5 | 35 | 35 | 50 |
| 42 | 4 | 11 | 50 | 4 | 29 | 45 | 35 | 50 |
| 43 | 3 | 36 | 0 | 3 | 53 | 55 | 35 | 50 |
| 44 | 3 | 0 | 0 | 3 | 18 | 0 | 36 | 0 |
| 45 | 2 | 24 | 0 | 2 | 42 | 0 | 36 | 0 |
| 46 | 1 | 48 | 0 | 2 | 6 | 0 | 36 | 0 |
| 47 | 1 | 12 | 0 | 1 | 30 | 0 | 36 | 0 |
| 48 | 0 | 36 | 0 | 0 | 54 | 0 | 36 | 0 |
| 49 | 0 | 0 | 0 | 0 | 18 | 0 | 36 | 0 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 00 | 0.8796 | 0.8814 | 0.8792 | −0.05 | 0.50 | 58.61 |
| 01 | 0.8843 | 0.8857 | 0.8836 | −0.08 | 0.49 | 58.90 |
| 02 | 0.8889 | 0.8900 | 0.8879 | −0.12 | 0.48 | 59.19 |
| 03 | 0.8935 | 0.8942 | 0.8921 | −0.16 | 0.47 | 59.47 |
| 04 | 0.8981 | 0.8984 | 0.8963 | −0.20 | 0.46 | 59.75 |
| 05 | 0.8981 | 0.9025 | 0.9004 | 0.26 | 0.45 | 60.03 |
| 06 | 0.9028 | 0.9065 | 0.9045 | 0.18 | 0.44 | 60.30 |
| 07 | 0.9074 | 0.9105 | 0.9085 | 0.12 | 0.44 | 60.57 |
| 08 | 0.9120 | 0.9144 | 0.9124 | 0.05 | 0.43 | 60.83 |
| 09 | 0.9167 | 0.9182 | 0.9163 | −0.04 | 0.42 | 61.09 |
| 10 | 0.9213 | 0.9220 | 0.9201 | −0.13 | 0.41 | 61.34 |
| 11 | 0.9259 | 0.9257 | 0.9239 | −0.22 | 0.40 | 61.59 |
| 12 | 0.9259 | 0.9293 | 0.9275 | 0.17 | 0.39 | 61.84 |
| 13 | 0.9306 | 0.9329 | 0.9311 | 0.06 | 0.38 | 62.08 |
| 14 | 0.9352 | 0.9364 | 0.9347 | −0.06 | 0.37 | 62.31 |

TABLE 6-continued

B - BLOCK (NO. 1) START POINT: 28° 43'10" NORTH LATITUDE

| 15 | 0.9398 | 0.9398 | 0.9381 | −0.18 | 0.36 | 62.54 |
| 16 | 0.9398 | 0.9431 | 0.9415 | 0.17 | 0.35 | 62.76 |
| 17 | 0.9444 | 0.9464 | 0.9447 | 0.03 | 0.34 | 62.98 |
| 18 | 0.9491 | 0.9495 | 0.9479 | −0.12 | 0.33 | 63.20 |
| 19 | 0.9491 | 0.9526 | 0.9511 | 0.21 | 0.32 | 63.40 |
| 20 | 0.9537 | 0.9556 | 0.9541 | 0.04 | 0.31 | 63.61 |
| 21 | 0.9583 | 0.9585 | 0.9570 | −0.13 | 0.30 | 63.80 |
| 22 | 0.9583 | 0.9613 | 0.9599 | 0.16 | 0.29 | 63.99 |
| 23 | 0.9630 | 0.9640 | 0.9627 | −0.03 | 0.28 | 64.18 |
| 24 | 0.9676 | 0.9667 | 0.9654 | −0.23 | 0.27 | 64.36 |
| 25 | 0.9676 | 0.9692 | 0.9680 | 0.04 | 0.26 | 64.53 |
| 26 | 0.9722 | 0.9717 | 0.9705 | −0.18 | 0.25 | 64.70 |
| 27 | 0.9722 | 0.9740 | 0.9729 | 0.07 | 0.24 | 64.86 |
| 28 | 0.9769 | 0.9763 | 0.9752 | −0.17 | 0.23 | 65.01 |
| 29 | 0.9769 | 0.9785 | 0.9774 | 0.06 | 0.22 | 65.16 |
| 30 | 0.9815 | 0.9805 | 0.9795 | −0.20 | 0.21 | 65.30 |
| 31 | 0.9815 | 0.9825 | 0.9815 | 0.00 | 0.20 | 65.44 |
| 32 | 0.9815 | 0.9844 | 0.9834 | 0.20 | 0.19 | 65.56 |
| 33 | 0.9861 | 0.9861 | 0.9853 | −0.09 | 0.18 | 65.68 |
| 34 | 0.9861 | 0.9878 | 0.9870 | 0.09 | 1.17 | 65.80 |
| 35 | 0.9907 | 0.9894 | 0.9886 | −0.22 | 0.16 | 65.91 |
| 36 | 0.9907 | 0.9908 | 0.9901 | −0.07 | 0.15 | 66.01 |
| 37 | 0.9907 | 0.9922 | 0.9915 | 0.08 | 0.14 | 66.10 |
| 38 | 0.9907 | 0.9934 | 0.9928 | 0.21 | 0.13 | 66.19 |
| 39 | 0.9954 | 0.9945 | 0.9940 | −0.14 | 0.11 | 66.27 |
| 40 | 0.9954 | 0.9958 | 0.9951 | −0.03 | 0.10 | 66.34 |
| 41 | 0.9954 | 0.9985 | 0.9961 | 0.07 | 0.09 | 66.40 |
| 42 | 0.9954 | 0.9973 | 0.9969 | 0.16 | 0.08 | 66.46 |
| 43 | 0.9954 | 0.9980 | 0.9977 | 0.23 | 0.07 | 66.51 |
| 44 | 1.0000 | 0.9986 | 0.9983 | −0.17 | 0.06 | 66.56 |
| 45 | 1.0000 | 0.9991 | 0.9989 | −0.11 | 0.05 | 66.59 |
| 46 | 1.0000 | 0.9995 | 0.9993 | −0.07 | 0.04 | 66.62 |
| 47 | 1.0000 | 0.9998 | 0.9997 | −0.03 | 0.03 | 66.64 |
| 48 | 1.0000 | 0.9999 | 0.9999 | −0.01 | 0.02 | 66.66 |
| 49 | 1.0000 | 1.0000 | 1.0000 | 0.00 | 0.01 | 66.67 |

TABLE 7

B - BLOCK (NO. 2)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SEC-ONDS |
| 50 | 0 | 0 | 0 | 0 | 18 | 0 | 36 | 0 |
| 51 | 0 | 36 | 0 | 0 | 54 | 0 | 36 | 0 |
| 52 | 1 | 12 | 0 | 1 | 30 | 0 | 36 | 0 |
| 53 | 1 | 48 | 0 | 2 | 6 | 0 | 36 | 0 |
| 54 | 2 | 24 | 0 | 2 | 42 | 0 | 36 | 0 |
| 55 | 3 | 0 | 0 | 3 | 18 | 0 | 36 | 0 |
| 56 | 3 | 36 | 0 | 3 | 53 | 55 | 35 | 50 |
| 57 | 4 | 11 | 50 | 4 | 29 | 45 | 35 | 50 |
| 58 | 4 | 47 | 40 | 5 | 5 | 35 | 35 | 50 |
| 59 | 5 | 23 | 30 | 5 | 41 | 25 | 35 | 50 |
| 60 | 5 | 59 | 20 | 6 | 17 | 15 | 35 | 50 |
| 61 | 6 | 35 | 10 | 6 | 53 | 0 | 35 | 40 |
| 62 | 7 | 10 | 50 | 7 | 28 | 40 | 35 | 40 |
| 63 | 7 | 46 | 30 | 8 | 4 | 20 | 35 | 40 |
| 64 | 8 | 22 | 10 | 8 | 40 | 0 | 35 | 40 |
| 65 | 8 | 57 | 50 | 9 | 15 | 35 | 35 | 30 |
| 66 | 9 | 33 | 20 | 9 | 51 | 5 | 35 | 30 |
| 67 | 10 | 8 | 50 | 10 | 26 | 30 | 35 | 20 |
| 68 | 10 | 44 | 10 | 11 | 1 | 50 | 35 | 20 |
| 69 | 11 | 19 | 30 | 11 | 37 | 10 | 35 | 20 |
| 70 | 11 | 54 | 50 | 12 | 12 | 25 | 35 | 10 |
| 71 | 12 | 30 | 0 | 12 | 47 | 35 | 35 | 10 |
| 72 | 13 | 5 | 10 | 13 | 22 | 40 | 35 | 0 |
| 73 | 13 | 40 | 10 | 13 | 57 | 40 | 35 | 0 |
| 74 | 14 | 15 | 10 | 14 | 32 | 35 | 34 | 50 |
| 75 | 14 | 49 | 60 | 15 | 7 | 25 | 34 | 50 |
| 76 | 15 | 24 | 50 | 15 | 42 | 10 | 34 | 40 |
| 77 | 15 | 59 | 30 | 16 | 16 | 45 | 34 | 30 |
| 78 | 16 | 34 | 0 | 16 | 51 | 15 | 34 | 30 |
| 79 | 17 | 8 | 30 | 17 | 25 | 40 | 34 | 20 |

TABLE 7-continued

| B - BLOCK (NO. 2) | | | | | | | |
|---|---|---|---|---|---|---|---|
| 80 | 17 | 42 | 50 | 17 | 59 | 55 | 34 | 10 |
| 81 | 18 | 16 | 60 | 18 | 34 | 5 | 34 | 10 |
| 82 | 18 | 51 | 10 | 19 | 8 | 10 | 34 | 0 |
| 83 | 19 | 25 | 10 | 19 | 42 | 5 | 33 | 50 |
| 84 | 19 | 58 | 60 | 20 | 15 | 55 | 33 | 50 |
| 85 | 20 | 32 | 50 | 20 | 49 | 40 | 33 | 40 |
| 86 | 21 | 6 | 30 | 21 | 23 | 15 | 33 | 30 |
| 87 | 21 | 39 | 60 | 21 | 56 | 40 | 33 | 20 |
| 88 | 22 | 13 | 20 | 22 | 30 | 0 | 33 | 20 |
| 89 | 22 | 46 | 40 | 23 | 3 | 15 | 33 | 10 |
| 90 | 23 | 19 | 50 | 23 | 36 | 20 | 33 | 0 |
| 91 | 23 | 52 | 50 | 24 | 9 | 15 | 32 | 50 |
| 92 | 24 | 25 | 40 | 24 | 42 | 0 | 32 | 40 |
| 93 | 24 | 58 | 20 | 25 | 14 | 35 | 32 | 30 |
| 94 | 25 | 30 | 50 | 25 | 47 | 0 | 32 | 20 |
| 95 | 26 | 3 | 10 | 26 | 19 | 20 | 32 | 20 |
| 96 | 26 | 35 | 30 | 26 | 51 | 35 | 32 | 10 |
| 97 | 27 | 7 | 40 | 27 | 23 | 40 | 32 | 0 |
| 98 | 27 | 39 | 40 | 27 | 55 | 35 | 31 | 50 |
| 99 | 28 | 11 | 30 | 28 | 27 | 20 | 31 | 40 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 50 | 1.0000 | 1.0000 | 1.0000 | 0.00 | 0.01 | 66.67 |
| 51 | 1.0000 | 0.9999 | 0.9999 | −0.01 | 0.02 | 66.66 |
| 52 | 1.0000 | 0.9998 | 0.9997 | −0.03 | 0.03 | 66.64 |
| 53 | 1.0000 | 0.9995 | 0.9993 | −0.07 | 0.04 | 66.62 |
| 54 | 1.0000 | 0.9991 | 0.9989 | −0.11 | 0.05 | 66.59 |
| 55 | 1.0000 | 0.9986 | 0.9983 | −0.17 | 0.06 | 66.56 |
| 56 | 0.9954 | 0.9980 | 0.9977 | 0.23 | 0.07 | 66.51 |
| 57 | 0.9954 | 0.9973 | 0.9969 | 0.16 | 0.08 | 66.46 |
| 58 | 0.9954 | 0.9965 | 0.9961 | 0.07 | 0.09 | 66.40 |
| 59 | 0.9954 | 0.9956 | 0.9951 | −0.03 | 0.10 | 66.34 |
| 60 | 0.9954 | 0.9945 | 0.9940 | −0.14 | 0.11 | 66.27 |
| 61 | 0.9907 | 0.9934 | 0.9928 | 0.21 | 0.13 | 66.19 |
| 62 | 0.9907 | 0.9922 | 0.9915 | 0.08 | 0.14 | 66.10 |
| 63 | 0.9907 | 0.9908 | 0.9901 | −0.07 | 0.15 | 66.01 |
| 64 | 0.9907 | 0.9894 | 0.9886 | −0.22 | 0.16 | 65.91 |
| 65 | 0.9861 | 0.9878 | 0.9870 | 0.09 | 0.17 | 65.80 |
| 66 | 0.9861 | 0.9861 | 0.9853 | −0.09 | 0.18 | 65.68 |
| 67 | 0.9815 | 0.9844 | 0.9834 | 0.20 | 0.19 | 65.56 |
| 68 | 0.9815 | 0.9825 | 0.9815 | 0.00 | 0.20 | 65.44 |
| 69 | 0.9815 | 0.9805 | 0.9795 | −0.20 | 0.21 | 65.30 |
| 70 | 0.9769 | 0.9785 | 0.9774 | 0.06 | 0.22 | 65.16 |
| 71 | 0.9769 | 0.9763 | 0.9752 | −0.17 | 0.23 | 65.01 |
| 72 | 0.9722 | 0.9740 | 0.9729 | 0.07 | 0.24 | 64.86 |
| 73 | 0.9722 | 0.9717 | 0.9705 | −0.18 | 0.25 | 64.70 |
| 74 | 0.9676 | 0.9692 | 0.9680 | 0.04 | 0.26 | 64.53 |
| 75 | 0.9676 | 0.9667 | 0.9654 | −0.23 | 0.27 | 64.36 |
| 76 | 0.9630 | 0.9640 | 0.9627 | −0.03 | 0.28 | 64.18 |
| 77 | 0.9583 | 0.9613 | 0.9599 | 0.16 | 0.29 | 63.99 |
| 78 | 0.9583 | 0.9585 | 0.9570 | −0.13 | 0.30 | 63.80 |
| 79 | 0.9537 | 0.9556 | 0.9541 | 0.04 | 0.31 | 63.61 |
| 80 | 0.9491 | 0.9526 | 0.9511 | 0.21 | 0.32 | 63.40 |
| 81 | 0.9491 | 0.9495 | 0.9479 | −0.12 | 0.33 | 63.20 |
| 82 | 0.9444 | 0.9464 | 0.9447 | 0.03 | 0.34 | 62.98 |
| 83 | 0.9398 | 0.9431 | 0.9415 | 0.17 | 0.35 | 62.76 |
| 84 | 0.9398 | 0.9398 | 0.9381 | −0.18 | 0.36 | 62.54 |
| 85 | 0.9352 | 0.9364 | 0.9347 | −0.06 | 0.37 | 62.31 |
| 86 | 0.9306 | 0.9329 | 0.9311 | 0.06 | 0.38 | 62.08 |
| 87 | 0.9259 | 0.9293 | 0.9275 | 0.17 | 0.39 | 61.84 |
| 88 | 0.9259 | 0.9257 | 0.9239 | −0.22 | 0.40 | 61.59 |
| 89 | 0.9218 | 0.9220 | 0.9201 | −0.13 | 0.41 | 61.34 |
| 90 | 0.9167 | 0.9182 | 0.9163 | −0.04 | 0.42 | 61.09 |
| 91 | 0.9120 | 0.9144 | 0.9124 | 0.05 | 0.43 | 60.83 |
| 92 | 0.9074 | 0.9105 | 0.9085 | 0.12 | 0.44 | 60.57 |
| 93 | 0.9028 | 0.9065 | 0.9045 | 0.19 | 0.44 | 60.30 |
| 94 | 0.8981 | 0.9025 | 0.8004 | 0.26 | 0.45 | 60.03 |
| 95 | 0.8981 | 0.8984 | 0.8963 | −0.20 | 0.46 | 59.75 |
| 96 | 0.8935 | 0.8942 | 0.8921 | −0.16 | 0.47 | 59.47 |
| 97 | 0.8889 | 0.8900 | 0.8879 | −0.12 | 0.48 | 59.19 |
| 98 | 0.8843 | 0.8857 | 0.8836 | −0.08 | 0.49 | 58.90 |
| 99 | 0.8796 | 0.8814 | 0.8792 | −0.05 | 0.50 | 58.61 |

TABLE 8

C - BLOCK (NO. 1)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SEC-ONDS |
| 0 | 28 | 43 | 10 | 28 | 58 | 55 | 31 | 30 |
| 1 | 29 | 14 | 40 | 29 | 30 | 20 | 31 | 20 |
| 2 | 29 | 45 | 60 | 30 | 1 | 35 | 31 | 10 |
| 3 | 30 | 17 | 10 | 30 | 32 | 40 | 31 | 0 |
| 4 | 30 | 48 | 10 | 31 | 3 | 35 | 30 | 50 |
| 5 | 31 | 19 | 0 | 31 | 34 | 20 | 30 | 40 |
| 6 | 31 | 49 | 40 | 32 | 4 | 55 | 30 | 30 |
| 7 | 32 | 20 | 10 | 32 | 35 | 20 | 30 | 20 |
| 8 | 32 | 50 | 30 | 33 | 5 | 35 | 30 | 10 |
| 9 | 33 | 20 | 40 | 33 | 35 | 40 | 30 | 0 |
| 10 | 33 | 50 | 40 | 34 | 5 | 35 | 29 | 50 |
| 11 | 34 | 20 | 30 | 34 | 35 | 20 | 29 | 40 |
| 12 | 34 | 50 | 10 | 35 | 4 | 55 | 29 | 30 |
| 13 | 35 | 19 | 40 | 35 | 34 | 20 | 29 | 20 |
| 14 | 35 | 49 | 0 | 36 | 3 | 35 | 29 | 10 |
| 15 | 36 | 18 | 10 | 36 | 32 | 40 | 29 | 0 |
| 16 | 36 | 47 | 10 | 37 | 1 | 30 | 28 | 40 |
| 17 | 37 | 15 | 50 | 37 | 30 | 5 | 28 | 30 |
| 18 | 37 | 44 | 20 | 37 | 58 | 30 | 28 | 20 |
| 19 | 38 | 12 | 40 | 38 | 26 | 45 | 28 | 10 |
| 20 | 38 | 40 | 50 | 38 | 54 | 50 | 28 | 0 |
| 21 | 39 | 8 | 50 | 39 | 22 | 45 | 27 | 50 |
| 22 | 39 | 36 | 40 | 39 | 50 | 30 | 27 | 40 |
| 23 | 40 | 4 | 20 | 40 | 18 | 5 | 27 | 30 |
| 24 | 40 | 31 | 50 | 40 | 45 | 30 | 27 | 20 |
| 25 | 40 | 59 | 10 | 41 | 12 | 40 | 27 | 0 |
| 26 | 41 | 26 | 10 | 41 | 39 | 35 | 26 | 50 |
| 27 | 41 | 53 | 0 | 42 | 6 | 20 | 26 | 40 |
| 28 | 42 | 19 | 40 | 42 | 32 | 55 | 26 | 30 |
| 29 | 42 | 46 | 10 | 42 | 59 | 20 | 26 | 20 |
| 30 | 43 | 12 | 30 | 43 | 25 | 35 | 26 | 10 |
| 31 | 43 | 38 | 40 | 43 | 51 | 40 | 26 | 0 |
| 32 | 44 | 4 | 40 | 44 | 17 | 35 | 25 | 50 |
| 33 | 44 | 30 | 30 | 44 | 43 | 15 | 25 | 30 |
| 34 | 44 | 56 | 0 | 45 | 8 | 40 | 25 | 20 |
| 35 | 45 | 21 | 20 | 45 | 33 | 55 | 25 | 10 |
| 36 | 45 | 46 | 30 | 45 | 59 | 0 | 25 | 0 |
| 37 | 46 | 11 | 30 | 46 | 23 | 55 | 24 | 50 |
| 38 | 46 | 36 | 20 | 46 | 48 | 40 | 24 | 40 |
| 39 | 47 | 1 | 0 | 47 | 13 | 15 | 24 | 30 |
| 40 | 47 | 25 | 30 | 47 | 37 | 40 | 24 | 20 |
| 41 | 47 | 49 | 50 | 48 | 1 | 50 | 23 | 60 |
| 42 | 48 | 13 | 50 | 48 | 25 | 45 | 23 | 50 |
| 43 | 48 | 37 | 40 | 48 | 49 | 30 | 23 | 40 |
| 44 | 49 | 1 | 20 | 49 | 13 | 5 | 23 | 30 |
| 45 | 49 | 24 | 50 | 49 | 36 | 30 | 23 | 20 |
| 46 | 49 | 48 | 10 | 49 | 59 | 45 | 23 | 10 |
| 47 | 50 | 11 | 20 | 50 | 22 | 50 | 23 | 0 |
| 48 | 50 | 34 | 20 | 50 | 45 | 45 | 22 | 50 |
| 49 | 50 | 57 | 10 | 51 | 8 | 30 | 22 | 40 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 0 | 0.8750 | 0.8770 | 0.8748 | −0.03 | 0.51 | 58.32 |
| 1 | 0.8704 | 0.8725 | 0.8703 | −0.01 | 0.52 | 58.02 |
| 2 | 0.8657 | 0.8681 | 0.8658 | 0.01 | 0.53 | 57.72 |
| 3 | 0.8611 | 0.8635 | 0.8612 | 0.01 | 0.53 | 57.42 |
| 4 | 0.8565 | 0.8589 | 0.8566 | 0.02 | 0.54 | 57.11 |
| 5 | 0.8519 | 0.8543 | 0.8520 | 0.02 | 0.55 | 56.80 |
| 6 | 0.8472 | 0.8496 | 0.8473 | 0.01 | 0.56 | 56.49 |
| 7 | 0.8426 | 0.8449 | 0.8426 | 0.00 | 0.57 | 56.17 |
| 8 | 0.8380 | 0.8402 | 0.8378 | −0.02 | 0.57 | 55.85 |
| 9 | 0.8333 | 0.8354 | 0.8330 | −0.04 | 0.58 | 55.53 |
| 10 | 0.8287 | 0.8306 | 0.8281 | −0.07 | 0.59 | 55.21 |
| 11 | 0.8241 | 0.8257 | 0.8232 | −0.10 | 0.60 | 54.88 |
| 12 | 0.8194 | 0.8208 | 0.8183 | −0.14 | 0.60 | 54.56 |
| 13 | 0.8148 | 0.8159 | 0.8134 | −0.18 | 0.61 | 54.23 |
| 14 | 0.8102 | 0.8109 | 0.8084 | −0.22 | 0.62 | 53.89 |

TABLE 8-continued

C - BLOCK (NO. 1)

| | | | | | | |
|---|---|---|---|---|---|---|
| 15 | 0.8056 | 0.8059 | 0.8034 | −0.27 | 0.63 | 53.56 |
| 16 | 0.7963 | 0.8009 | 0.7984 | 0.26 | 0.63 | 53.22 |
| 17 | 0.7917 | 0.7959 | 0.7933 | 0.21 | 0.64 | 52.89 |
| 18 | 0.7870 | 0.7908 | 0.7883 | 0.16 | 0.64 | 52.55 |
| 19 | 0.7824 | 0.7857 | 0.7832 | 0.10 | 0.65 | 52.21 |
| 20 | 0.7778 | 0.7806 | 0.7781 | 0.04 | 0.66 | 51.87 |
| 21 | 0.7731 | 0.7755 | 0.7730 | −0.02 | 0.67 | 51.53 |
| 22 | 0.7685 | 0.7704 | 0.7678 | −0.09 | 0.67 | 51.19 |
| 23 | 0.7639 | 0.7652 | 0.7627 | −0.16 | 0.68 | 50.84 |
| 24 | 0.7593 | 0.7601 | 0.7575 | −0.24 | 0.68 | 50.50 |
| 25 | 0.7500 | 0.7549 | 0.7523 | 0.30 | 0.69 | 50.15 |
| 26 | 0.7454 | 0.7497 | 0.7471 | 0.23 | 0.70 | 49.81 |
| 27 | 0.7407 | 0.7445 | 0.7419 | 0.16 | 0.70 | 49.46 |
| 28 | 0.7361 | 0.7393 | 0.7367 | 0.08 | 0.71 | 49.11 |
| 29 | 0.7315 | 0.7341 | 0.7315 | 0.00 | 0.71 | 48.77 |
| 30 | 0.7289 | 0.7289 | 0.7263 | −0.08 | 0.72 | 48.42 |
| 31 | 0.7222 | 0.7236 | 0.7210 | −0.17 | 0.73 | 48.07 |
| 32 | 0.7176 | 0.7184 | 0.7158 | −0.25 | 0.73 | 47.72 |
| 33 | 0.7083 | 0.7131 | 0.7105 | 0.31 | 0.73 | 47.37 |
| 34 | 0.7037 | 0.7079 | 0.7053 | 0.23 | 0.74 | 47.02 |
| 35 | 0.6991 | 0.7027 | 0.7001 | 0.15 | 0.75 | 46.67 |
| 36 | 0.6944 | 0.6975 | 0.6949 | 0.06 | 0.75 | 46.32 |
| 37 | 0.6898 | 0.6922 | 0.6896 | −0.03 | 0.76 | 45.98 |
| 38 | 0.6852 | 0.6870 | 0.6844 | −0.11 | 0.76 | 45.63 |
| 39 | 0.6806 | 0.6818 | 0.6792 | −0.20 | 0.77 | 45.28 |
| 40 | 0.6759 | 0.6766 | 0.6739 | −0.29 | 0.77 | 44.93 |
| 41 | 0.6667 | 0.6713 | 0.6687 | 0.31 | 0.78 | 44.58 |
| 42 | 0.6620 | 0.6661 | 0.6635 | 0.23 | 0.78 | 44.24 |
| 43 | 0.6574 | 0.6609 | 0.6584 | 0.14 | 0.79 | 43.89 |
| 44 | 0.6528 | 0.6558 | 0.6532 | 0.06 | 0.79 | 43.55 |
| 45 | 0.6481 | 0.6506 | 0.6480 | −0.02 | 0.80 | 43.20 |
| 46 | 0.6435 | 0.6454 | 0.6428 | −0.11 | 0.80 | 42.86 |
| 47 | 0.6389 | 0.6403 | 0.6377 | −0.19 | 0.81 | 42.51 |
| 48 | 0.6343 | 0.6351 | 0.6325 | −0.27 | 0.81 | 42.17 |
| 49 | 0.6296 | 0.6300 | 0.6274 | −0.36 | 0.82 | 41.83 |

TABLE 9

C - BLOCK (NO. 2)

| SOUTH-NORTH NUMBER | SOUTHERN END LATITUDE | | | CENTRAL LATITUDE | | | DIFFERENCE A | |
|---|---|---|---|---|---|---|---|---|
| | DEGREES | MINUTES | SECONDS | DEGREES | MINUTES | SECONDS | MINUTES | SECONDS |
| 50 | 51 | 19 | 50 | 51 | 31 | 0 | 22 | 20 |
| 51 | 51 | 42 | 10 | 51 | 53 | 15 | 22 | 10 |
| 52 | 52 | 4 | 20 | 52 | 15 | 20 | 22 | 0 |
| 53 | 52 | 26 | 20 | 52 | 37 | 15 | 21 | 50 |
| 54 | 52 | 48 | 10 | 52 | 59 | 0 | 21 | 40 |
| 55 | 53 | 9 | 50 | 53 | 20 | 35 | 21 | 30 |
| 56 | 53 | 31 | 20 | 53 | 42 | 0 | 21 | 20 |
| 57 | 53 | 52 | 40 | 54 | 3 | 15 | 21 | 10 |
| 58 | 54 | 13 | 50 | 54 | 24 | 20 | 21 | 0 |
| 59 | 54 | 34 | 50 | 54 | 45 | 15 | 20 | 50 |
| 60 | 54 | 55 | 40 | 55 | 6 | 0 | 20 | 40 |
| 61 | 55 | 16 | 20 | 55 | 26 | 35 | 20 | 30 |
| 62 | 55 | 36 | 50 | 55 | 46 | 55 | 20 | 10 |
| 63 | 55 | 57 | 0 | 56 | 7 | 0 | 20 | 0 |
| 64 | 56 | 17 | 0 | 56 | 26 | 55 | 19 | 50 |
| 65 | 56 | 36 | 50 | 56 | 46 | 40 | 19 | 40 |
| 66 | 56 | 56 | 30 | 57 | 6 | 15 | 19 | 30 |
| 67 | 57 | 16 | 0 | 57 | 25 | 40 | 19 | 20 |
| 68 | 57 | 35 | 20 | 57 | 44 | 55 | 19 | 10 |
| 69 | 57 | 54 | 30 | 58 | 4 | 0 | 18 | 60 |
| 70 | 58 | 13 | 30 | 58 | 22 | 55 | 18 | 50 |
| 71 | 58 | 32 | 20 | 58 | 41 | 40 | 18 | 40 |
| 72 | 58 | 51 | 0 | 59 | 0 | 15 | 18 | 30 |
| 73 | 59 | 9 | 30 | 59 | 18 | 40 | 18 | 20 |
| 74 | 59 | 27 | 50 | 59 | 36 | 55 | 18 | 10 |
| 75 | 59 | 46 | 0 | 59 | 55 | 0 | 18 | 0 |
| 76 | 60 | 4 | 0 | 60 | 12 | 55 | 17 | 50 |
| 77 | 60 | 21 | 50 | 60 | 30 | 40 | 17 | 40 |

TABLE 9-continued

C - BLOCK (NO. 2)

| | | | | | | | | |
|---|---|---|---|---|---|---|---|---|
| 78 | 60 | 39 | 30 | 60 | 48 | 15 | 17 | 30 |
| 79 | 60 | 57 | 0 | 61 | 6 | 40 | 17 | 20 |
| 80 | 61 | 14 | 20 | 61 | 22 | 55 | 17 | 10 |
| 81 | 61 | 31 | 30 | 61 | 40 | 5 | 17 | 10 |
| 82 | 61 | 48 | 40 | 61 | 57 | 10 | 17 | 0 |
| 83 | 62 | 5 | 40 | 62 | 14 | 5 | 16 | 50 |
| 84 | 62 | 22 | 30 | 62 | 30 | 50 | 16 | 40 |
| 85 | 62 | 39 | 10 | 62 | 47 | 25 | 16 | 30 |
| 86 | 62 | 55 | 40 | 63 | 3 | 50 | 16 | 20 |
| 87 | 63 | 12 | 0 | 63 | 20 | 5 | 16 | 10 |
| 88 | 63 | 28 | 10 | 63 | 36 | 10 | 15 | 60 |
| 89 | 63 | 44 | 10 | 63 | 52 | 5 | 15 | 60 |
| 90 | 64 | 0 | 0 | 64 | 7 | 50 | 15 | 40 |
| 91 | 64 | 15 | 40 | 64 | 23 | 25 | 15 | 30 |
| 92 | 64 | 31 | 10 | 64 | 38 | 50 | 15 | 20 |
| 93 | 64 | 46 | 30 | 64 | 54 | 10 | 15 | 20 |
| 94 | 65 | 1 | 50 | 65 | 9 | 25 | 15 | 10 |
| 95 | 65 | 17 | 0 | 65 | 24 | 30 | 15 | 0 |
| 96 | 65 | 32 | 0 | 65 | 39 | 25 | 14 | 50 |
| 97 | 65 | 46 | 50 | 65 | 54 | 10 | 14 | 40 |
| 98 | 66 | 1 | 30 | 66 | 8 | 45 | 14 | 30 |
| 99 | 66 | 16 | 0 | 66 | 23 | 15 | 14 | 30 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 50 | 0.6204 | 0.6248 | 0.6223 | 0.31 | 0.81 | 41.49 |
| 51 | 0.6157 | 0.6197 | 0.6172 | 0.24 | 0.82 | 41.15 |
| 52 | 0.6111 | 0.6147 | 0.6121 | 0.17 | 0.82 | 40.81 |
| 53 | 0.6065 | 0.6096 | 0.6071 | 0.10 | 0.83 | 40.47 |
| 54 | 0.6019 | 0.6046 | 0.6020 | 0.03 | 0.83 | 40.14 |
| 55 | 0.5972 | 0.5995 | 0.5970 | −0.03 | 0.84 | 39.80 |
| 56 | 0.5926 | 0.5945 | 0.5920 | −0.10 | 0.84 | 39.47 |
| 57 | 0.5880 | 0.5895 | 0.5870 | −0.16 | 0.85 | 38.13 |
| 58 | 0.5833 | 0.5845 | 0.5820 | −0.22 | 0.85 | 38.80 |
| 59 | 0.5787 | 0.5796 | 0.5771 | −0.28 | 0.85 | 38.47 |
| 60 | 0.5741 | 0.5746 | 0.5721 | −0.34 | 0.86 | 38.14 |
| 61 | 0.5694 | 0.5697 | 0.5672 | −0.39 | 0.86 | 37.82 |
| 62 | 0.5602 | 0.5848 | 0.5623 | 0.38 | 0.86 | 37.49 |
| 63 | 0.5556 | 0.5599 | 0.5575 | 0.35 | 0.86 | 37.17 |
| 64 | 0.5509 | 0.5551 | 0.5427 | 0.32 | 0.87 | 36.85 |
| 65 | 0.5463 | 0.5503 | 0.5479 | 0.29 | 0.87 | 36.53 |
| 66 | 0.5417 | 0.5455 | 0.5431 | 0.27 | 0.87 | 38.21 |
| 67 | 0.5370 | 0.5407 | 0.5384 | 0.25 | 0.88 | 35.89 |
| 68 | 0.5324 | 0.5360 | 0.5338 | 0.23 | 0.88 | 35.58 |
| 69 | 0.5278 | 0.5313 | 0.5289 | 0.22 | 0.88 | 35.26 |
| 70 | 0.5231 | 0.5266 | 0.5243 | 0.21 | 0.89 | 34.95 |
| 71 | 0.5185 | 0.5219 | 0.5196 | 0.21 | 0.89 | 34.64 |
| 72 | 0.5139 | 0.5173 | 0.5150 | 0.21 | 0.89 | 34.33 |
| 73 | 0.5093 | 0.5127 | 0.5104 | 0.22 | 0.89 | 34.03 |
| 74 | 0.5046 | 0.5081 | 0.5058 | 0.23 | 0.90 | 33.72 |
| 75 | 0.5000 | 0.5035 | 0.5013 | 0.25 | 0.90 | 33.42 |
| 76 | 0.4954 | 0.4990 | 0.4967 | 0.28 | 0.90 | 33.12 |
| 77 | 0.4907 | 0.4945 | 0.4923 | 0.31 | 0.90 | 32.82 |
| 78 | 0.4861 | 0.4900 | 0.4878 | 0.35 | 0.91 | 32.52 |
| 79 | 0.4816 | 0.4856 | 0.4834 | 0.39 | 0.91 | 32.22 |
| 80 | 0.4769 | 0.4812 | 0.4790 | 0.44 | 0.91 | 31.93 |
| 81 | 0.4769 | 0.4768 | 0.4746 | −0.48 | 0.92 | 31.64 |
| 82 | 0.4722 | 0.4724 | 0.4702 | −0.43 | 0.92 | 31.35 |
| 83 | 0.4676 | 0.4680 | 0.4659 | −0.37 | 0.93 | 31.06 |
| 84 | 0.4630 | 0.4637 | 0.4615 | −0.31 | 0.93 | 30.77 |
| 85 | 0.4583 | 0.4594 | 0.4572 | −0.24 | 0.93 | 30.48 |
| 86 | 0.4537 | 0.4551 | 0.4530 | −0.16 | 0.93 | 30.20 |
| 87 | 0.4491 | 0.4509 | 0.4488 | −0.07 | 0.93 | 29.82 |
| 88 | 0.4444 | 0.4467 | 0.4446 | 0.03 | 0.93 | 29.64 |
| 89 | 0.4398 | 0.4425 | 0.4404 | 0.14 | 0.93 | 29.36 |
| 90 | 0.4352 | 0.4384 | 0.4363 | 0.26 | 0.94 | 29.09 |
| 91 | 0.4306 | 0.4343 | 0.4322 | 0.39 | 0.94 | 28.82 |
| 92 | 0.4259 | 0.4302 | 0.4282 | 0.53 | 0.94 | 28.55 |
| 93 | 0.4259 | 0.4262 | 0.4242 | −0.42 | 0.95 | 28.28 |
| 94 | 0.4213 | 0.4221 | 0.4201 | −0.28 | 0.95 | 28.01 |
| 95 | 0.4167 | 0.4181 | 0.4161 | −0.12 | 0.95 | 27.74 |
| 96 | 0.4120 | 0.4142 | 0.4122 | 0.04 | 0.95 | 27.48 |
| 97 | 0.4074 | 0.4102 | 0.4083 | 0.22 | 0.95 | 27.22 |

TABLE 9-continued

| C - BLOCK (NO. 2) | | | | | |
|---|---|---|---|---|---|
| 98 | 0.4028 | 0.4063 | 0.4044 | 0.40 | 0.95 | 26.96 |
| 99 | 0.4028 | 0.4025 | 0.4005 | −0.56 | 0.96 | 26.70 |

TABLE 10

Y - BLOCK (NO. 1)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SE-CONDS |
| 0 | 66 | 30 | 30 | 66 | 37 | 40 | 14 | 20 |
| 1 | 66 | 44 | 50 | 66 | 51 | 55 | 14 | 10 |
| 2 | 66 | 59 | 0 | 67 | 6 | 0 | 14 | 0 |
| 3 | 67 | 13 | 0 | 67 | 19 | 55 | 13 | 50 |
| 4 | 67 | 26 | 50 | 67 | 33 | 40 | 13 | 40 |
| 5 | 67 | 40 | 30 | 67 | 47 | 20 | 13 | 40 |
| 6 | 67 | 54 | 10 | 68 | 0 | 55 | 13 | 30 |
| 7 | 68 | 7 | 40 | 68 | 14 | 20 | 13 | 20 |
| 8 | 68 | 21 | 0 | 68 | 27 | 35 | 13 | 10 |
| 9 | 68 | 34 | 10 | 68 | 40 | 45 | 13 | 10 |
| 10 | 68 | 47 | 20 | 68 | 53 | 50 | 13 | 0 |
| 11 | 69 | 0 | 20 | 69 | 6 | 45 | 12 | 50 |
| 12 | 69 | 13 | 10 | 69 | 19 | 30 | 12 | 40 |
| 13 | 69 | 25 | 50 | 69 | 32 | 10 | 12 | 40 |
| 14 | 69 | 38 | 30 | 69 | 44 | 45 | 12 | 30 |
| 15 | 69 | 51 | 0 | 69 | 57 | 10 | 12 | 20 |
| 16 | 70 | 3 | 20 | 70 | 9 | 25 | 12 | 10 |
| 17 | 70 | 15 | 30 | 70 | 21 | 35 | 12 | 10 |
| 18 | 70 | 27 | 40 | 70 | 33 | 40 | 12 | 0 |
| 19 | 70 | 39 | 40 | 70 | 45 | 35 | 11 | 50 |
| 20 | 70 | 51 | 30 | 70 | 57 | 20 | 11 | 40 |
| 21 | 71 | 3 | 10 | 71 | 9 | 0 | 11 | 40 |
| 22 | 71 | 14 | 50 | 71 | 20 | 35 | 11 | 30 |
| 23 | 71 | 26 | 20 | 71 | 32 | 0 | 11 | 20 |
| 24 | 71 | 37 | 40 | 71 | 43 | 20 | 11 | 20 |
| 25 | 71 | 49 | 0 | 71 | 54 | 35 | 11 | 10 |
| 26 | 72 | 0 | 10 | 72 | 5 | 40 | 11 | 0 |
| 27 | 72 | 11 | 10 | 72 | 16 | 40 | 11 | 0 |
| 28 | 72 | 22 | 10 | 72 | 27 | 35 | 10 | 50 |
| 29 | 72 | 33 | 0 | 72 | 38 | 20 | 10 | 40 |
| 30 | 72 | 43 | 40 | 72 | 49 | 0 | 10 | 40 |
| 31 | 72 | 54 | 20 | 72 | 59 | 35 | 10 | 30 |
| 32 | 73 | 4 | 50 | 73 | 10 | 5 | 10 | 30 |
| 33 | 73 | 15 | 20 | 73 | 20 | 30 | 10 | 20 |
| 34 | 73 | 25 | 40 | 73 | 30 | 45 | 10 | 10 |
| 35 | 73 | 35 | 50 | 73 | 40 | 55 | 10 | 10 |
| 36 | 73 | 46 | 0 | 73 | 51 | 0 | 10 | 0 |
| 37 | 73 | 56 | 0 | 74 | 0 | 55 | 9 | 50 |
| 38 | 74 | 5 | 50 | 74 | 10 | 45 | 9 | 50 |
| 39 | 74 | 15 | 40 | 74 | 20 | 30 | 9 | 40 |
| 40 | 74 | 25 | 20 | 74 | 30 | 10 | 9 | 40 |
| 41 | 74 | 35 | 0 | 74 | 39 | 45 | 9 | 30 |
| 42 | 74 | 44 | 30 | 74 | 49 | 15 | 9 | 30 |
| 43 | 74 | 54 | 0 | 74 | 58 | 40 | 9 | 20 |
| 44 | 75 | 3 | 20 | 75 | 7 | 55 | 9 | 10 |
| 45 | 75 | 12 | 30 | 75 | 17 | 5 | 9 | 10 |
| 46 | 75 | 21 | 40 | 75 | 26 | 10 | 9 | 0 |
| 47 | 75 | 30 | 40 | 75 | 35 | 10 | 9 | 0 |
| 48 | 75 | 39 | 40 | 75 | 44 | 5 | 8 | 50 |
| 49 | 75 | 48 | 30 | 75 | 52 | 55 | 8 | 50 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 0 | 0.3981 | 0.3986 | 0.3967 | −0.36 | 0.96 | 26.45 |
| 1 | 0.3935 | 0.3948 | 0.3929 | −0.16 | 0.96 | 26.19 |
| 2 | 0.3889 | 0.3910 | 0.3891 | 0.06 | 0.96 | 25.94 |
| 3 | 0.3843 | 0.3872 | 0.3854 | 0.29 | 0.96 | 25.69 |
| 4 | 0.3796 | 0.3835 | 0.3817 | 0.54 | 0.96 | 25.45 |
| 5 | 0.3796 | 0.3799 | 0.3780 | −0.43 | 0.97 | 25.20 |

TABLE 10-continued

Y - BLOCK (NO. 1)

| | | | | | | |
|---|---|---|---|---|---|---|
| 6 | 0.3750 | 0.3762 | 0.3744 | −0.17 | 0.97 | 24.96 |
| 7 | 0.3704 | 0.3725 | 0.3707 | 0.10 | 0.97 | 24.72 |
| 8 | 0.3657 | 0.3689 | 0.3672 | 0.39 | 0.97 | 24.48 |
| 9 | 0.3657 | 0.3654 | 0.3636 | −0.59 | 0.98 | 24.24 |
| 10 | 0.3611 | 0.3618 | 0.3600 | −0.30 | 0.98 | 24.00 |
| 11 | 0.3565 | 0.3583 | 0.3565 | 0.01 | 0.97 | 23.77 |
| 12 | 0.3519 | 0.3548 | 0.3531 | 0.34 | 0.97 | 23.54 |
| 13 | 0.3519 | 0.3513 | 0.3496 | −0.64 | 0.98 | 23.31 |
| 14 | 0.3472 | 0.3479 | 0.3462 | −0.30 | 0.98 | 23.08 |
| 15 | 0.3426 | 0.3445 | 0.3428 | 0.06 | 0.98 | 22.85 |
| 16 | 0.3380 | 0.3411 | 0.3394 | 0.44 | 0.98 | 22.63 |
| 17 | 0.3380 | 0.3378 | 0.3361 | −0.55 | 0.99 | 22.41 |
| 18 | 0.3333 | 0.3344 | 0.3328 | −0.16 | 0.98 | 22.19 |
| 19 | 0.3287 | 0.3312 | 0.3295 | 0.25 | 0.98 | 21.97 |
| 20 | 0.3241 | 0.3279 | 0.3263 | 0.68 | 0.98 | 21.75 |
| 21 | 0.3241 | 0.3247 | 0.3231 | −0.30 | 0.99 | 21.54 |
| 22 | 0.3194 | 0.3215 | 0.3199 | 0.14 | 0.99 | 21.33 |
| 23 | 0.3148 | 0.3183 | 0.3168 | 0.61 | 0.98 | 21.12 |
| 24 | 0.3148 | 0.3152 | 0.3136 | −0.38 | 0.99 | 20.91 |
| 25 | 0.3102 | 0.3121 | 0.3105 | 0.11 | 0.99 | 20.70 |
| 26 | 0.3056 | 0.3090 | 0.3074 | 0.62 | 0.99 | 20.50 |
| 27 | 0.3056 | 0.3059 | 0.3044 | −0.38 | 1.00 | 20.29 |
| 28 | 0.3009 | 0.3029 | 0.3014 | 0.15 | 0.99 | 20.09 |
| 29 | 0.2963 | 0.2999 | 0.2984 | 0.70 | 0.99 | 19.89 |
| 30 | 0.2963 | 0.2969 | 0.2954 | −0.29 | 1.00 | 19.70 |
| 31 | 0.2917 | 0.2939 | 0.2925 | 0.28 | 0.99 | 19.50 |
| 32 | 0.2917 | 0.2910 | 0.2896 | −0.73 | 1.00 | 19.30 |
| 33 | 0.2870 | 0.2881 | 0.2867 | −0.13 | 1.00 | 19.11 |
| 34 | 0.2824 | 0.2852 | 0.2838 | 0.49 | 0.99 | 18.92 |
| 35 | 0.2824 | 0.2824 | 0.2810 | −0.51 | 1.01 | 18.73 |
| 36 | 0.2778 | 0.2795 | 0.2782 | 0.13 | 1.00 | 18.54 |
| 37 | 0.2731 | 0.2768 | 0.2754 | 0.81 | 0.99 | 18.36 |
| 38 | 0.2731 | 0.2740 | 0.2726 | −0.19 | 1.00 | 18.18 |
| 39 | 0.2685 | 0.2713 | 0.2699 | 0.51 | 1.00 | 17.99 |
| 40 | 0.2685 | 0.2685 | 0.2672 | −0.50 | 1.01 | 17.81 |
| 41 | 0.2639 | 0.2658 | 0.2645 | 0.23 | 1.00 | 17.63 |
| 42 | 0.2639 | 0.2632 | 0.2618 | −0.78 | 1.01 | 17.46 |
| 43 | 0.2593 | 0.2605 | 0.2592 | −0.03 | 1.01 | 17.28 |
| 44 | 0.2546 | 0.2579 | 0.2566 | 0.77 | 1.00 | 17.11 |
| 45 | 0.2546 | 0.2553 | 0.2540 | −0.24 | 1.01 | 16.93 |
| 46 | 0.2500 | 0.2527 | 0.2515 | 0.58 | 1.00 | 16.76 |
| 47 | 0.2500 | 0.2502 | 0.2489 | −0.43 | 1.01 | 16.59 |
| 48 | 0.2454 | 0.2477 | 0.2464 | 0.42 | 1.01 | 16.43 |
| 49 | 0.2454 | 0.2452 | 0.2439 | −0.59 | 1.02 | 16.26 |

TABLE 11

Y - BLOCK (NO. 2)

| SOUTH-NORTH NUMBER | SOUTHERN END LATITUDE | | | CENTRAL LATITUDE | | | DIFFERENCE A | |
|---|---|---|---|---|---|---|---|---|
| | DE-GREES | MIN-UTES | SEC-ONDS | DE-GREES | MIN-UTES | SEC-ONDS | MIN-UTES | SEC-ONDS |
| 50 | 75 | 57 | 20 | 76 | 1 | 40 | 8 | 40 |
| 51 | 76 | 6 | 0 | 76 | 10 | 20 | 8 | 40 |
| 52 | 76 | 14 | 40 | 76 | 18 | 55 | 8 | 30 |
| 53 | 76 | 23 | 10 | 76 | 27 | 25 | 8 | 30 |
| 54 | 76 | 31 | 40 | 76 | 36 | 60 | 8 | 20 |
| 55 | 76 | 40 | 0 | 76 | 44 | 10 | 8 | 20 |
| 56 | 76 | 48 | 20 | 76 | 52 | 25 | 8 | 10 |
| 57 | 76 | 56 | 30 | 77 | 0 | 35 | 8 | 10 |
| 58 | 77 | 4 | 40 | 77 | 8 | 40 | 8 | 0 |
| 59 | 77 | 12 | 40 | 77 | 16 | 40 | 8 | 0 |
| 60 | 77 | 20 | 40 | 77 | 24 | 35 | 7 | 50 |
| 61 | 77 | 28 | 30 | 77 | 32 | 25 | 7 | 50 |
| 62 | 77 | 36 | 20 | 77 | 40 | 10 | 7 | 40 |
| 63 | 77 | 44 | 0 | 77 | 47 | 50 | 7 | 40 |
| 64 | 77 | 51 | 40 | 77 | 55 | 25 | 7 | 30 |
| 65 | 77 | 59 | 10 | 78 | 2 | 55 | 7 | 30 |
| 66 | 78 | 6 | 40 | 78 | 10 | 20 | 7 | 20 |
| 67 | 78 | 14 | 0 | 78 | 17 | 40 | 7 | 20 |
| 68 | 78 | 21 | 20 | 78 | 24 | 55 | 7 | 10 |

TABLE 11-continued

Y - BLOCK (NO. 2)

| | | | | | | | | |
|---|---|---|---|---|---|---|---|---|
| 69 | 78 | 28 | 30 | 78 | 32 | 5 | 7 | 10 |
| 70 | 78 | 35 | 40 | 78 | 39 | 10 | 7 | 0 |
| 71 | 78 | 42 | 40 | 78 | 46 | 10 | 7 | 0 |
| 72 | 78 | 49 | 40 | 78 | 53 | 10 | 7 | 0 |
| 73 | 78 | 56 | 40 | 79 | 0 | 5 | 6 | 50 |
| 74 | 79 | 3 | 30 | 79 | 6 | 55 | 6 | 50 |
| 75 | 79 | 10 | 20 | 79 | 13 | 40 | 6 | 40 |
| 76 | 79 | 17 | 0 | 79 | 20 | 20 | 6 | 40 |
| 77 | 79 | 23 | 40 | 79 | 27 | 0 | 6 | 40 |
| 78 | 79 | 30 | 20 | 79 | 33 | 35 | 6 | 30 |
| 79 | 79 | 36 | 50 | 79 | 40 | 5 | 6 | 30 |
| 80 | 79 | 43 | 20 | 79 | 46 | 30 | 6 | 20 |
| 81 | 79 | 49 | 40 | 79 | 52 | 50 | 6 | 20 |
| 82 | 79 | 56 | 0 | 79 | 59 | 10 | 6 | 20 |
| 83 | 80 | 2 | 20 | 80 | 5 | 25 | 6 | 10 |
| 84 | 80 | 8 | 30 | 80 | 11 | 35 | 6 | 10 |
| 85 | 80 | 14 | 40 | 80 | 17 | 40 | 6 | 0 |
| 86 | 80 | 20 | 40 | 80 | 23 | 40 | 6 | 0 |
| 87 | 80 | 26 | 40 | 80 | 29 | 40 | 6 | 0 |
| 88 | 80 | 32 | 40 | 80 | 35 | 35 | 5 | 50 |
| 89 | 80 | 38 | 30 | 80 | 41 | 25 | 5 | 50 |
| 90 | 80 | 44 | 20 | 80 | 47 | 15 | 5 | 50 |
| 91 | 80 | 50 | 10 | 80 | 53 | 0 | 5 | 40 |
| 92 | 80 | 55 | 50 | 80 | 58 | 40 | 5 | 40 |
| 93 | 81 | 1 | 30 | 81 | 4 | 20 | 5 | 40 |
| 94 | 81 | 7 | 10 | 81 | 9 | 55 | 5 | 30 |
| 95 | 81 | 12 | 40 | 81 | 15 | 25 | 5 | 30 |
| 96 | 81 | 18 | 10 | 81 | 20 | 50 | 5 | 20 |
| 97 | 81 | 23 | 30 | 81 | 26 | 10 | 5 | 20 |
| 98 | 81 | 28 | 60 | 81 | 31 | 30 | 5 | 20 |
| 99 | 81 | 34 | 10 | 81 | 36 | 50 | 5 | 20 |

| SOUTH-NORTH NUMBER | A/36 | SOUTHERN END LATITUDE COS | CENTRAL LATITUDE COS | LENGTH-BREADTH ERROR % | SOUTH-NORTH ERROR % | UNIT SIZE km |
|---|---|---|---|---|---|---|
| 50 | 0.2407 | 0.2427 | 0.2415 | 0.29 | 1.01 | 16.10 |
| 51 | 0.2407 | 0.2402 | 0.2390 | −0.73 | 1.02 | 15.93 |
| 52 | 0.2361 | 0.2378 | 0.2366 | 0.20 | 1.01 | 15.77 |
| 53 | 0.2361 | 0.2354 | 0.2342 | −0.83 | 1.02 | 15.61 |
| 54 | 0.2315 | 0.2330 | 0.2318 | 0.14 | 1.01 | 15.45 |
| 55 | 0.2315 | 0.2306 | 0.2294 | −0.89 | 1.02 | 15.30 |
| 56 | 0.2269 | 0.2283 | 0.2271 | 0.11 | 1.01 | 15.14 |
| 57 | 0.2269 | 0.2259 | 0.2248 | −0.92 | 1.02 | 14.99 |
| 58 | 0.2222 | 0.2236 | 0.2225 | 0.12 | 1.01 | 14.83 |
| 59 | 0.2222 | 0.2214 | 0.2202 | −0.91 | 1.03 | 14.68 |
| 60 | 0.2176 | 0.2191 | 0.2180 | 0.18 | 1.02 | 14.53 |
| 61 | 0.2176 | 0.2169 | 0.2158 | −0.85 | 1.03 | 14.38 |
| 62 | 0.2130 | 0.2146 | 0.2136 | 0.28 | 1.02 | 14.24 |
| 63 | 0.2130 | 0.2125 | 0.2114 | −0.75 | 1.03 | 14.09 |
| 64 | 0.2083 | 0.2103 | 0.2092 | 0.42 | 1.01 | 13.95 |
| 65 | 0.2083 | 0.2081 | 0.2071 | −0.60 | 1.03 | 13.81 |
| 66 | 0.2037 | 0.2060 | 0.2050 | 0.62 | 1.01 | 13.66 |
| 67 | 0.2037 | 0.2039 | 0.2029 | −0.40 | 1.02 | 13.53 |
| 68 | 0.1991 | 0.2018 | 0.2008 | 0.87 | 1.01 | 13.39 |
| 69 | 0.1991 | 0.1998 | 0.1988 | −0.15 | 1.02 | 13.25 |
| 70 | 0.1944 | 0.1978 | 0.1968 | 1.17 | 1.01 | 13.12 |
| 71 | 0.1944 | 0.1958 | 0.1948 | 0.16 | 1.02 | 12.98 |
| 72 | 0.1944 | 0.1938 | 0.1928 | −0.87 | 1.03 | 12.85 |
| 73 | 0.1898 | 0.1918 | 0.1908 | 0.51 | 1.02 | 12.72 |
| 74 | 0.1898 | 0.1898 | 0.1888 | −0.52 | 1.03 | 12.59 |
| 75 | 0.1852 | 0.1879 | 0.1869 | 0.92 | 1.01 | 12.46 |
| 76 | 0.1852 | 0.1860 | 0.1850 | −0.10 | 1.02 | 12.33 |
| 77 | 0.1852 | 0.1840 | 0.1831 | −1.14 | 1.04 | 12.21 |
| 78 | 0.1806 | 0.1821 | 0.1812 | 0.36 | 1.02 | 12.08 |
| 79 | 0.1806 | 0.1803 | 0.1794 | −0.67 | 1.03 | 11.96 |
| 80 | 0.1759 | 0.1784 | 0.1775 | 0.89 | 1.02 | 11.83 |
| 81 | 0.1759 | 0.1766 | 0.1757 | −0.13 | 1.03 | 11.71 |
| 82 | 0.1759 | 0.1748 | 0.1739 | −1.17 | 1.04 | 11.59 |
| 83 | 0.1713 | 0.1730 | 0.1721 | 0.46 | 1.02 | 11.47 |
| 84 | 0.1713 | 0.1712 | 0.1703 | −0.57 | 1.03 | 11.36 |
| 85 | 0.1667 | 0.1694 | 0.1686 | 1.14 | 1.02 | 11.24 |
| 86 | 0.1667 | 0.1677 | 0.1669 | 0.12 | 1.03 | 11.12 |

TABLE 11-continued

Y - BLOCK (NO. 2)

| 87 | 0.1667 | 0.1660 | 0.1651 | −0.92 | 1.04 | 11.01 |
| 88 | 0.1620 | 0.1643 | 0.1634 | 0.86 | 1.02 | 10.90 |
| 89 | 0.1620 | 0.1626 | 0.1618 | −0.16 | 1.03 | 10.78 |
| 90 | 0.1620 | 0.1609 | 0.1601 | −1.21 | 1.04 | 10.67 |
| 91 | 0.1574 | 0.1593 | 0.1584 | 0.66 | 1.02 | 10.56 |
| 92 | 0.1574 | 0.1576 | 0.1568 | −0.38 | 1.03 | 10.45 |
| 93 | 0.1574 | 0.1560 | 0.1552 | −1.43 | 1.04 | 10.35 |
| 94 | 0.1528 | 0.1544 | 0.1536 | 0.53 | 1.02 | 10.24 |
| 95 | 0.1528 | 0.1528 | 0.1520 | −0.51 | 1.03 | 10.13 |
| 96 | 0.1481 | 0.1512 | 0.1504 | 1.53 | 1.01 | 10.03 |
| 97 | 0.1481 | 0.1497 | 0.1489 | 0.51 | 1.02 | 9.93 |
| 98 | 0.1481 | 0.1481 | 0.1474 | −0.52 | 1.04 | 9.83 |
| 99 | 0.1481 | 0.1466 | 0.1458 | −1.58 | 1.05 | 9.72 |

TABLE 12

(NO.1 : 00-49)

| EAST-WEST NUMBER | I | | II | | III | | IV | | V | | VI | |
|---|---|---|---|---|---|---|---|---|---|---|---|---|
| | DEGREES | MINUTES | DEGREES | MINUTES | DEGREES | MINUTES | DEGREES | MINUTES | DEGREES | MINUTES | DEGREES | MINUTES |
| START POINT | 170° EAST LONGITUDE | | 130° WEST LONGITUDE | | 70° WEST LONGITUDE | | 10° WEST LONGITUDE | | 50° EAST LONGITUDE | | 110° EAST LONGITUDE | |
| END POINT | 130° WEST LONGITUDE | | 70° WEST LONGITUDE | | 10° WEST LONGITUDE | | 50° EAST LONGITUDE | | 110° EAST LONGITUDE | | 170° EAST LONGITUDE | |
| 00 | 170 | 36 | 129 | 24 | 69 | 24 | 9 | 24 | 50 | 36 | 110 | 36 |
| 01 | 171 | 12 | 128 | 48 | 68 | 48 | 8 | 48 | 51 | 12 | 111 | 12 |
| 02 | 171 | 48 | 128 | 12 | 68 | 12 | 8 | 12 | 51 | 48 | 111 | 48 |
| 03 | 172 | 24 | 127 | 36 | 67 | 36 | 7 | 36 | 52 | 24 | 112 | 24 |
| 04 | 173 | 0 | 127 | 0 | 67 | 0 | 7 | 0 | 53 | 0 | 113 | 0 |
| 05 | 173 | 36 | 126 | 24 | 66 | 24 | 6 | 24 | 53 | 36 | 113 | 36 |
| 06 | 174 | 12 | 125 | 48 | 65 | 48 | 5 | 48 | 54 | 12 | 114 | 12 |
| 07 | 174 | 48 | 125 | 12 | 65 | 12 | 5 | 12 | 54 | 48 | 114 | 48 |
| 08 | 175 | 24 | 124 | 36 | 64 | 36 | 4 | 36 | 55 | 24 | 115 | 24 |
| 09 | 176 | 0 | 124 | 0 | 64 | 0 | 4 | 0 | 56 | 0 | 116 | 0 |
| 10 | 176 | 36 | 123 | 24 | 63 | 24 | 3 | 24 | 56 | 36 | 116 | 36 |
| 11 | 177 | 12 | 122 | 48 | 62 | 48 | 2 | 48 | 57 | 12 | 117 | 12 |
| 12 | 177 | 48 | 122 | 12 | 62 | 12 | 2 | 12 | 57 | 48 | 117 | 48 |
| 13 | 178 | 24 | 121 | 36 | 61 | 36 | 1 | 36 | 58 | 24 | 118 | 24 |
| 14 | 179 | 0 | 121 | 0 | 61 | 0 | 1 | 0 | 59 | 0 | 119 | 0 |
| 15 | 179 | 36 | 120 | 24 | 60 | 24 | 0 | 24 | 59 | 36 | 119 | 36 |
| 16 | 179 | 48 | 119 | 48 | 59 | 48 | 0 | 12 | 60 | 12 | 120 | 12 |
| 17 | 179 | 12 | 119 | 12 | 59 | 12 | 0 | 48 | 60 | 48 | 120 | 48 |
| 18 | 178 | 36 | 118 | 36 | 58 | 36 | 1 | 24 | 61 | 24 | 121 | 24 |
| 19 | 178 | 0 | 118 | 0 | 58 | 0 | 2 | 0 | 62 | 0 | 122 | 0 |
| 20 | 177 | 24 | 117 | 24 | 57 | 24 | 2 | 36 | 62 | 36 | 122 | 36 |
| 21 | 176 | 48 | 116 | 48 | 56 | 48 | 3 | 12 | 63 | 12 | 123 | 12 |
| 22 | 176 | 12 | 116 | 12 | 56 | 12 | 3 | 48 | 63 | 48 | 123 | 48 |
| 23 | 175 | 36 | 115 | 36 | 55 | 36 | 4 | 24 | 64 | 24 | 124 | 24 |
| 24 | 175 | 0 | 115 | 0 | 55 | 0 | 5 | 0 | 65 | 0 | 125 | 0 |
| 25 | 174 | 24 | 114 | 24 | 54 | 24 | 5 | 36 | 65 | 36 | 125 | 36 |
| 26 | 173 | 48 | 113 | 48 | 53 | 48 | 6 | 12 | 66 | 12 | 126 | 12 |
| 27 | 173 | 12 | 113 | 12 | 53 | 12 | 6 | 48 | 66 | 48 | 126 | 48 |
| 28 | 172 | 36 | 112 | 36 | 52 | 36 | 7 | 24 | 67 | 24 | 127 | 24 |
| 29 | 172 | 0 | 112 | 0 | 52 | 0 | 8 | 0 | 68 | 0 | 128 | 0 |
| 30 | 171 | 24 | 111 | 24 | 51 | 24 | 8 | 36 | 68 | 36 | 128 | 36 |
| 31 | 170 | 48 | 110 | 48 | 50 | 48 | 9 | 12 | 69 | 12 | 129 | 12 |
| 32 | 170 | 12 | 110 | 12 | 50 | 12 | 9 | 48 | 69 | 48 | 129 | 48 |
| 33 | 169 | 36 | 109 | 36 | 49 | 36 | 10 | 24 | 70 | 24 | 130 | 24 |
| 34 | 169 | 0 | 109 | 0 | 49 | 0 | 11 | 0 | 71 | 0 | 131 | 0 |
| 35 | 168 | 24 | 108 | 24 | 48 | 24 | 11 | 36 | 71 | 36 | 131 | 36 |
| 36 | 167 | 48 | 107 | 48 | 47 | 48 | 12 | 12 | 72 | 12 | 132 | 12 |
| 37 | 167 | 12 | 107 | 12 | 47 | 12 | 12 | 48 | 72 | 48 | 132 | 48 |
| 38 | 166 | 36 | 106 | 36 | 46 | 36 | 13 | 24 | 73 | 24 | 133 | 24 |
| 39 | 166 | 0 | 106 | 0 | 46 | 0 | 14 | 0 | 74 | 0 | 134 | 0 |
| 40 | 165 | 24 | 105 | 24 | 45 | 24 | 14 | 36 | 74 | 36 | 134 | 36 |
| 41 | 164 | 48 | 104 | 48 | 44 | 48 | 15 | 12 | 75 | 12 | 135 | 12 | OSAKA
| 42 | 164 | 12 | 104 | 12 | 44 | 12 | 15 | 48 | 75 | 48 | 135 | 48 |
| 43 | 163 | 36 | 103 | 36 | 43 | 36 | 16 | 24 | 76 | 24 | 136 | 24 |
| 44 | 163 | 0 | 103 | 0 | 43 | 0 | 17 | 0 | 77 | 0 | 137 | 0 |
| 45 | 162 | 24 | 102 | 24 | 42 | 24 | 17 | 36 | 77 | 36 | 137 | 36 |
| 46 | 161 | 48 | 101 | 48 | 41 | 48 | 18 | 12 | 78 | 12 | 138 | 12 |
| 47 | 161 | 12 | 101 | 12 | 41 | 12 | 18 | 48 | 78 | 48 | 138 | 48 |
| 48 | 160 | 36 | 100 | 36 | 40 | 36 | 19 | 24 | 79 | 24 | 139 | 24 |
| 49 | 160 | 0 | 100 | 0 | 40 | 0 | 20 | 0 | 80 | 0 | 140 | 0 | TOKYO

TABLE 13

(NO.2 : 50-99)

| EAST-WEST NUMBER | I | | II | | III | | IV | | V | | VI | |
|---|---|---|---|---|---|---|---|---|---|---|---|---|
| | DEGREES | MINUTES | DEGREES | MINUTES | DEGREES | MINUTES | DEGREES | MINUTES | DEGREES | MINUTES | DEGREES | MINUTES |
| 50 | 159 | 24 | 99 | 24 | 39 | 24 | 20 | 36 | 80 | 36 | 140 | 36 |
| 51 | 158 | 48 | 98 | 48 | 38 | 48 | 21 | 12 | 81 | 12 | 141 | 12 |
| 52 | 158 | 12 | 98 | 12 | 38 | 12 | 21 | 48 | 81 | 48 | 141 | 48 |
| 53 | 157 | 36 | 97 | 36 | 37 | 36 | 22 | 24 | 82 | 24 | 142 | 24 |
| 54 | 157 | 0 | 97 | 0 | 37 | 0 | 23 | 0 | 83 | 0 | 143 | 0 |
| 55 | 156 | 24 | 96 | 24 | 36 | 24 | 23 | 36 | 83 | 36 | 143 | 36 |
| 56 | 155 | 48 | 95 | 48 | 35 | 48 | 24 | 12 | 84 | 12 | 144 | 12 |
| 57 | 155 | 12 | 95 | 12 | 35 | 12 | 24 | 48 | 84 | 48 | 144 | 48 |
| 58 | 154 | 36 | 94 | 36 | 34 | 36 | 25 | 24 | 85 | 24 | 145 | 24 |
| 59 | 154 | 0 | 94 | 0 | 34 | 0 | 26 | 0 | 86 | 0 | 146 | 0 |
| 60 | 153 | 24 | 93 | 24 | 33 | 24 | 26 | 36 | 86 | 36 | 146 | 36 |
| 61 | 152 | 48 | 92 | 48 | 32 | 48 | 27 | 12 | 87 | 12 | 147 | 12 |
| 62 | 152 | 12 | 92 | 12 | 32 | 12 | 27 | 48 | 87 | 48 | 147 | 48 |
| 63 | 151 | 36 | 91 | 36 | 31 | 36 | 28 | 24 | 88 | 24 | 148 | 24 |
| 64 | 151 | 0 | 91 | 0 | 31 | 0 | 29 | 0 | 89 | 0 | 149 | 0 |
| 65 | 150 | 24 | 90 | 24 | 30 | 24 | 29 | 36 | 89 | 36 | 149 | 36 |
| 66 | 149 | 48 | 89 | 48 | 29 | 48 | 30 | 12 | 90 | 12 | 150 | 12 |
| 67 | 149 | 12 | 89 | 12 | 29 | 12 | 30 | 48 | 90 | 48 | 150 | 48 |
| 68 | 148 | 36 | 88 | 36 | 28 | 36 | 31 | 24 | 91 | 24 | 151 | 24 |
| 69 | 148 | 0 | 88 | 0 | 28 | 0 | 32 | 0 | 92 | 0 | 152 | 0 |
| 70 | 147 | 24 | 87 | 24 | 27 | 24 | 32 | 36 | 92 | 36 | 152 | 36 |
| 71 | 146 | 48 | 86 | 48 | 26 | 48 | 33 | 12 | 93 | 12 | 153 | 12 |
| 72 | 146 | 12 | 86 | 12 | 26 | 12 | 33 | 48 | 93 | 48 | 153 | 48 |
| 73 | 145 | 36 | 85 | 36 | 25 | 36 | 34 | 24 | 94 | 24 | 154 | 24 |
| 74 | 145 | 0 | 85 | 0 | 25 | 0 | 35 | 0 | 95 | 0 | 155 | 0 |
| 75 | 144 | 24 | 84 | 24 | 24 | 24 | 35 | 36 | 95 | 36 | 155 | 36 |
| 76 | 143 | 48 | 83 | 48 | 23 | 48 | 36 | 12 | 96 | 12 | 156 | 12 |
| 77 | 143 | 12 | 83 | 12 | 23 | 12 | 36 | 48 | 96 | 48 | 156 | 48 |
| 78 | 142 | 36 | 82 | 36 | 22 | 36 | 37 | 24 | 97 | 24 | 157 | 24 |
| 79 | 142 | 0 | 82 | 0 | 22 | 0 | 30 | 0 | 98 | 0 | 158 | 0 |
| 80 | 141 | 24 | 81 | 24 | 21 | 24 | 30 | 36 | 98 | 36 | 158 | 36 |
| 81 | 140 | 48 | 80 | 48 | 20 | 48 | 39 | 12 | 99 | 12 | 159 | 12 |
| 82 | 140 | 12 | 80 | 12 | 20 | 12 | 9 | 48 | 99 | 48 | 159 | 48 |
| 83 | 139 | 36 | 79 | 36 | 19 | 36 | 40 | 24 | 100 | 24 | 160 | 24 |
| 84 | 139 | 0 | 79 | 0 | 19 | 0 | 41 | 0 | 101 | 0 | 161 | 0 |
| 85 | 138 | 24 | 78 | 24 | 18 | 24 | 41 | 36 | 101 | 36 | 161 | 36 |
| 86 | 137 | 48 | 77 | 48 | 17 | 48 | 42 | 12 | 102 | 12 | 162 | 12 |
| 87 | 137 | 12 | 77 | 12 | 17 | 12 | 42 | 48 | 102 | 48 | 162 | 48 |
| 88 | 136 | 36 | 76 | 36 | 16 | 36 | 43 | 24 | 103 | 24 | 163 | 24 |
| 89 | 136 | 0 | 76 | 0 | 16 | 0 | 44 | 0 | 104 | 0 | 164 | 0 |
| 90 | 135 | 24 | 75 | 24 | 15 | 24 | 44 | 36 | 104 | 36 | 164 | 36 |
| 91 | 134 | 48 | 74 | 48 | 14 | 48 | 45 | 12 | 105 | 12 | 165 | 12 |
| 92 | 134 | 12 | 74 | 12 | 14 | 12 | 45 | 48 | 105 | 48 | 165 | 48 |
| 93 | 133 | 36 | 73 | 36 | 13 | 36 | 46 | 24 | 106 | 24 | 166 | 24 |
| 94 | 133 | 0 | 73 | 0 | 13 | 0 | 47 | 0 | 107 | 0 | 167 | 0 |
| 95 | 132 | 24 | 72 | 24 | 12 | 24 | 47 | 36 | 107 | 36 | 167 | 36 |
| 96 | 131 | 48 | 71 | 48 | 11 | 48 | 48 | 12 | 108 | 12 | 168 | 12 |
| 97 | 131 | 12 | 71 | 12 | 11 | 12 | 48 | 48 | 108 | 48 | 168 | 48 |
| 98 | 130 | 36 | 70 | 36 | 10 | 36 | 49 | 24 | 109 | 24 | 169 | 24 |
| 99 | 130 | 0 | 70 | 0 | 10 | 0 | 50 | 0 | 110 | 0 | 170 | 0 |

☐ AREAS IN WESTERN HEMISPHERE

For reference sake, in regard to the latitude/longitude, the latitude is different in the southern and northern hemispheres, and the longitude increases in different directions in the eastern and western hemispheres, so that different conversion methods are required for the four hemispheres, respectively. While a description is herein given of a conversion method for areas in the eastern hemisphere to which Japan belongs, conversions can be made as follows in the other respective hemispheres as well.

This conversion is made by block selection unit $1b1$, unit selection unit $1b2$, and mesh selection unit $1b3$ of selection unit $1b$, and N-code output unit $1c1$ of output unit $1c$ in conversion module 1 through the following steps S1-S8.

1. First, block selection unit $1b1$ compares the longitude of a requested position with Table 12 and Table 13 to examine in which of zone numbers I-VI, and in which range of the 2-digit east-west number within the block, the position lies (step S1).

2. Next, unit selection unit $2b2$ compares the latitude of the requested position with Table 2-Table 11 to examine in which block number and in which range of the 2-digit south-north number the position lies (step S2).

3. Unit selection unit $1b2$ determines a block number for the position from the foregoing process, and combines the 2-digit east-west number from 00 to 99 within the block with the 2-digit south-north number from 00 to 99 to create a 4-digit numerical value which is determined to be a unit number for the position (step S3).

4. Mesh selection unit $1b3$ subtracts the western end longitude of the found unit from the longitude of the requested position to find the difference, converts the difference to seconds, and divides the seconds by 2160 seconds which equals 36 minutes converted to seconds (step S4).

5. To find an n-digit east-west mesh number, mesh selection unit $1b3$ multiplies the numerical value found above by 10 raised to n-th power, and defines its integer portion as the east-west number of the mesh (step S5).

6. Mesh selection unit 1b3 calculates the difference between the latitude of the requested position and the northern end latitude of the found unit, converts the difference to seconds, and divides the seconds by a numerical value which equals difference A of the unit, retrieved from any of Table 2-Table 11, as converted to seconds (step S8).

7. To find an n-digit south-north mesh number, mesh selection unit 1b3 multiplies the calculated value by 10 raised to n-th power, and defines its integer portion as the south-north number of the mesh (step S7).

8. N-code output unit 1c1 defines a combination of the block number, unit number, east-west number, and south-north number arranged in this order as the N-code for the requested position (step S8). For example, using Osaka Station as an example, it is represented by 6A, 4288/502-266.

Also, in regard to step S8, a required number of digits may be selected from among the block number, unit number, and mesh number in accordance with an application for delivery as a mesh code.

Alternatively, a mesh code having a number of digits selected from the block number, unit number, and mesh number in accordance with an application may be entered for processing.

The foregoing process of converting the latitude/longitude to the N-code will be described in a specific manner, giving Osaka Station as an example.

Atlases currently available on the market are expressed in accordance with the old positioning system, and the central port of Osaka Station, for example, is located at 135 degrees, 29 minutes, 56 seconds east longitude, and 34 degrees, 41 minutes, 57 seconds north latitude. However, since the N-code corresponds to the latitude/longitude of the new positioning system coordinates, the central port of Osaka Station is expressed by 135 degrees, 29 minutes, 46 seconds east-longitude, and 34 degrees, 42 minutes, 09 seconds north latitude, as converted to the latitude/longitude in the new positioning system by the new-old conversion application TKY2JDG disclosed by the Geographical Survey Institute.

When the latitude/longitude are converted in accordance with the aforementioned rules, the longitude is first applied to Table 12 and Table 13 at step S1 to find that the zone is VI, and that the east-west number is 42.

Next, when the latitude is applied to Table 2-Table 11 at step S2, it is understood that the south-north number belongs to 88 in the A-block of Table 5. Consequently, the block number and unit number are expressed by 6A, 4288 at step S3. In other words, the unit number is represented by a combination of the east-west number of 42 with the south-north number of 88.

Next, in accordance with step S4, the western end longitude of east-west number 42 in Table 12, i.e., 135 degrees, 12 minutes east longitude of the eastern end longitude of east-west number 41 is subtracted from the longitude to derive the difference of 17 minutes, 46 seconds, which is converted to seconds. The resulting 1066 seconds are divided by 2160 to find a value of 0.4935185.

Next, at step S5, when one wishes to have three digits for the east-west mesh number, the foregoing value is multiplied by $10^3$ to derive 493.518, the integer part of which is 493. Thus, the mesh number is determined to be 493. When four digits are desired, the mesh number of 4935 is derived in a similar manner.

Subsequently, at step S6, the latitude of Osaka Station is subtracted from the northern end latitude of south-north number 88 in Table 5, i.e., the western end latitude of 34 degrees, 50 minutes, 10 seconds of west-north number 87 to find a difference of 8 minutes, 01 second, which is then converted to seconds. The resulting 481 seconds are divided by 1780 seconds, which equals difference A of south-north number 88, i.e., 29 minutes, 40 seconds, in Table 5, converted to seconds, to find a value of 0.27022.

Next, at step S7, when one wishes to have three digits for the south-north mesh number, the foregoing value is multiplied by $10^3$ to derive 270.22, the integer part of which is 270. Thus, the mesh number is determined to be 270. When four digits are desired, the mesh number of 2702 is derived in a similar manner.

Finally, at step 88, the block number, unit number, and mesh number, found in the foregoing manner, are arranged to express the N-code for the central port of Osaka Station as 6A, 4288/493-270 when the mesh number is represented in three digits (with an accuracy of approximately 50 m), and as 6A, 4288/4935-2702 when the mesh number is represented in four digits (with an accuracy of approximately 5 m).

Here, using surroundings of Osaka Station as an example, a description will be given of the effectiveness of the area representation resulting from the broadness of an object for the N-code generated by the conversion module.

Figure 9:
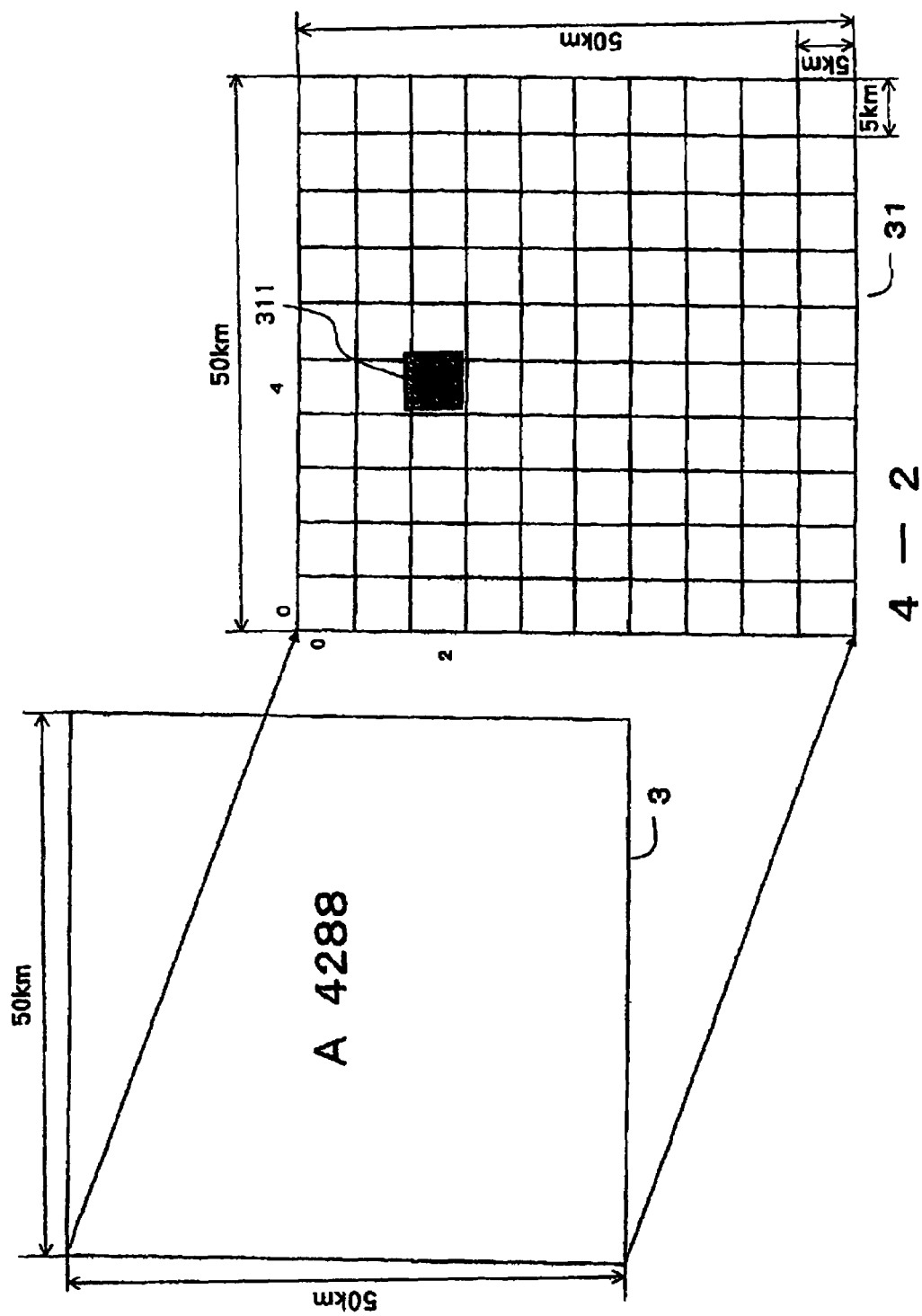
[FIG. 9]
Unit 6A, 4288 corresponding to the vicinity of Osaka Prefecture shown in FIG. 4 which is divided into ten in east-west and south-north directions into 5-km meshes of the N-code.

FIG. 9 is a diagram illustrating 5-km meshes for the N-code, where 6A, 4288, which is a unit corresponding to the vicinity of Osaka prefecture shown in FIG. 4, is divided into ten sections in the east-west and south-north directions, in which numbers 0-9 are given in the east-west direction, and numbers 0-9 are given in the south-north direction.

In FIG. 9, 50-km unit 3 is divided every 5 km into meshes which are defined as 50-km meshes 31. Narrowing down a target to the vicinity of Osaka city, the vicinity of Osaka city corresponds to a mesh numbered 4 in the east-west direction and numbered 2 in the south-north direction, i.e., the mesh numbered 4-2 (5-km mesh 311).

Figure 10:
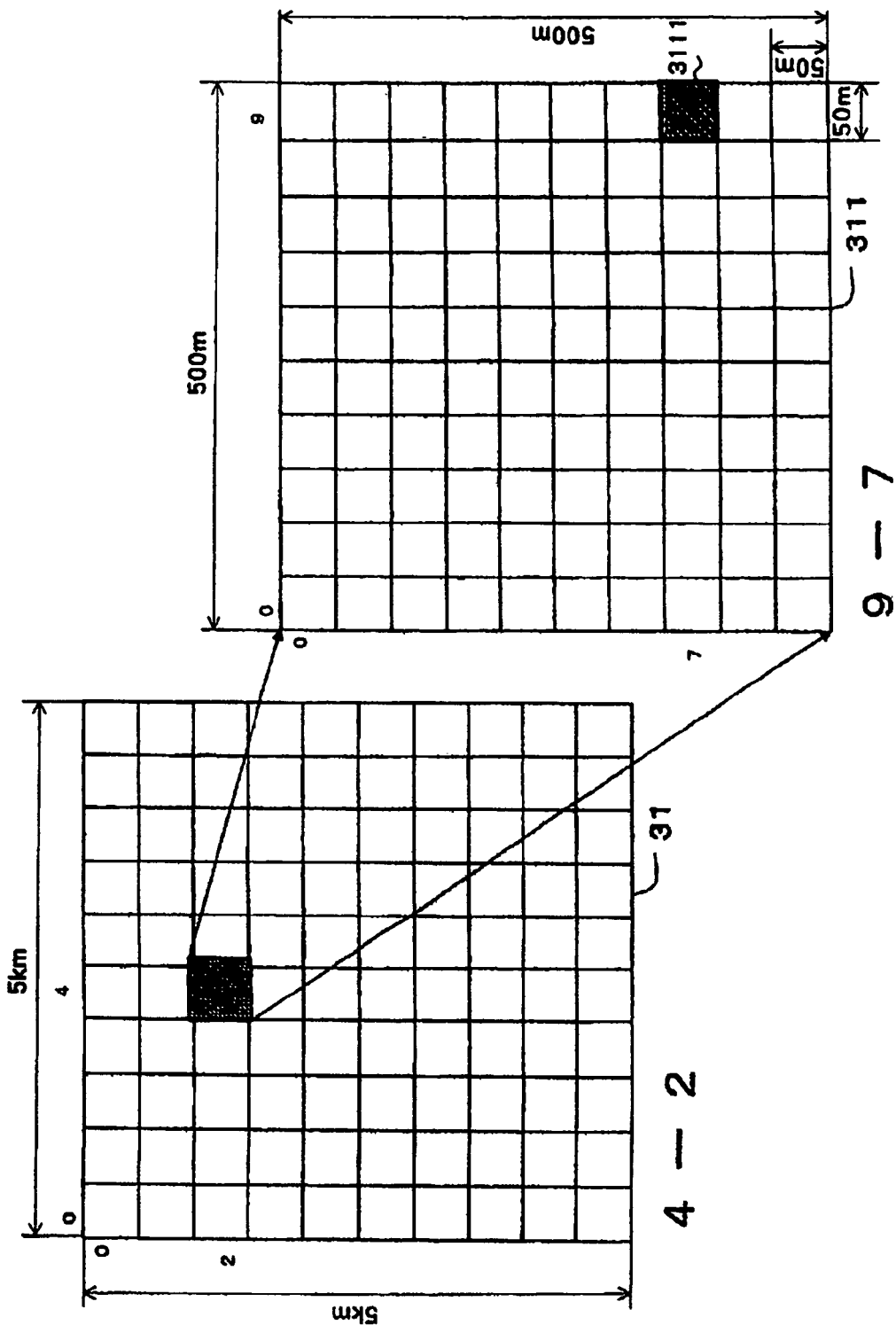
[FIG. 10]
Mesh number 4-2 shown in FIG. 9 which is divided into ten every 50 meters in the east-west and south-north direction into 500-meter meshes of the N-code.

FIG. 10 illustrates 4-2 (5-km mesh 311. Note that the left-hand figure is designated 31, and in the following, numbers are shifted by one digit) for the N-code, shown in FIG. 9, which is further divided every 500 meters into ten sections in the east-west and south-north directions. In 4-2 (5-km mesh 311), narrowing down a target to the vicinity of Osaka Station, the vicinity of Osaka Station corresponds to a mesh numbered 9-7, i.e., 9 in the east-west direction and 7 in the south-north direction, in the 5-km mesh 311. Here, by combining mesh number 4-2 shown in FIG. 9 with mesh number 9-7 shown in FIG. 10, the vicinity of Osaka Station is represented by mesh number 49-27 (500-meter mesh 3111).

Figure 11:
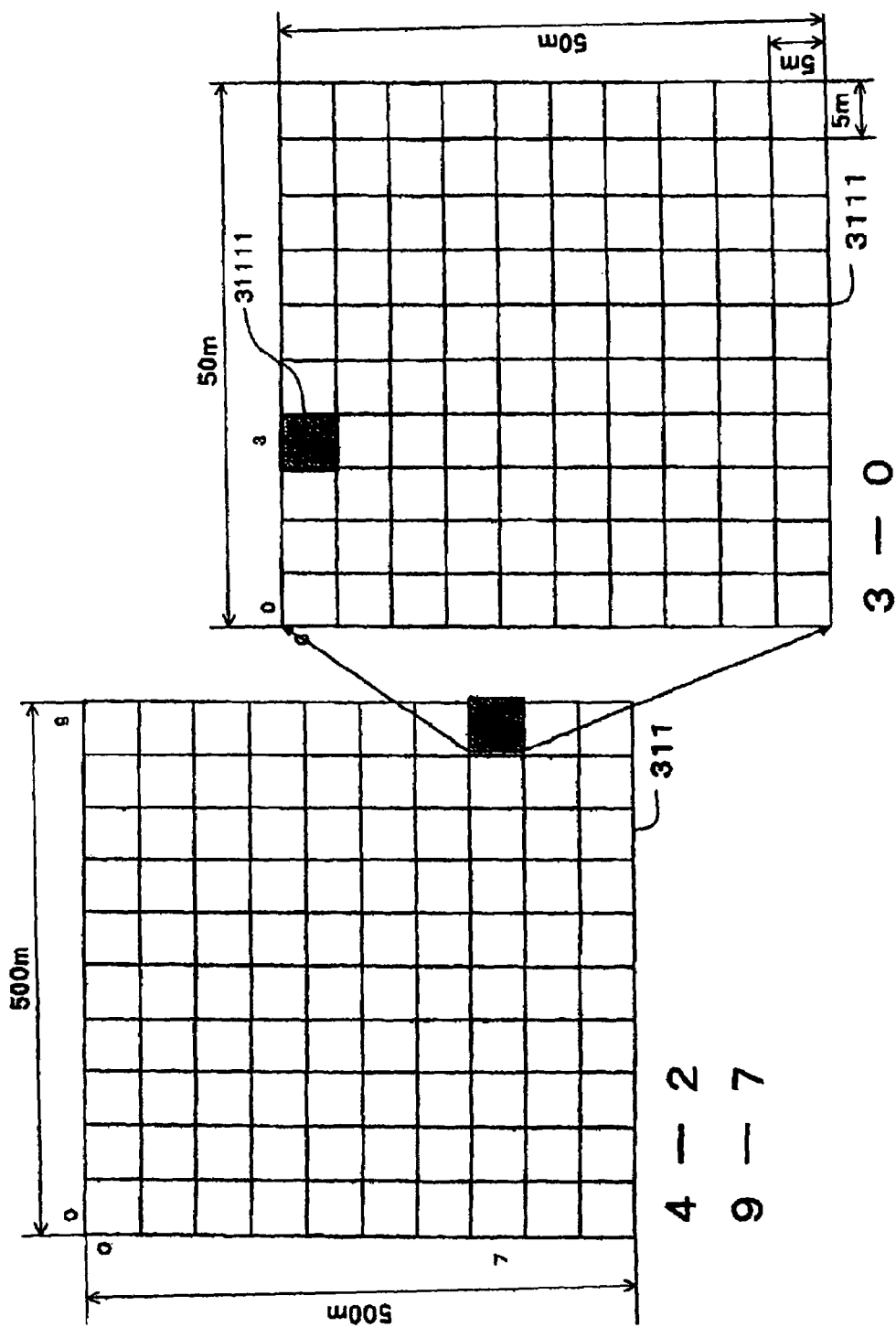
[FIG. 11]
Mesh number 49-27 shown in FIG. 10 which is divided every 5 meters in the east-west and south-north directions into 50-meter meshes.

FIG. 11 illustrates a 500-meter mesh, i.e., 500-meter mesh 49-27 (500-meter mesh 3111) shown in FIG. 10, which is further divided every 50 meters into ten sections in the east-west and south-north directions. Narrowing down a target to the central port of Osaka Station in mesh number 49-27 (500-meter mesh 3111), the central port of Osaka Station corresponds to a mesh numbered 3-0, i.e., a mesh numbered 3 in the east-west direction and 0 in the south-north direction, which is 500-meter mesh 3111. Here, by combining the aforementioned mesh number 49-27 with mesh number 3-0 shown in FIG. 11, the central port of Osaka Station is represented by mesh number 493-270 (50-meter mesh 31111).

Figure 12:
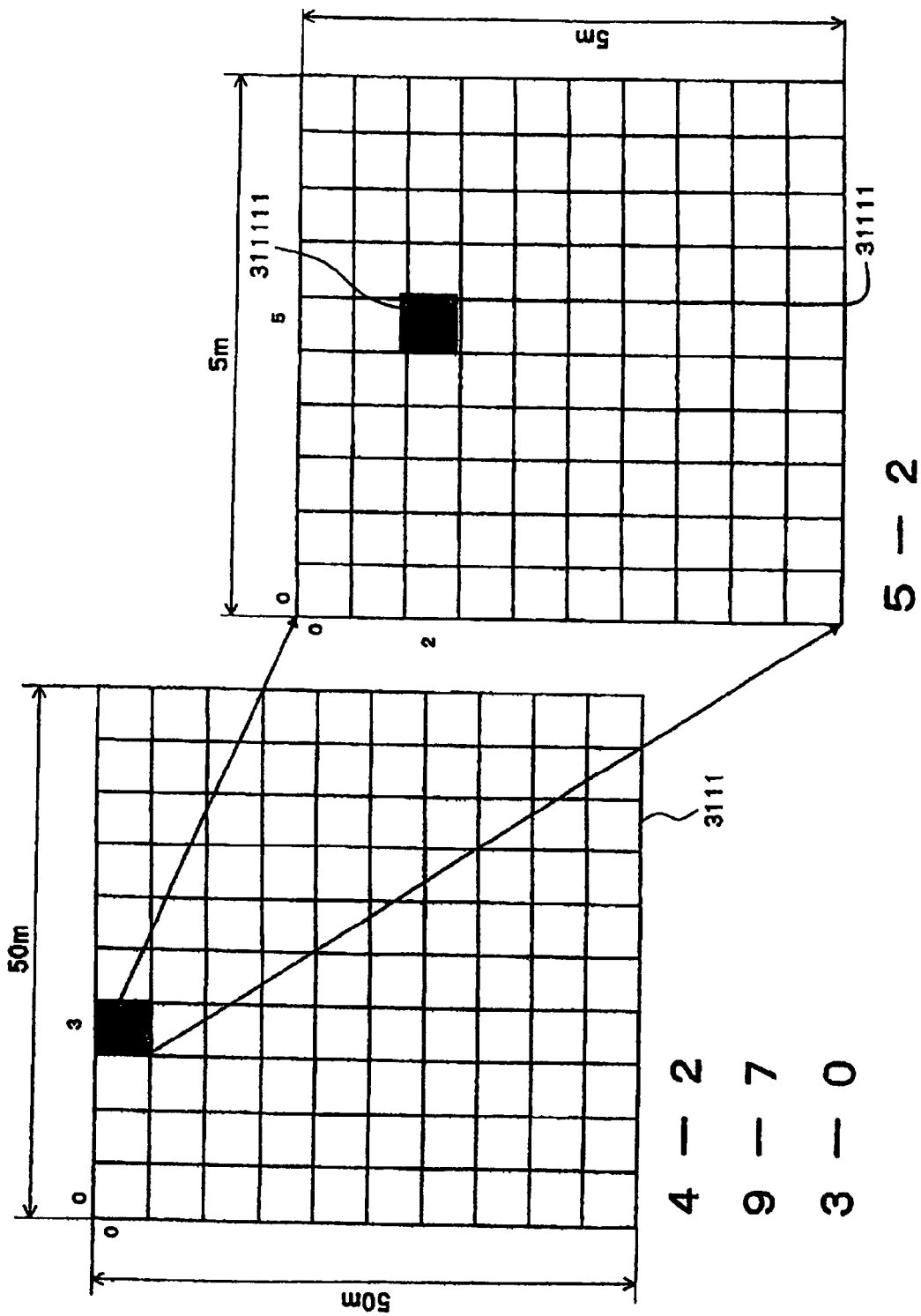
[FIG. 12]
Mesh number 493-270 shown in FIG. 11 which is divided every 0.5 meters in the each-west and south-north directions into 5-meter meshes.

FIG. 12 illustrates a 50-meter mesh, i.e., mesh number 493-270 (50-meter mesh) shown in FIG. 11, which is further divided every 5 meters into ten sections in the east-west and south-north directions. Narrowing down a target to the vicinity of a gate in the central port of Osaka Station in mesh number 493-270 (50-meter mesh 31111), the gate in the central port of Osaka Station corresponds to a mesh numbered 5-2, i.e., a mesh numbered 5 in the east-west direction and 2 in the south-north direction, which is 5-meter mesh 31111. Here, by combining the aforementioned mesh number 493-270 with mesh number 5-2 shown in FIG. 12, the gate in the central port of Osaka Station is represented by mesh number 4935-2702 (5-meter mesh).

Figure 13:
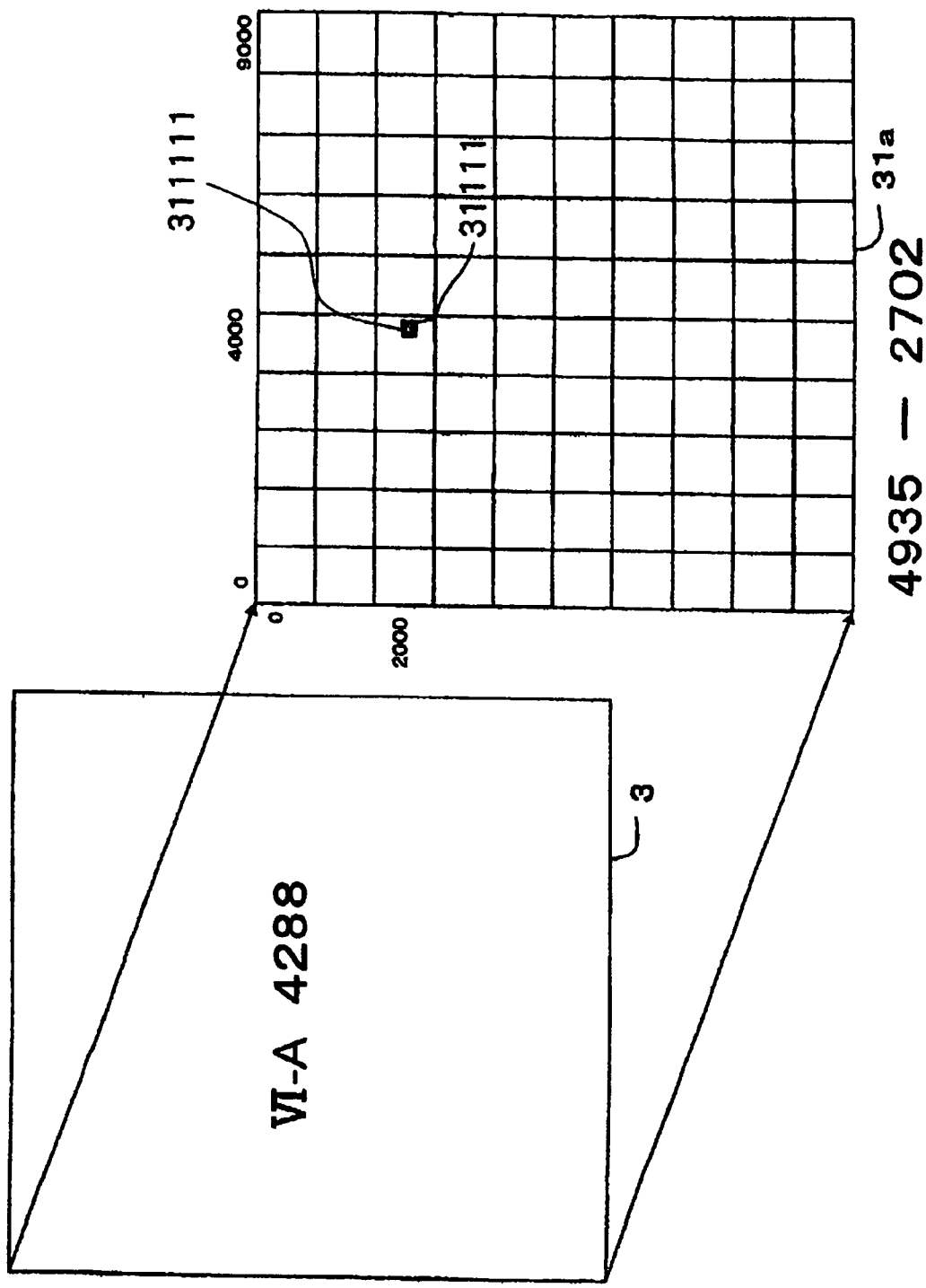
[FIG. 13]
A diagram directly illustrating 6A, 4288/4935-2702 which is near a ticket barrier in the central port of Osaka Station in unit 6A, 4288 corresponding to the vicinity of Osaka Prefecture illustrated in FIG. 4.

FIG. 13 directly illustrates 6A, 4288/4935-2702 (5-meter mesh), which represents the vicinity of the gate in the central port of Osaka Station, in 6A, 4288 (50-km mesh) which is a unit representing Osaka prefecture.

To represent an east-west number and a south-north number of the N-code in decimal number notation, the mesh can be repeatedly narrowed down each time by a factor of ten, or a required area can be directly illustrated at $1/1000$ or the like without any limitations, thus permitting free representations, and a required area in a required position can be selected according to the number of digits of a decimal number. Describing the foregoing with mesh western end 4935 of mesh number 4935-2702 near the gate in the central port of Osaka Station given as an example, each digit of mesh western end 4935 can be repeatedly narrowed down each time by a factor of ten, as in the left side, or a required area can be directly shown at $1/1000$, as in the right side, thus permitting free representations, as shown in the following respective equations.

$$1/10 \times 4 = 1/1000 \times 4000 \qquad 4$$

$$1/100 \times 9 = 1/10000 \times 900 \qquad 9$$

$$1/1000 \times 3 = 1/10000 \times 30 \qquad 3$$

$$1/100000 \times 5 = 1/10000 \times 5 \qquad 5$$

As described above, the conversion module of this embodiment can be applied to any field which requires position representations to represent a location, made by the N-code, for an area suited to a purpose including worldwide cultural area and the oceans on the globe. In other words, the conversion module of this embodiment can represent difficult positional representations, which cannot be understood except for experts, through a sequence of decimal numbers called the N-code, thus enabling ordinary citizens to understand it. Also, the conversion module of this embodiment can represent all positions on the globe, to which no address is given, such as a mountain region, a river-terrace, and the true position of a water region, in decimal number notation, in addition to confirmation of positions in urban areas.

For example, while a positional representation can so far be made by an address indication within a Civil planning area, the position of a garbage collection place on a street, manholes, and the position of an accident can only be presented in a relative positional representation. Also, all positions cannot be correctly identified in no-address regions, river-terraces, mountain regions, and water regions, and can only be represented in a relative form. However, the N-code can represent positions in all locations by using a sequence of decimal numbers, and its effect extends over every fields such as administration, disaster protection, fire fighting, police, traffic, distribution, sightseeing, news reporting, welfare, resource development, business, education, environment, defense, agricultural, forestry, and fishery industries, cultures, and the like.

Also, since the N-code represents a position in by using a sequence of decimal numbers, the relative direction and the distance between two positions can be readily known from the difference between the numbers.

Since the conversion module of this embodiment can mutually convert almost all positions on the globe to the N-code, which has features as described above, ordinary citizens can obtain means for easily locating every position on the globe.

Conversely, the conversion module of this embodiment delivers X, Y coordinates for the old Japan positioning coordinates and X, Y coordinates for the new positioning system coordinates, respectively, by entering an N-code into the conversion module as input data. In this way, the conversion module of this embodiment enables a search for a map directly specified by a map information system based on the old Japan positioning system coordinates and on the new positioning system coordinates by using the N-code, as input data, which is easy to understand for users because of its decimal notation and a smaller number of digits.

In particularly, in recent years, portable terminals such as portable telephones have become suddenly pervasive over the world, but the small screen of the portable terminal causes limitations in map-based positional representation. However, the present invention enables an N-code based positional representation which can be sufficiently represented even on a small screen. This provides an environment which ordinary citizens can readily utilize so that they are mutually connected to each other, with respect to positional information, through portable telephones, thereby creating a large impact in each of the aforementioned fields.

Otherwise, the N-code managed as a position key can be an effective means for informing a position in news reporting information to ordinary citizens by displaying the position on a television or the like by the N-code.

The conversion module of this embodiment can also be applied to a GIS (geographic information system) which manages and displays digitized maps on a computer.

Figure 14:
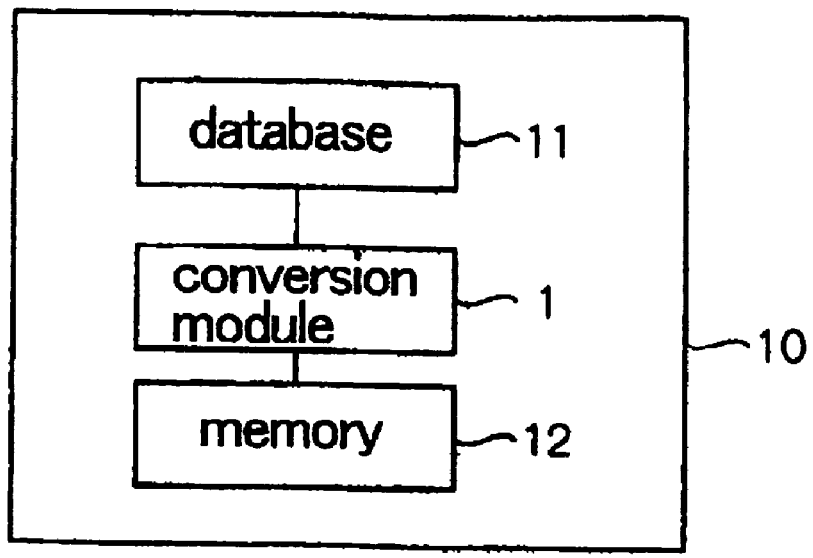
[FIG. 14]
A block configuration diagram of a GIS which comprises the conversion module that is one embodiment of the present invention.

FIG. 14 is a diagram illustrating a block configuration diagram of a GIS which comprises the conversion module of this embodiment.

GIS 10 comprises database 11 which is arranged in accordance with the 19-coordinate system, old Japan positioning system coordinates, new positioning system coordinates or the like; and a recording unit 12 to record a N-code on an image or the like as required, wherein conversion module 1 converts database 11 into N-codes for display on a display unit, not shown.

GIS 10 enables an integer-based search for a target, the position of which has been conventionally searched for by the latitude/longitude or 19-coordinate system, without the trouble of having to make a distinction of latitude/longitude or by three units of degrees, minutes, and seconds, or without minus indications as in the 19-coordinate system. Also, since GIS 10 displays the position of a target on a screen in N-code representation, it facilitates an audio communication of the position through a telephone or the like. As well, a database arranged in accordance with the latitude/longitude or 19-coordinate system has problems in that the 19-coordinate system encounters difficulties in supporting wide areas and in that the latitude/longitude are difficult to understand, whereas the GIS, to which the conversion module of this embodiment is applied, rearranges positions using N-codes, thus making it possible to provide a system which is suited for use in wide areas and presents positions which can be readily recognized.

Also, GIS 10 utilizes database 11 by converting the 19-coordinate system, the old Japan positioning system coordinates, the new positioning system coordinates and the like in database 11 to the N-code by conversion module 1, and creates a database by converting the latitude/longitude and the coordinate values of the 19-coordinate system, the old Japan positioning system coordinates, the new positioning system coordinates and the like, which make up database 11, to the N-codes. In this way, GIS 10 can make use of conventional database resources by converting databases, arranged in accordance with the latitude/longitude or X, Y coordinates of the old positioning system coordinates, and the latitude/longitude or X, Y coordinates of the new positioning system coordinates, to N-codes, arranging the N-codes and entering the N-codes.

Also, while statistical processing is often performed in the GIS, the latitude/longitude and 19-coordinate system provide point information, whereas the N-code has a mesh structure, so that the mesh size can be freely selected for utilization in statistics by the number of digits such as 50 km, 5 km, 500 m, and 50 m. This mesh is in the shape of a square and is represented in decimal number notation, and has regularity and continuity, and thus it is easier to use than conventional regional mesh codes which are rectangular and lack continuity in the numbers.

GIS 10 may have a function for displaying superimposed geographic information including natural features, N-code, and mesh on a display unit. GIS 10 has a function for identifying the absolute position of an N-code, as well as a function for recognizing a relative position between natural features possessed by an ordinary GIS. Therefore, the user can readily recognize a relative position between natural features, and can also identify absolute positions of the natural features through the superimposed display presented on the display unit. Also, GIS 10 can identify positions throughout the globe, including such places, the relative positions of which cannot be identified in other systems, and can also grasp the size of a natural feature from the number of digits of the N-code.

As well, GIS 10 may have a position search function which permits the user to directly enter an N-code manually to search for a position anywhere in the globe, other than identifying a position by the GPS. The present invention can minimize the number of digits for identifying a position through a home position setting function in the display and search of the N-code in a limited range. The home position setting function is described later.

Conversion module 1 can also convert the UTM coordinates to the N-code, rather than to the 19-coordinate system, in the case of international utilization. The N-code inherently not only requires a smaller number of digits, as compared with other coordinate systems, but also eliminates block number 6A, when it is used in Japan, due to its structure. Also, since the unit size has approximately 50 km on four sides, it can cover an area significantly wider than an area in which calls can be placed with one area code. Therefore, the N-code can omit the block number and unit number within a range of approximately 50 km in all directions, i.e., within a field of activity where people live in daily life. On the other hand, the N-code can omit the mesh number if an accuracy of approximately 50 km is sufficient such as when typhoon information or a position in a foreign country is represented. In this way, the number of digits of the N-code entered into conversion module 1 can be selected as required in accordance with each application, so that a highly reduced number of digits may be entered, as compared with before. In other words, since GIS 10 that has conversion module 1 can select a necessary number of digits for the N-code in accordance with the application, searches at arbitrary scales are facilitated for worldwide cultural area, countries, cities, regions, buildings, street lights and the like.

Also, conversion module 1 can freely select a required number of digits for the number of digits within the mesh, and can display in decimal integer representation without any decimal point, as described above, whichever degree of accuracy is requested. Therefore, GIS 10 which comprises conversion module 1 can improve the efficiency of positional information entry operations, and can make databases, arranged in accordance with conventional hard-to-use coordinate system such as latitude/longitude, readily understandable so as to effectively utilize past immense resources.

The conversion module of this embodiment can also be applied to GPS's used in vehicles, ships, and aircraft. The conversion module can further be applied to GPS's used in vehicles which move along predetermined rails such as railway trains, cable cars, ropeways, and the like.

When a passenger utilizes a train, the destination of which is apparent, as in the case of the bullet train, the passenger need not confirm the destination of the train or the current location of the train frequently. However, when a local train is taken, a passenger needs to be able to confirm, while in the train, the current location of the train in order to be able to determine the station at which a change of the trains will occur, and in order to confirm a station at which he will get off the train. When the conversion module of this embodiment is applied to local railway lines to display the N-code on video billboards or the like in trains, passengers can readily know the current location of the train from the N-code.

Figure 15:
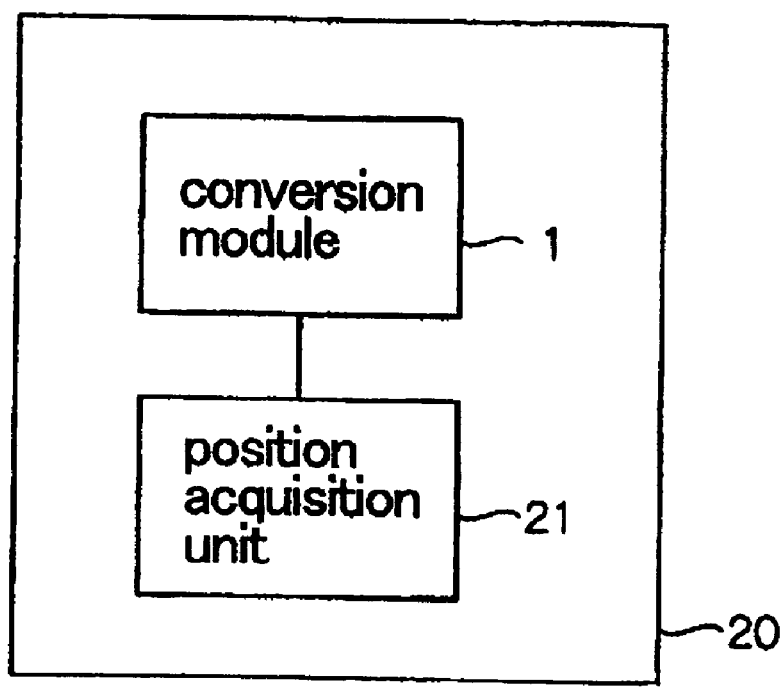
[FIG. 15]
A block configuration diagram of a GPS which comprises the conversion module that is one embodiment of the present invention.

FIG. 15 is a diagram illustrating a block configuration diagram of a GPS which comprises the conversion module.

GPS 20 comprises conversion module 1, and position acquisition unit 21 for acquiring information on a current position from a coordinate system for a global positioning system such as the WGS84 coordinate system, and displays an N-code converted by conversion module 1 on a display unit, not shown.

In recent years, the GPS has been improved in accuracy, and utilized in wider applications represented by car navigation systems. Conventionally, the output of the GPS is generated in accordance with WG84. This is not only hard to understand, even if it is delivered as numerical information on latitude/longitude, but also difficult to use within Japan because there is a deviation from the old Japan-positioning system. For this reason, in general utilizations such as the car navigation system and the like, the only way is to display a position on a map screen. The conversion module of this embodiment can be applied to the GPS, and can handle an acquired position, as numerical information, by delivering the output of GPS as converted to an N-code.

For reference sake, since there are very small errors between the Japan new positioning system coordinates and the WGS84 coordinate system used in the global positioning system, it is said that there is practically no problem even if they are regarded as the same. Therefore, GPS 20 regards acquired information on latitude/longitude as the same as the latitude/longitude of the new positioning system coordinates, and conversion module 1 converts the information to an N-code which is displayed or delivered from the display unit.

Figure 16:
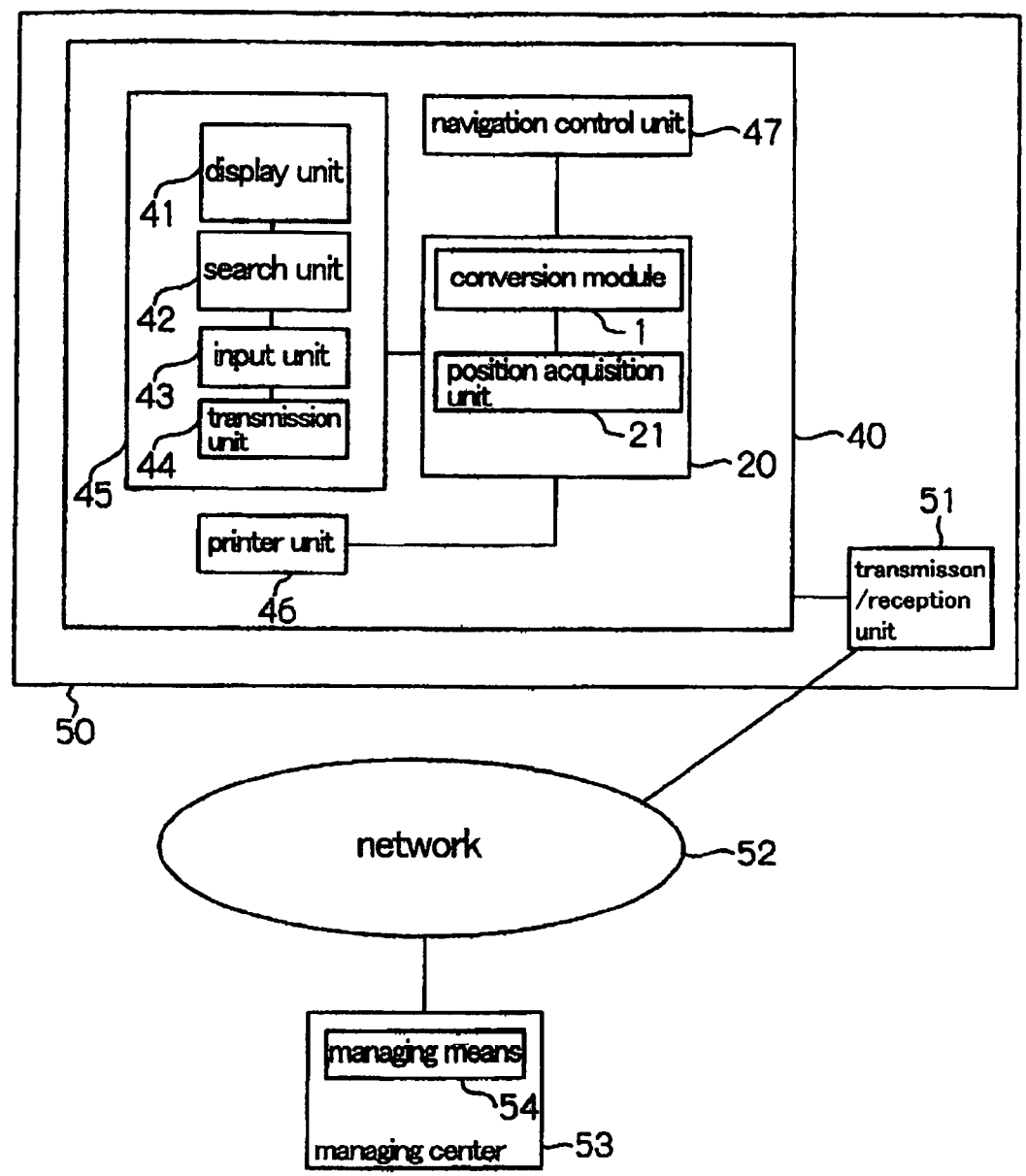
[FIG. 16]
A block configuration diagram of a navigation system and a vehicle management system which comprise the conversion module that is one embodiment of the present invention.

FIG. 16 is a diagram illustrating a block configuration diagram of a navigation system which comprises the conversion module.

Navigation system 40, which is mounted in mobile unit 50, comprises GPS 20 having conversion module 1 and position acquisition unit 21; display unit 41 for displaying a current position and a destination, represented by N-codes having a selected number of digits, an itinerary from the current position to the destination, a map and the like; search unit 42 for searching for the itinerary of mobile unit 50, the position of mobile unit 50, and the like with the N-code having the selected number of digits; input unit 43 for entering positional information such as the destination, latitude/longitude and the like in the N-code having the selected number of digits;

transmission unit 44 for transmitting a signal indicative of the current position; and navigation unit 45 having a recording unit, not shown, for recording a variety of data including the N-code for an acquired arbitrary position. Also, navigation system 40 may comprise printer unit 46 for printing and delivering an N-code as required, and navigation control unit 47 for controlling the navigation of mobile unit 50.

Navigation system 40 which contains GPS 20, to which conversion module 1 of this embodiment is applied, comprises transmission unit 44, so that when mobile unit 50 experiences a trouble such as a fault, an accident or the like, positional information acquired by GPS 20, an N-code for this positional information, and an N-code directly entered by the user from input unit 43 can be transmitted to the outside. Then, since GPS 20 can display the information on the current position in N-code representation, the current position can be correctly and readily communicated. Also, since navigation system 40 can receive a destination in N-code representation, the entry of the destination is facilitated.

Also, when mobile unit 50 is a taxi, navigation system 40 having printer unit 46 provides more convenient services. When a passenger gets off the taxi, the driver of the taxi gives him a printed document such as a receipt on which are printed by printer unit 46 N-codes for a position where the passenger took the taxi, and for a position where the passenger got off the taxi, and the passenger hands the driver a printed document on which is printed an N-code for the destination the next time the passenger takes a taxi. The driver enters the N-code into navigation system 40. Since navigation to the destination is guided by an automatic shortest-route search system which has already been developed, the taxi company can provide the service of transporting the passenger to a destination in a shorter time, at a lower price, and in a relaxed manner without the need to receive an explanation on the destination or a route to the destination from the passenger.

Navigation system 40 can not only enable correct and simple entry of a destination, but can also provide a language barrier free system because the destination is displayed only in numerical representation, so that a foreigner who utilizes a taxi, or a speech impaired person need only shows memo, such that the driver simply enters the code into the navigation system.

When mobile unit 50 is a ship or an aircraft, it may be equipped with navigation system 40 having navigation control unit 47.

Navigation system 40 can also be functioned as a vehicle management system for business use.

The vehicle management-system for business use of this embodiment comprises mobile unit 50 which is a vehicle for business use equipped with a transmission/reception unit 51 which can be connected to network 52, and to navigation system 40; and management center 53 for managing the operation of mobile unit 50, having managing means 54 which is a server that can be connected to network 52.

In navigation system 40 equipped in mobile unit 50, a recording unit of navigation unit 45 also records a variety of data such as positional information of mobile unit 50 for each hour, in addition to the aforementioned functions.

Managing means 54 of management center 53 comprises means for entering a destination in N-code representation; means for displaying a current position of mobile unit 50; a search unit for searching for the current position and destination of mobile unit 50 with the N-code; a transmission unit for transmitting an N-code to mobile unit 50 through network 52; and an information recording unit for recording a variety of information including the positional information of the vehicle for each hour.

The vehicle management system for business use of this embodiment is operated, for example, in the following manner.

The destination, to which mobile unit 50 goes from now, is entered in N-code representation into managing means 54 of management center 53. Managing means 54 indicates the destination to mobile body 50 in N-code representation.

Navigation system 40 of mobile unit 50, which has received a signal from managing means 54 at transmission/reception unit 51 through network 52, displays on display unit 41 the current position and destination of mobile unit 50 in an N-code having a selected number of digits, an itinerary from the current position to the destination, a map, and the like. Mobile unit 50, operated by a driver based on this information, moves to the destination.

In this regard, when management center 53 faces a difficult situation, search unit 42 searches for the itinerary, the position of mobile unit 50, and the like based on entered positional information such as the destination, latitude/longitude and the like in the N-code having the selected number of digits, entered by the driver through input unit 43, and navigation system 40 of mobile unit 50 displays this information on display unit 41. Then, a variety of data such as positional information of mobile unit 50 at each hour in the meantime is recorded in the recording unit of navigation unit 45. The information recorded in the recording unit is transmitted from mobile unit 50 to management center 53, after management center 53 is available for transmission/reception, and is recorded in the information recording unit of managing means 54.

Also, when mobile unit 50 is on the move, managing means 54 of management center 53 receives a signal indicative of the current position transmitted from transmission unit 44 of navigation system 40 equipped in mobile unit 50, and records this in the information recording unit. In this way, management center 53 keeps track of the behavior of mobile unit 50 at each hour.

Management center 53, which keeps track of the behavior of mobile unit 50, facilitates actions to be taken for contingencies. For example, if a contingency occurs that prevents mobile unit 50 from going to a destination, management center 53 then searches for the current position of another mobile unit 50 currently located closest to the destination, by the search unit using the N-code from the data on the behavior of mobile unit 50 at each hour that is recorded in the information recording unit. As a result of the search, if the other mobile unit 50 can go to the destination, the N-code of the destination is transmitted to the other mobile unit 50. The other mobile unit 50 receives this, and goes to the destination. On the other hand, if this other mobile unit 50 cannot go to the destination, the search unit searches for yet another mobile unit 50, and gives similar instructions to it.

In this way, the vehicle management system for business use of this embodiment indicates and manages the destination, current position of mobile unit 50, movement history and the like in N-code representation. Since the prior system receives position information by voice and since this position is only shown on a map, the location cannot be easily explained by using a radio, a portable telephone, or the like. Also, because in the prior system only a rough search can be made in units of addresses by using the postal code or the like, adequate measures cannot to taken in the case of emergency. Specifically, the vehicle management system of this embodiment, which pinpoints and displays each house using the N-code which uses consistent rules, is an efficient system which solves problems of the prior system.

Incidentally, a map-based position representation has the following problems. Even if a large sized map is displayed, the user cannot find a current position only by using this map. Thus, a map based position representation requires a large amount of information because a number of maps are needed in different sizes over several stages, and even one screen will require a large amount of information. Further, since the user scrolls a displayed map for viewing peripheral regions, the amount of information will become very large. Thus, a walker ITS has the problem that not only a very long time is taken to download a map, but also the charge for using the map increases.

The conventional navigation system is supposed to display a map at all times. Of course, it is desirable to display a map. However, displaying a map is not always essential for navigation. Whereas the user is able to know his own position via GPS, what he really wants to know is not the his current address, but the direction and the distance to his destination.

Specifically, when the destination can be specified, the navigation can be done just by displaying an arrow indicative of direction to the destination and the distance. However, current navigation systems present low efficiency because they communicate a specified destination and one's own position on a map. The N-code enables a destination to be pinpointed with numbers. Therefore, users can understand their positional relationship among one another just by making communications such as "My number is . . . , which number do you have?" for a rendezvous and the like.

In this way, if a navigation system uses a map only when it is needed, and usually does not use a map, the resulting system is user-friendly because it requires exchanges of only several bytes of information and entails a short time and a small charge. Such a system can be configured by applying the conversion module of this embodiment. In the following, a navigation system to which the conversion module of this embodiment is applied will be described using FIGS. 17 and 18.

Figure 17:
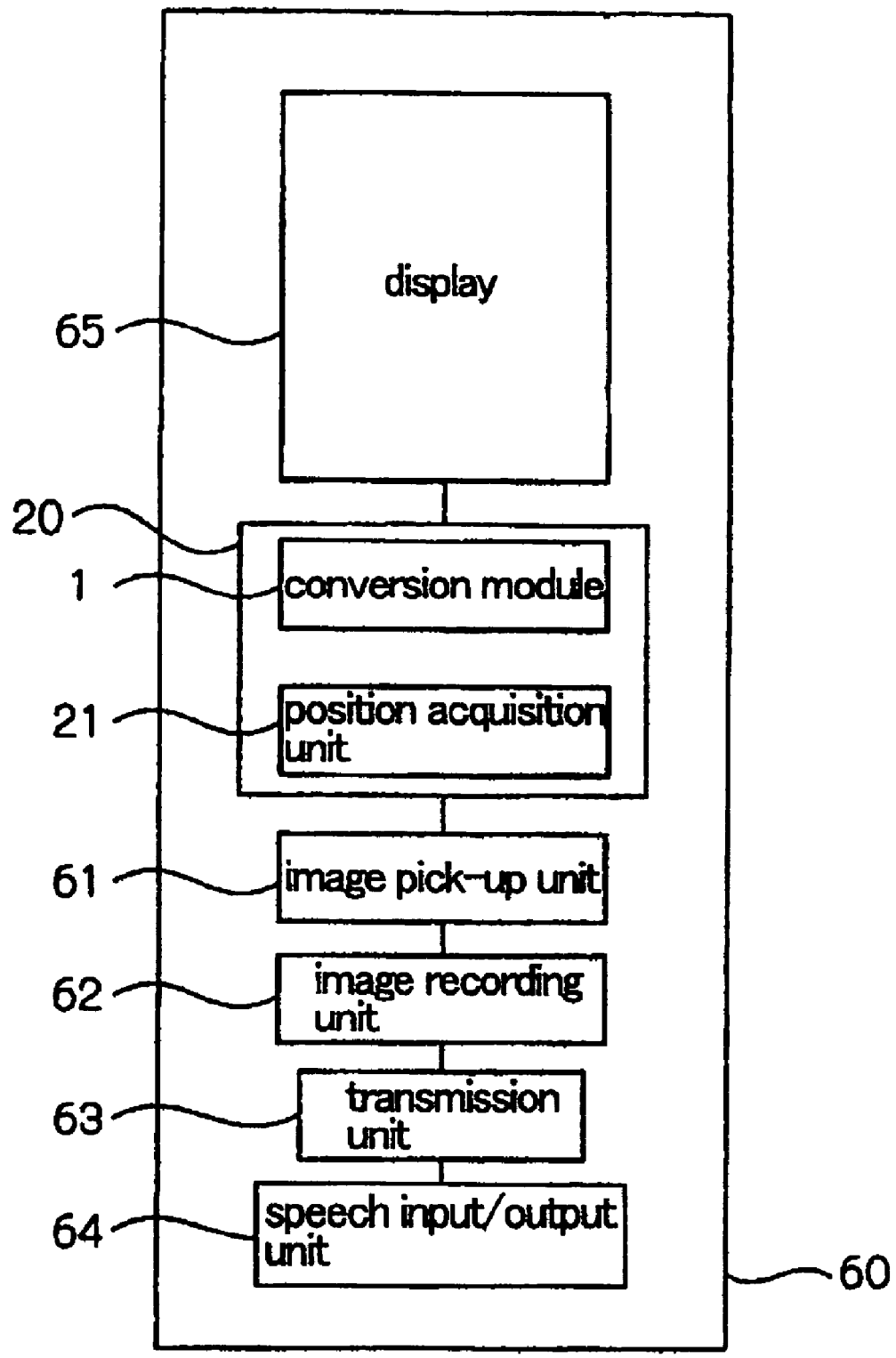
[FIG. 17]
A block configuration diagram of a portable terminal which comprises the conversion module that is one embodiment of the present invention.

FIG. 17 is a diagram illustrating a block configuration diagram of a portable terminal which comprises the conversion module of this embodiment.

Portable terminal 60 comprises GPS 20 which has conversion module 1 and position acquisition unit 21; image pickup unit 61 for picking up an image; image recording unit 62 for recording a picked-up image and recording an N-code on the image; transmission unit 63 for transmitting data, speech and the like; speech input/output unit 64 for receiving an N-code through a speech or delivering an N-code as speech; and display unit 65 for displaying the N-code and the like. A portable telephone, a PHS (Personal Handyphone System), a PDA (Personal Digital Assistant) and the like may serve as portable terminal 60.

Figure 18:
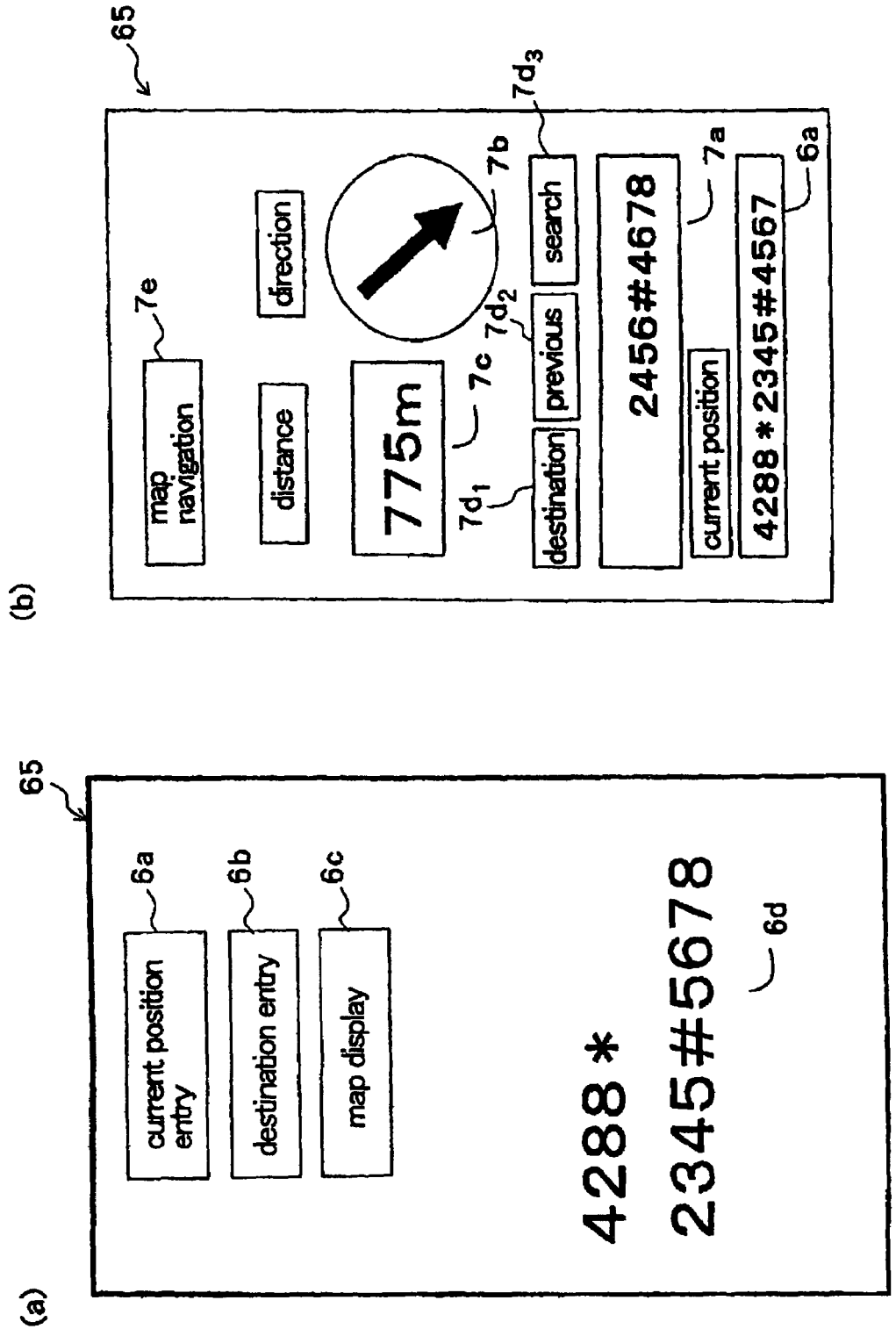
[FIG. 18]
An initial GPS screen of the portable telephone illustrated in FIG. 17.

FIG. 18(*a*) is a diagram illustrating the initial GPS screen of portable terminal 60.

On the initial GPS screen displayed on display unit 65, there are buttons covering these functions are displayed, 6*a* for current position entry, 6*b* for destination entry, and 6*c* for map display. Here, if "*#," for example, is entered, the current position acquired by the GPS is displayed at current position display 6*d* such as "4288*2345#5678" in a lower region of the screen. If no position can be acquired, "No Position Can Be Acquired" is displayed. Also, when a current position cannot be acquired by the GPS, or when an entered position is different from a current position acquired by the GPS, current position entry 6*a* on the screen may be clicked to enter the position into portable terminal 60. When one wishes a map of current position 6(1, clicking on map display 6*c* causes portable terminal 60 to download a map centered at the current position. Also, the screen on display unit 65 is switched to a screen in a navigation mode, illustrated in FIG. 18(*b*), when destination entry 6*b* is clicked.

N-code "4288*2345#5678" of current position 6*d* is displayed at the bottom of the screen, and destination entry 7*a* is displayed above the N-code for entering an N-code of the destination. When destination button 7*d*1 is clicked to make a selection from among destination button 7*d*1, previous button 7*d*2, and search button 7*d*3 displayed above destination entry 7*a*, and when the N-code of the destination is entered into destination entry 7*a*, portable terminal 60 displays the distance and direction from the current position to the destination in distance display 7*c* and direction display 7*b*, respectively. In this regard, each unit has a width of approximately 50 km on all sides, and the same mesh number does not appear in an area centered at an arbitrary position and having sides of 50 km in the east-west and south-north directions. Then, generally, the position of the destination in the navigation by using a portable terminal is within this range, so that the user may omit the unit number and may enter only the mesh number, as the example of destination entry 7*a* in FIG. 18(*b*).

Also, as previous button 7*d*2 is clicked, the previous position is entered into destination entry 7*a*. This function is convenient when one wants to see the direction and distance to the destination many times along the way. In this regard, upon switching from the initial GPS screen of FIG. 18(*a*), and since the previous position has been entered in destination entry 7*a*, and as previous button 7*d*2 is repeatedly clicked, positions going back to the past are entered in order.

As search button 7*d*3 is clicked, a list of registered destinations is displayed, and a code of a selected position is entered into destination entry 7*a*.

Also, as map navi button 7*e* displayed at the highest position of the screen is clicked, a map is downloaded, starting a navigation service using the map.

In the foregoing manner, the navigation system, to which the conversion module of this embodiment is applied, displays a map only when it is needed, and normally performs navigation without a map, which involves exchanges of only few bytes of information, thus making it possible to configure a time-saving, low-charge, and user-friendly system.

Also, portable terminal 60, to which the conversion module of this embodiment is applied, can be utilized for sightseeing guides. For example, N-codes are described in sightseeing guide books, sightseeing maps, guide plates in sightseeing spots, and attractive places, together with fixed information, such that the user enters this N-code into portable telephone 60. In this way, portable telephone 60 guides currently held events and information recommended at present together with positional information in N-code representation. Specifically, the navigation system to which the conversion module of this embodiment is applied for guiding information on sightseeing spots using the N-code does not require that a map be displayed on a small screen by force, and does not cause increasing communication costs, so that the sightseeing navigation can be utilized in an effective manner.

Also, portable terminal 60, to which the conversion module of this embodiment is applied, may be capable of audibly capturing the N-code of a current position and receiving a destination by voice through speech input/output unit 64. Conventionally, even if a map is displayed on a small screen of a portable telephone, it is often difficult to utilize for senior citizens and visually impaired persons to use. Since portable terminal 60 can receive positional information through a speech or capture positional information through voice by the action of speech input/output unit 64, this is highly convenient for senior citizens and visually impaired persons. Also, portable terminal 60 is highly convenient for senior citizens and visually impaired persons from the fact that it can display an arrow indicative of a direction, and a distance, rather than a map, on the screen.

As well, portable telephones are now equipped with a camera and a GPS in standard specifications, and photographs are extensively transmitted together with emails. While portable terminal 60 can also transmit email by transmission unit 63, image recording unit 62 can superimpose the N-code of a position acquired by position acquisition unit 21 of GPS 20 or a manually entered N-code onto an image, so that portable terminal 60 can transmit the resulting image together with email by transmission unit 63. Portable terminal 60 can also display this image with the N-code on display unit 65.

The conversion module of this embodiment can also be applied to silver salt cameras, and image pick-up apparatuses for on-site shooting television cameras.

Figure 19:
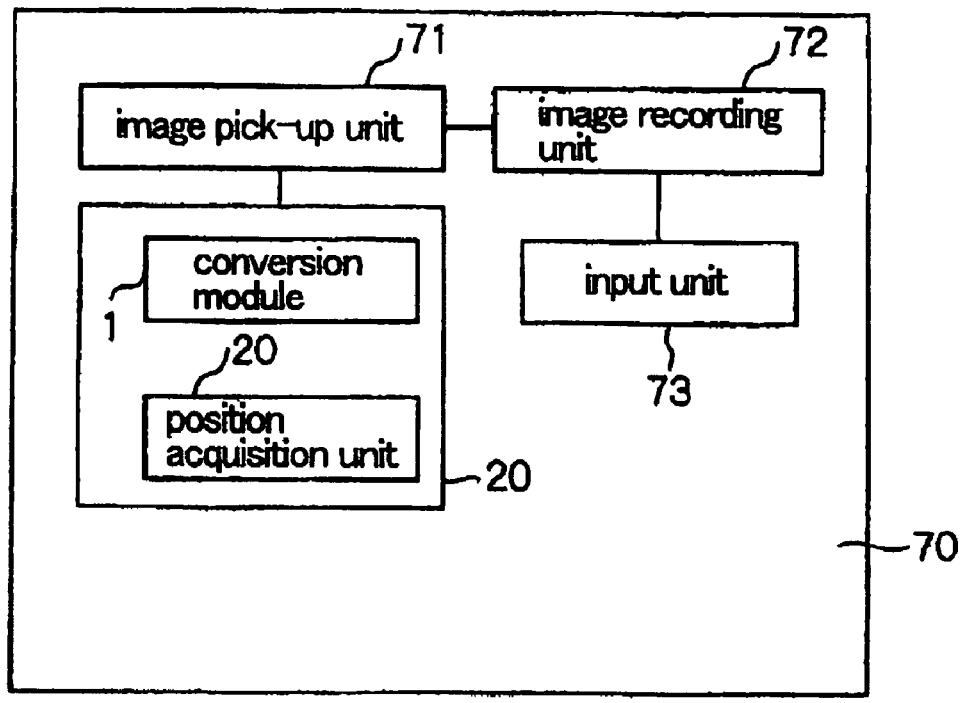
[FIG. 19]
A block configuration diagram of an imaging device which comprises the conversion module that is one embodiment of the present invention.

FIG. 19 is a diagram illustrating a block configuration diagram of an image pick-up apparatus which comprises the conversion module of this embodiment.

Image pick-up apparatus 70 comprises GPS 20 which has conversion module 1 and position acquisition unit 21; image pick-up unit 71 for picking up an image; image recording unit 72 for recording a picked-up image; and input unit 73 for manually entering an N-code.

The function of superimposing a photographed date and time simultaneously on part of a photograph when it is photographed in a tour or the like by a silver salt camera, a digital camera or the like is very convenient. However, when looking at old photo albums, we often cannot remember where such photographs were taken though we know when they were taken. Whereas the GPS has been reduced in size and become simple enough to be incorporated in portable telephones, the output of the current GPS is in latitude/longitude representation, so that even if this is superimposed on a photograph, this representation has a large number of digits and therefore is unusable for general purposes.

Image pick-up apparatus 70 for a silver salt camera and the like, which incorporates GPS 20 to which conversion module 1 is applied, can use the function of superimposing photographed date and time on a photograph to superimpose positional information acquired at the time of photographing in N-code representation on the photograph together with the date and time. The N-code has an accuracy of approximately 500 meters in a simple representation of 4288/23-45 which is composed of a unit number and two digits each of the east-west and south-north directions, and can represent a position with sufficient accuracy to record travel, so that a convenient function can be realized, for example, by displaying the N-code and date in two columns. While image pick-up apparatus 70 cannot acquire a position by GPS 20 when it is used indoors for taking photographs, the N-code of that position, if previously known, can be manually entered through input unit 73.

The conversion module of this embodiment can be further applied to an on-site shooting television camera.

Whereas news programs related to accidents are always accompanied by positional information, most of them rely on place names. Since the place name is local information only understood by local persons, most viewers vaguely regard it as an accident which has taken place somewhere, which is a cause for a tack of reality. Also, recently, current map information displayed at present in television programs such as domestic and overseas travel programs, gourmet programs and the like only includes very rough place names or abbreviated maps which are difficult to understand even for local persons, so that such map information is useless if viewers want to go there.

Image pick-up apparatus 70, or an on-site shooting television camera, which incorporates GPS 20 to which conversion module 1 is applied, can correctly display a position of 50-500 meters if an N-code having 8-10 digits is displayed near a corner of the screen by a display unit, not shown. Also, typhoon information, the position of a seismic center, and the like can be readily known by displaying a unit number with an accuracy of approximately 50 km, together with the positional relationship to one's house, instead of a rough expression such as approximately 500 km from the cape Ashizuri in south as before. This is because the N-code can also be applied to ocean zones. It may be necessary to display such positional information when the GPS cannot be used or on a past video film or the like. In this event, the display unit of image pick-up apparatus 70 may convert the address, place name, and database of each coordinate system to N-codes, or display and record the current position of a television camera entered manually from input unit 73 on an image recorded in image recording unit 72. Alternatively, positional information may be the address, place name, and database of each coordinate system which are convented to N-codes and displayed on a past video film and the like by GIS facilities for broadcasting which can systematically display the N-codes, for example, by recording unit 12 of GIS 10 shown in FIG. 14.

A position displayed on an image would be the position of the camera if the positional information of the GPS equipped in the camera is displayed on the screen as it is. Image pick-up apparatus 70 can measure the distance to a subject by an automatic focusing device, a laser measuring device or the like, calculate an N-code for the position of the subject in combination with an orientation measuring tool, and display the N-code. Further, image pick-up apparatus 70, when combined with a device for measuring a depression angle, can display an N-code for the position of a subject even while taking photographs from an aircraft. In this way, image pick-up apparatus 70 can photograph, for example, the position of the center point of a tornado, when it is photographed at a long distance, or the appearance of volcanic activities from an aircraft, and correctly inform the position of the leading edge of a pyroclastic flow to inhabitants from one minute to next, thus providing effective disaster prevention information in real time, incomparable with before.

As an alternative, the coordinate conversion module of the present invention may be a program which causes a computer to execute the operations described in this embodiment.

Also, conversion module 1 of this embodiment may comprise a home position function. This home position function sets a certain arbitrary position as a home position to define a range of the same area as a unit (approximately 50 km on all sides) centered at the home position.

The home position function will be described below with reference to FIG. 20.

Figure 20:
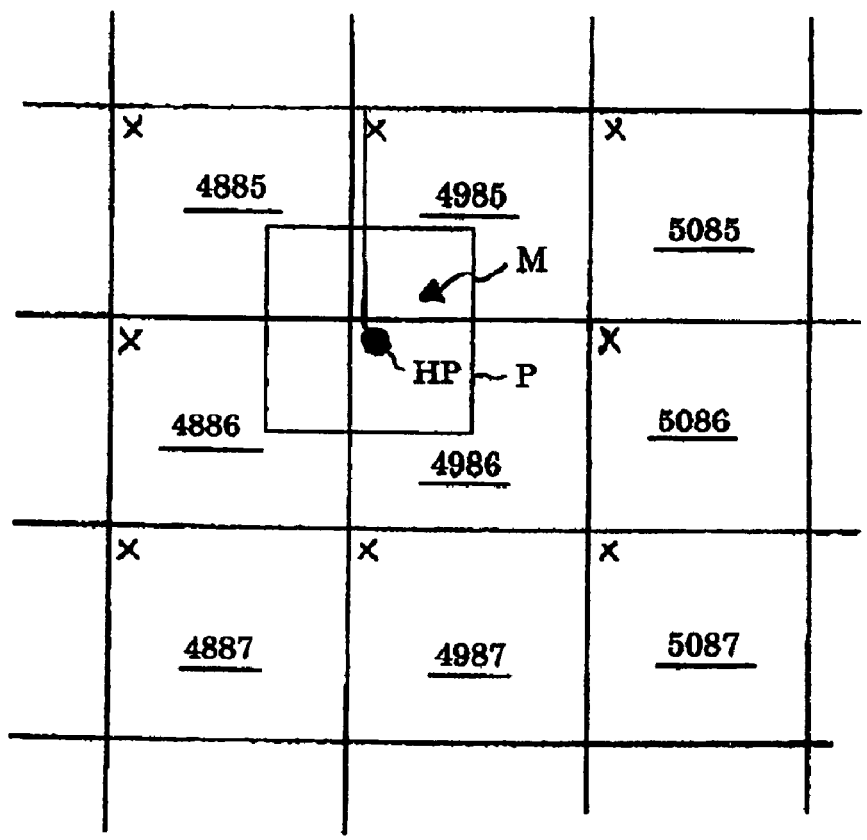
[FIG. 20]
A diagram for describing a home position function.

FIG. 20 shows unit numbers 4685-4887, 4985-4987, and 5085-5087, and the home position indicated by a mark "●." Range P surrounding the ● mark indicates a range of the same area as the unit centered at home position, and is approximately 50 km long on all sides. An x mark shown at the upper left corner of each unit indicates mesh number 1-1 in each unit.

Assume in FIG. 20 that home position HP is set at the position of mesh number 1-1 of unit number 4986. When home position HP is set at this position, mesh number 1-1 will not mean mesh number 1-1 except for mesh number 1-1 of unit number 4986 within range P. In other words, since mesh number 1-1 of unit number 4986 is the only one that exists in range P, mesh number 1-1 will not be confused with mesh number 1-1 of other unit numbers even if unit number 4986 is omitted. Consequently, conversion module 1 of this embodiment can omit the unit number by setting home position HP.

As well, conversion module 1 of this embodiment can also identify a mesh number with omission of the unit number, even if the mesh number extends over unit numbers, by setting home position HP.

In the example of FIG. 20, home position HP is set at mesh number 1-1 of unit number 4986. On the other hand, mesh number 3-8 indicated by a ▲ mark is positioned in unit number 4985. Specifically, though home position HP and mesh number 3-9 indicated by the ▲ mark are both included in the same range P, home position HP is positioned in unit number 4986, while mesh number 3-8 indicated by the ▲ mark is positioned in unit number 4985 adjacent to unit number 4986, and therefore extends over the units.

Even in such a case, conversion module 1 of this embodiment can identify mesh number 3-8 indicated by the A mark, with omission of the unit number, by setting home position HP because mesh number 3-8 indicated by the ▲ mark is the only one which exists within range P.

As described above, the home position function can uniquely determine a mesh number within an active range in daily life in the foregoing manner, even if the unit number is omitted. This function is particularly suitable for application to portable telephone 60. As a user who has the aforementioned portable telephone 60, which includes conversion module 1 comprising the home position function, sets the home position at the current position, a range of 50 km on all sides is defined about the current position of the user. The area of this range is an area which sufficiently covers an active range in daily life, i.e., the range in which the portable telephone may be utilized. Therefore, the user of portable telephone 60 need not enter the unit number when he uses conversion module 1. In addition, portable telephone 60 can generate a mesh code with omission of a unit number. In this regard, for use in Japan, block number 6A is not required, as a matter of course.

The invention claimed is:

1. A coordinate mutual conversion module for mutually converting:

a mesh code for displaying a position in a combination of a block number of a block, a unit number of a unit, and a mesh number of a mesh, wherein a globe is divided into six in the east-west direction along longitudes at intervals of 60 degrees, and divided into at least three in the south-north direction along latitudes to define a plurality of numbered blocks, each of said blocks is divided into 100 in the east-west direction and in the south-north direction, respectively, to define a plurality of numbered units in a square shape, and each of said units is divided into 10n in the east-west direction and in the north-south direction, respectively, to define a plurality of numbered meshes in a square shape; and for mutually converting respective latitudes and longitudes of new positioning system coordinates and old positioning system coordinates, and coordinate values of X, Y coordinates corresponding to the new positioning system coordinates, and the old positioning system coordinates, respectively, said coordinate mutual conversion module comprising:

input means for entering each of the latitude/longitude and the coordinate values;

block number selecting means for finding in which blocks each of the latitude/longitude and the coordinate values are located;

unit number selecting means for finding in which units in the block found by said block number selecting means each of the latitude/longitude and the coordinate values are located;

mesh number selecting means for finding in which meshes in the unit found by said unit number selecting means each of the latitude/longitude and the coordinate values are located;

output means for calculating and delivering the latitude/longitude, and the coordinate values corresponding to the position in the mesh code representation;

home position setting means for identifying a position by omitting the unit number and entering only the mesh number when data is entered;

mesh code input means for entering the mesh code having a selected number of digits in accordance with an application from among the block number, the unit number, and the mesh number; and mesh code output means for selecting and delivering a number of digits required in accordance with an application from among the mesh code composed of the block number, the unit number, and the mesh number.

2. A geographic information system having the coordinate mutual conversion module according to claim 1, and a database including the latitude/longitude and the coordinate values for managing digitized maps on a computer to display a position, wherein:

said coordinate mutual conversion module converts the latitude/longitude and the coordinate values of said database to the mesh code to utilize said database, and converts the latitude/longitude and the coordinate values to a mesh code to create a database based on the mesh code.

3. The geographic information system according to claim 2, comprising:

display means for displaying a map with the mesh code superimposed thereon;

direct input means for entering an arbitrary position as the mesh code having a selected number of digits; and means for searching for a position based on the mesh code for the arbitrary position or for searching for a position the mesh code entered through said direct input means.

4. A global positioning system having the coordinate conversion module according to claim 1 for acquiring information on a current position from a coordinate system for the global positioning system, wherein:

said global positioning system regards acquired information on latitude/longitude as the same as the latitude/longitude of the new positioning system coordinates, converts the acquired information to the mesh code by said coordinate mutual conversion module, and delivers the mesh code.

5. A portable terminal including the global positioning system according to claim 4, said portable terminal comprising:

direct input means for entering an arbitrary position as the mesh code having a selected number of digits; and a function for displaying a current position, a map around a destination, as required, together with the mesh code having the selected number of digits, and displaying a distance to the destination and a direction to the destination.

6. The portable terminal according to claim 5, comprising means for entering and delivering the mesh code having a number of digits selected in accordance with an application through speech.

7. The portable terminal according to claim 5 or 6, comprising:
  image pick-up means for picking up an image;
  image recording means for recording the mesh code for a picked-up position acquired by said global positioning system or for recording the mesh code entered through said direct input means, said mesh code being superimposed on the picked-up image; and
  transmitting means for transmitting the image recorded by said image recording means.

8. An image pick-up apparatus having the global positioning system according to claim 4, for recording a picked-up image, said image pick-up apparatus comprising:
  direct input means for entering a current position as mesh code having a selected number of digits; and
  means for superimposing the mesh code for positional information on a picked-up position acquired by said global positioning system or for superimposing the mesh code entered through said direct input means on the picked-up image.

9. The image pick-up apparatus according to claim 8, comprising:
  calculating means for calculating the mesh code for the position of a subject based on the distance from said image pick-up apparatus to the subject, and a direction of the subject to said image pick-up apparatus; and
  means for displaying the mesh code calculated by said calculating means with a selected number of digits on a picked-up image.

10. A navigation system having the global positioning system according to claim 4, for detecting a current position of a mobile unit, and searching for an itinerary from the detected current position to a destination, said navigation system comprising:
  direct input means for entering a destination as the mesh code having a selected number of digits;
  means for displaying the current position by the mesh code having the selected number of digits; and
  means for searching for a position with the mesh code having the selected number of digits.

11. The navigation system according to claim 10, comprising means for transmitting at least one item of positional information acquired by the global positioning system, the mesh code for the positional information, and the mesh code entered by said direct input means.

12. The navigation system according to claim 10 or 11, comprising means for recording and printing the mesh code for an acquired arbitrary position.

13. A mobile unit comprising the global positioning system according to claim 4, said mobile unit being selected from a group comprising a vehicle, a tracked vehicle, a ship, and an aircraft.

14. A vehicle management system having a vehicle and a management center for managing an operation of said vehicle, wherein:
  said vehicle comprises the global positioning system according to claim 4,
  said global positioning system comprises display means for displaying a current position and a destination as represented by the mesh code having a selected number of digits, an itinerary from the current position to the destination, and a map; search means for searching for the itinerary of said vehicle, and the current position and the destination position using the mesh code having the selected number of digits; input means for entering the destination as represented by the mesh code having the selected number of digits; means for receiving the mesh code transmitted from said management center; transmitting means for transmitting a signal indicative of the current position; and recording means for recording a variety of information including information on the position of said vehicle at each hour, and
  said management center comprises managing means which have means for entering a destination as represented by the mesh code having the selected number of digits; means for displaying the current position of said vehicle; means for searching for the current position and the destination of said vehicle using the mesh code having the selected number of digits; means for transmitting the mesh code having the selected number of digits to said vehicle; and information recording means for recording a variety of information including the information on the position of said vehicle at each hour.

15. A server for managing an operation of a vehicle having a global positioning system according to claim 4, comprising:
  means for entering a destination as represented by the mesh code having a selected number of digits;
  means for displaying a current position of said vehicle;
  means for searching for the current position and a destination of said vehicle using the mesh code having the selected number of digits; and
  means for transmitting the mesh code having the selected number of digits to said vehicle.

16. A program for causing a computer to execute processing for managing an operation of a vehicle having the global positioning system according to claim 4, said program causing the computer to execute:
  processing for entering a destination as represented by the mesh code having a selected number of digits;
  processing for displaying a current position of said vehicle;
  processing for searching for the current position and a destination of said vehicle using the mesh code having the selected number of digits; and
  processing for transmitting the mesh code having the selected number of digits to said vehicle.

17. A computer-readable storage medium storing a computer program for causing a computer to execute processing for mutually converting a mesh code for displaying a position in a combination of a block number of a block, a unit number of a unit, and a mesh number of a mesh, wherein a world map is divided into six in the east-west direction along longitudes at intervals of 60 degrees, and divided into at least three in the south-north direction along latitudes to define a plurality of numbered blocks, each of said blocks is divided into 100 in the east-west direction and in the south-north direction, respectively, to define a plurality of numbered units in a square shape, and each of said units is divided into 10n in the east-west direction and in the north-south direction, respectively, to define a plurality of numbered meshes in a square shape, and for mutually converting respective latitudes and longitudes of new positioning system coordinates and old positioning system coordinates, and coordinate values of X, Y coordinates corresponding to the new positioning system coordinates, and the old positioning system coordinates, respectively,
  said program causing the computer to execute:
  block number selection processing for finding in which blocks each of the entered latitude/longitude and the coordinate values are located;
  unit number selection processing for finding in which units in the block found by said block number selection processing each of the latitude/longitude and the coordinate values are located;

mesh number selection processing for finding in which meshes in the unit selected by said unit number selection processing each of the latitude/longitude and the coordinate values are located;

home position setting processing for identifying a position by omitting the unit number and entering only the mesh number when data is entered;

mesh code output processing for selecting and delivering a number of digits required in accordance with an application from among a mesh code composed of the block number, the unit number, and the mesh number;

mesh code input processing for entering the mesh code having the number of digits selected in accordance with an application from among the block number, the unit number, and the mesh number; and output processing for calculating and delivering the latitude/longitude, and the coordinate values corresponding to the position represented by the mesh code.

* * * * *